United States Patent
Suetsugu et al.

(10) Patent No.: US 10,856,366 B2
(45) Date of Patent: Dec. 1, 2020

(54) HEATING PLATE, CONDUCTIVE PATTERN SHEET, VEHICLE, AND METHOD OF MANUFACTURING HEATING PLATE

(71) Applicant: Dai Nippon Printing Co., Ltd., Tokyo (JP)

(72) Inventors: Hirotoshi Suetsugu, Tokyo (JP); Manabu Hirakawa, Tokyo (JP); Satoshi Goishihara, Tokyo (JP); Koichi Kinoshita, Tokyo (JP); Hidenori Nakamura, Tokyo (JP); Koujiro Ohkawa, Tokyo (JP); Tetsuo Matsukura, Tokyo (JP); Isao Inoue, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 383 days.

(21) Appl. No.: 15/471,380

(22) Filed: Mar. 28, 2017

(65) Prior Publication Data
US 2017/0223779 A1    Aug. 3, 2017

Related U.S. Application Data

(63) Continuation-in-part of application No. 15/104,585, filed as application No. PCT/JP2015/082303 on Nov. 17, 2015, now Pat. No. 10,315,625.

(30) Foreign Application Priority Data

Nov. 17, 2014    (JP) ................................ 2014-232932
Nov. 17, 2014    (JP) ................................ 2014-232953
(Continued)

(51) Int. Cl.
*H05B 3/84*         (2006.01)
*B60S 1/02*         (2006.01)
(Continued)

(52) U.S. Cl.
CPC ............... *H05B 3/84* (2013.01); *B60S 1/026* (2013.01); *B60S 1/586* (2013.01); *H01C 17/003* (2013.01);
(Continued)

(58) Field of Classification Search
CPC ........ H05B 3/84; H05B 3/0028; H05B 3/265; H05B 3/0019; H05B 2203/011;
(Continued)

(56) References Cited

U.S. PATENT DOCUMENTS 3,703,445 A    11/1972   Tarnopol et al.
4,920,254 A    4/1990    DeCamp et al.
(Continued)

FOREIGN PATENT DOCUMENTS

DE    10 2004 060 032 A    4/2006
DE    10 2004 060032 A1    4/2006
(Continued)

OTHER PUBLICATIONS

Japanese Office Action (Application No. 2015-224879) dated Apr. 2, 2019 (with English translation).
(Continued)

*Primary Examiner* — Shawntina T Fuqua
(74) *Attorney, Agent, or Firm* — Burr & Brown, PLLC

(57) ABSTRACT

A heating plate 10 includes: a pair of glass plates 11, 12; a conductive pattern 40, 70 disposed between the pair of glass plates 11, 12 and defining a plurality of opening areas 43, 73; and a joint layer 13, 14 disposed between the conductive pattern 40, 70 and at least one of the pair of glass plates 11, 12; wherein the conductive pattern 40, 70 includes a plurality of connection elements 44, 74 that extend between two branch points 42, 72 to define the opening areas 43, 73; and a total value of lengths of straight line segments connecting
(Continued)

the two branch points 42, 72 is less than 20% of a total value of the plurality of connection elements 44, 74.

8 Claims, 42 Drawing Sheets

(30) Foreign Application Priority Data

| Dec. 1, 2014 | (JP) | 2014-243419 |
|---|---|---|
| Jan. 8, 2015 | (JP) | 2015-002578 |
| Jan. 29, 2015 | (JP) | 2015-015844 |

(51) Int. Cl.
  *B60S 1/58* (2006.01)
  *H01C 17/00* (2006.01)
(52) U.S. Cl.
  CPC .. *H05B 2203/011* (2013.01); *H05B 2203/017* (2013.01)
(58) Field of Classification Search
  CPC ........ H05B 2203/017; H05B 2203/007; H05B 2203/013; B60S 1/026; B60S 1/586; H01C 17/003; H01C 17/06
  See application file for complete search history.

(56) References Cited

U.S. PATENT DOCUMENTS

| 5,798,499 | A | 8/1998 | Shibata et al. |
|---|---|---|---|
| 6,011,244 | A | 1/2000 | Castle et al. |
| 8,759,717 | B2 | 6/2014 | Chamberlain |
| 2003/0183322 | A1 | 10/2003 | Bolognese et al. |
| 2004/0200821 | A1 | 10/2004 | Voeltzel |
| 2008/0290081 | A1 | 11/2008 | Biddell |
| 2009/0233121 | A1 | 9/2009 | Leconte |
| 2009/0277671 | A1 | 11/2009 | Hahn |
| 2010/0258547 | A1 | 10/2010 | Chamberlain et al. |
| 2011/0017726 | A1 | 1/2011 | Choi et al. |
| 2011/0062146 | A1 | 3/2011 | Kuriki |
| 2011/0089160 | A1 | 4/2011 | Kuriki |
| 2012/0261404 | A1† | 10/2012 | Choi |
| 2013/0175255 | A1 | 7/2013 | Kim et al. |
| 2013/0255998 | A1 | 10/2013 | Iwami et al. |
| 2013/0292373 | A1 | 11/2013 | Choi et al. |
| 2014/0083991 | A1 | 3/2014 | Choi et al. |
| 2014/0117003 | A1* | 5/2014 | Choi ........................ H05B 3/84 219/203 |
| 2015/0230292 | A1 | 8/2015 | Minamiya |

FOREIGN PATENT DOCUMENTS

| EP | 1 672 960 | A1 | 6/2006 |
|---|---|---|---|
| EP | 2 275 389 | A2 | 1/2011 |
| EP | 2 286 992 | A1 | 2/2011 |
| JP | S52-47176 | A | 11/1977 |
| JP | H08-72674 | A | 3/1996 |
| JP | 09-207718 | A1 | 8/1997 |
| JP | 2001-217062 | A1 | 8/2001 |
| JP | 2003-249330 | A | 9/2003 |
| JP | 2004-520186 | A1 | 7/2004 |
| JP | 2006-526944 | A | 11/2006 |
| JP | 2008-511529 | | 4/2008 |
| JP | 2009-218173 | A1 | 9/2009 |
| JP | 2009-302035 | A1 | 12/2009 |
| JP | 2010-003667 | A1 | 1/2010 |
| JP | 2010-500703 | | 1/2010 |
| JP | 2010-118396 | A1 | 5/2010 |
| JP | 2010-251230 | A1 | 11/2010 |
| JP | 2011-066691 | A | 3/2011 |
| JP | 2011-509214 | | 3/2011 |
| JP | 2011-515809 | A | 5/2011 |
| JP | 2011-210487 | A | 10/2011 |
| JP | 2011-216378 | A1 | 10/2011 |
| JP | 2012-014945 | A | 1/2012 |
| JP | 2012-014956 | A1 | 1/2012 |
| JP | 2012-023296 | A | 2/2012 |
| JP | 2012-151116 | A1 | 8/2012 |
| JP | 2012-178556 | A1 | 9/2012 |
| JP | 2013-056811 | A | 3/2013 |
| JP | 2013-516043 | A | 5/2013 |
| JP | 2013-173402 | A1 | 9/2013 |
| JP | 2013-238029 | A1 | 11/2013 |
| JP | 2014-203664 | | 10/2014 |
| WO | 2014/065383 | A1 | 5/2014 |

OTHER PUBLICATIONS

Japanese Office Action (Application No. 2015-224918) dated Apr. 2, 2019 (with English translation).
International Search Report and Written Opinion (Application No. PCT/JP2015/082303) dated Feb. 23, 2016.
Japanese Office Action (Application No. 2015-235194) dated Jul. 12, 2016.
Japanese Office Action (Application No. 2015-235194) dated Aug. 23, 2016 (with English translation).
Japanese Office Action (Application No. 2015-235194) dated Oct. 11, 2016 (with English translation).
Japanese Report of Preliminary Reconsideration by Examiner before Appeal (Application No. 2015-235194) dated May 9, 2017 (with English translation).
Japanese Office Action (Application No. 2016-235135) dated Apr. 12, 2019 (with English translation).
Japanese Office Action (with English Translation), Japanese Application No. 2015-235194, dated Sep. 29, 2017 (5 pages).
English Translation of the International Preliminary Report on Patentability, International Application No. PCT/JP2016/084086, dated May 31, 2018 (22 pages).
English translation of International Preliminary Report on Patentability (Chapter I) (Application No. PCT/JP2015/082303) dated Jun. 1, 2017, 9 pages.
International Search Report, International Application No. PCT/JP2016/084086, dated Feb. 7, 2017 (10 pages).
Extended European Search Report (Application No. 15861944.5) dated Jun. 18, 2018.
Japanese Office Action (with English translation), Japanese Application No. 2016-012549, dated Sep. 24, 2019 (8 pages).
Japanese Office Action (Application No. 2016-002857) dated Dec. 6, 2019 (with English translation).
Extended European Search Report, European Application No. 16866382.1, dated Oct. 2, 2019 (14 pages).
Japanese Office Action (with English translation), Japanese Application No. 2015-224879, dated Oct. 29, 2019 (8 pages).
Japanese Office Action (with English translation), Japanese Application No. 2015-224918, dated Oct. 29, 2019 (8 pages).
Supplementary Partial European Search Report from a corresponding European patent application (EP 16866382) dated Jun. 3, 2019, 13 pages.
Japanese Office Action (with English translation), Japanese Application No. 2015-245413, dated Sep. 6, 2019 (7 pages).
Japanese Office Action (Application No. 2017-027863) dated Nov. 22, 2019 (with English translation).
Japanese Office Action (Application No. 2015-224986) dated Sep. 3, 2019 (with English translation).
Japanese Office Action (Application No. 2016-012549) dated Apr. 24, 2020 (13 pages).
Japanese Decision of Rejection (Application No. 2015-224918) dated Jun. 9, 2020 (with English Translation).
Japanese Decision of Dismissal of Amendment (Application No. 2015-224918) dated Jun. 9, 2020 (with English Translation).
Japanese Office Action (Application No. 2016-002857) dated Jun. 2, 2020 (with English Translation).
Extended European Search Report (Application No. 20151003.9) dated Feb. 13, 2020.
Japanese Office Action (Application No. 2015-224879) dated Jul. 7, 2020 (with English translation).

(56) References Cited

OTHER PUBLICATIONS

U.S. Office Action (U.S. Appl. No. 15/776,243) dated Aug. 7, 2020.
Japanese Office Action (Application No. 2015-224879) dated Sep. 18, 2020 (with English translation).
Chinese Office Action (Application No. 201680066949.9) dated Sep. 1, 2020 (with English translation).

\* cited by examiner
† cited by third party

HEATING PLATE, CONDUCTIVE PATTERN SHEET, VEHICLE, AND METHOD OF MANUFACTURING HEATING PLATE

CROSS REFERENCE TO RELATED APPLICATIONS

This application is a continuation-in-part of U.S. application Ser. No. 15/104,585, filed Jun. 15, 2016, which in turn is the National Stage Entry of PCT/JP2015/082303, filed Nov. 17, 2015, the entireties of which are incorporated herein by reference.

FIELD OF THE INVENTION

The present invention relates to a heating plate, a conductive pattern sheet for the heating plate, a vehicle having the heating plate, and a method of manufacturing the heating plate.

BACKGROUND OF THE INVENTION

As a defroster apparatus used for a pane, such as a front window and a rear window of a vehicle, a defroster apparatus locating a heating wire formed of a tungsten wire or the like all over the pane is known. In the conventional technique, by powering the heating wire provided all over the pane to raise a temperature of the pane by means of resistance heat, the pane is defogged or defrosted to ensure a field of view of a passenger.

In a defroster apparatus disclosed in JP2013-173402A, a tungsten wire is used as the heating wire. In this case, the heating wire has an increased cross-sectional area in order to prevent that electric resistance of the heating wire becomes too high because of a higher electric resistivity of tungsten. Thus, the heating wire using the tungsten wire is easily visible to an observer. The fact that the heating wire is visible to an observer such as a driver deteriorates a visibility of the observer through the pane.

There is recently known another defroster apparatus manufactured by creating a conductive pattern by photolithographic technique in place of a heating wire formed of a tungsten wire or the like. By powering the conductive pattern, a temperature of a pane is raised by means of resistance heat (JP2011-216378A and JP2012-151116A). This method is advantageous in that even a conductive pattern of a complicated shape can be easily formed. In JP2011-216378A and JP2012-151116A, a conductive pattern having an irregular shape obtained from a Voronoi diagram is formed, and the conductive pattern is used as a heating wire for raising a temperature of a pane.

FIG. 23 shows a partially enlarged conductive pattern 540 of a conventional defroster apparatus disclosed in JP2011-216378A and JP2012-151116A. In the conventional defroster apparatus, the conductive pattern 540 includes a plurality of connection elements 544 that extend between two branch points 542 to define opening areas 543. Each connection element 544 is formed of one straight line. The inventors of the present invention have conducted extensive studies on the defroster apparatus having such a connection element 544 and found that the conductive pattern 540 including the connection elements 544 may be visible to an observer (e.g., a passenger such as a driver), because of the shape of each connection element 544 formed of one straight line. When light such as outside light incident on the defroster apparatus enters a side surface formed of a flat surface of the connection element 544, the light incident on each position of the side surface is reflected on the side surface in substantially a certain direction. The reflected light is visible to an observer so that the conductive pattern 540 including the connection elements 544 is visible to the observer. The fact that the conductive pattern 540 including the connection elements 544 is visible to an observer such as a driver deteriorates a visibility of the observer through the pane.

The present invention has been made in view of the above circumstances. The first object of the present invention is to improve an invisibility of the conductive pattern of the defroster apparatus.

Various materials have been conventionally used for a heating wire of the defroster apparatus. For example, JP9-207718A discloses that a heating wire is made of tungsten. The heating wires disclosed in JP9-207718A are arranged in a so-called line and space pattern in which the plurality of heating wires are arranged in one direction.

The heating wire (thin conductive wire) in the defroster apparatus is desired to be as thin as possible, in order to improve a see-through property of a pane. However, the heating wire made of tungsten as in JP9-207718A has a relatively higher volume resistivity. Thus, in consideration of heat generation by the resistance heat of the electric wire upon being powered, it is difficult to make extremely thinner the heating wire. Thus, when the heating wire as disclosed in JP9-207718A is used in the defroster apparatus, there is a difficulty in exhibiting an excellent see-through property, while realizing a suitable heat generation function.

When the heating wires made of tungsten as disclosed in JP9-207718A are used in the defroster apparatus, the heating wires are sometimes heated/pressurized while being sandwiched between a pair of glass plates. In this case, before the heating/pressurizing step, the heating wires are generally manufactured as thin wires in a separate step. The heating wires formed in the separate step are placed and positioned in a desired pattern between a pair of glass plates, and the pair of glass plates in this condition are heated/pressurized. However, this positioning operation requires time and effort in order to precisely position the electric wires. In addition, when the pair of glass plates are heated/pressurized, there is a possibility that the electric wires are shifted from the determined positions.

The present invention has been made in view of the above circumstances. The second object of the present invention is to provide a heating plate and a method of manufacturing the same, which is capable of achieving an excellent see-through property because thin conductive wires disposed between glass plates are sufficiently thin, and of achieving an excellent heat generation upon being powered although the line widths of the thin conductive wires are thin, while a desired pattern of the thin conductive wires can be easily given to the heating plate with high precision.

In addition, the third object of the present invention is to provide a heating plate, a pattern sheet and a method of manufacturing the same, which is capable of achieving an excellent see-through property because the thin conductive wires disposed between glass plates are sufficiently thin, and of achieving an excellent heat generation upon being powered although the line widths of the thin conductive wires are thin.

JP2010-3667A discloses that heating wires are formed by exposing, developing and fixing a silver-salt photosensitive layer on a substrate. In addition, JP2010-3667A discloses that heating wires are formed by laminating a metal foil on a substrate and etching the metal foil, and that heating wires are formed by printing a paste containing metal particles on a substrate. Further, there is disclosed that heating wire are formed by printing heating wires on a substrate by means of a screen printing plate.

In such a defroster apparatus, a pair of glass plates, with a joint layer and heating wires being sandwiched therebetween, are heated and pressurized so as to manufacture a heating plate, and a defroster apparatus is formed of the heating plate. When such a heating plate is manufactured with the use of the heating wires disclosed in JP2010-3667A, the heating wires, which are integral with a sheet-like substrate, are disposed between a pair of glass plates, and then heated and pressurized. In more detail, a glass plate, a joint layer, a substrate integral with the heating wires, a joint layer and a glass plate are superposed in this order, and then heated and pressurized. In the thus manufactured heating plate, the one joint layer of the two joint layers is directly in contact with the glass plate and the substrate to join the glass plate and the substrate, and the other joint layer is directly in contact with the heating wire and the glass plate to join the heating wire and the glass plate.

Each heating wire disclosed in JP2010-3667A is formed to project along a normal direction of a sheet plane of a sheet-like substrate, and a sidewall thereof extends along the normal direction of the sheet pale of the substrate. The sidewall of such a heating wire may have an overhang shape, for some reason or other in the course of manufacture. The overhang shape means a shape of a heating wire that sidewall of the heating wire inclinedly extends to the outside in a direction along the sheet plane of the substrate, as a certain point in the sidewall moves away from the substrate along the normal direction of the sheet plane of the substrate. Such an overhang shape particularly tends to be formed when a heating wire is formed by etching or by printing a paste containing metal particles.

However, in the case where the sidewall of a heating wire has a shape that extends along the normal direction of the sheet plane of the substrate or the overhang shape, when the heating wire and the joint layer are brought into contact with each other in the heating and pressurizing step during the manufacture of a heating plate, it is difficult for the joint layer to get into a root side of the heating wire, so that bubbles are likely to remain around the sidewall of the heating wire. These bubbles may impair an appearance quality of the heating plate as well as resulting in glaring (glittering). Thus, in the manufacture of the heating plate, countermeasure against remaining of the bubbles is desired.

The present invention has been made in view of the above circumstances. The fourth object of the present invention is to restrain remaining of bubbles in a heating plate.

A thin conductive wire pattern forming a conductive pattern disadvantageously invite flickering or glare in a field of view through a laminated glass plate or a heating plate. The flickering is a phenomenon where a pattern of glaring lines is seen. The flickering or glare is likely to be seen by varying a direction along which the conductive pattern is observed. Further, the flickering or glare becomes significantly conspicuous when there is a light source beyond a laminated glass plate. The inventors of the present invention found that, when a light source is observed through a laminated glass plate, the flickering or glare is likely to occur in an area above the light source and an area below the light source. Namely, a pattern including a lot of vertically extending lines arranged transversely is likely to occur in these areas.

Due to the extensive examination, in the observation of a light source through a laminated glass plate, the inventors of the present invention found that the reason why the flickering or glare is more likely to be observed in a longitudinal direction of the light source is that a longitudinal thin conductive wire of the thin conductive wires has a greater impact on the flickering or glare than a transverse thin conductive wire. The present invention has been made in view of the above circumstances. The fifth object of the present invention is to reduce the flickering or glare in a field of view through a heating plate, so as to ensure a clear field of view.

SUMMARY OF THE INVENTION

A first object of the present invention is to improve invisibility of a conductive pattern in a defroster apparatus. The first object is achieved by a first embodiment of the present invention.

A heating plate according to the first embodiment of the present invention includes:
a pair of glass plates;
a conductive pattern disposed between the pair of glass plates and defining a plurality of opening areas; and
a joint layer disposed between the conductive pattern and at least one of the pair of glass plates;
wherein:
the conductive pattern includes a plurality of connection elements that extend between two branch points to define the opening areas; and
a total value of lengths of straight line segments of the connection elements, each of the connection elements connecting the two branch points, is less than 20% of a total value of lengths measured along each connection element of the plurality of connection elements.

In the heating plate according to the first embodiment of the present invention, the conductive pattern may be formed by patterning a conductive layer by etching.

In the heating plate according to the first embodiment of the present invention, an average distance between centers of gravity of the two adjacent opening areas may be not less than 80 μm. The average distance between centers of gravity of the two adjacent opening areas may be not less than 70 μm.

In the heating plate according to the first embodiment of the present invention, a thickness of the conductive pattern may be not less than 5 μm. A thickness of the conductive pattern may be not less than 2 μm.

In the heating plate according to the first embodiment of the present invention, an average of ratio ($L_1/L_2$) of a length $L_1$ of each opening area along a first direction, relative to a length $L_2$ of the opening area along a second direction perpendicular to the first direction, may be not less than 1.3 and not more than 1.8.

A conductive pattern sheet according to the first embodiment of the present invention includes:
a substrate; and
a conductive pattern disposed on the substrate and defining a plurality of opening areas;
wherein:
the conductive pattern includes a plurality of connection elements that extend between two branch points to define the opening areas; and
a total value of lengths of straight line segments of the connection elements, each of the connection elements connecting the two branch points, is less than 20% of a total value of lengths measured along each connection element of the plurality of connection elements.

A vehicle according to the first embodiment of the present invention includes the aforementioned heating plate.

According to the first embodiment of the present invention, it is possible to improve invisibility of a conductive pattern in a defroster apparatus.

The first object of the present invention is achieved by a second embodiment of the present invention.

A heating plate according to the second embodiment of the present invention includes:
a pair of glass plates;
a conductive pattern disposed between the pair of glass plates and including a thin conductive wire; and
a joint layer disposed between the conductive pattern and at least one of the pair of glass plates;
wherein:
the thin conductive wire of the conductive pattern has a first surface facing one of the pair of glass plates, and a second surface facing the other of the pair of glass plate; and
when a width of the first surface of the thin conductive wire is represented as $W_{2a}$ (μm), a width of the second surface of the thin conductive wire is represented as $W_{2b}$ (μm), and a cross-sectional area of the thin conductive wire is represented as $S_{2a}$ (μm²), the following relationships represented (a) and (b) are satisfied.

$$0 < |W_{2a} - W_{2b}| \leq 10 \quad \text{(a)}$$

$$S_{2a} \geq 10 \quad \text{(b)}$$

In the heating plate according to the second embodiment of the present invention, the conductive pattern may be formed by patterning a conductive layer by etching.

In the heating plate according to the second embodiment of the present invention, the conductive pattern may include a pattern defining a plurality of opening areas; and the conductive pattern may include a plurality of connection elements that extend between two branch points to define the opening areas.

In the heating plate according to the second embodiment of the present invention, an average of the number of the connection elements extending from one branch point may be more than 3.0 and less than 4.0.

In the heating plate according to the second embodiment of the present invention, the conductive pattern may include opening areas surrounded by four, five, six and seven connection elements, respectively; and among the opening areas included in the conductive pattern, the number of opening areas surrounded by six connection elements may be predominant.

In the heating plate according to the second embodiment of the present invention, at least some of the plurality of connection elements may have a curved shape or a polygonal line shape, when viewed in a normal direction of a plate plane of the heating plate.

A conductive pattern sheet according to the second embodiment of the present invention includes:
a substrate; and
a conductive pattern disposed on the substrate and including a thin conductive wire;
wherein:
the thin conductive wire of the conductive pattern has a proximal surface forming a surface on the side of the substrate, and a distal surface facing the proximal surface;
when a width of the distal surface of the thin conductive wire is represented as $W_{2c}$ (μm), a width $W_{2d}$ of the proximal surface of the thin conductive wire is represented as $W_{2d}$ (μm), and a cross-sectional area of the thin conductive wire is represented as $S_{2b}$ (μm²), the following relationships represented (c) and (d) are satisfied.

$$0 < |W_{2c} - W_{2d}| \leq 10 \quad \text{(c)}$$

$$S_{2b} \geq 10 \quad \text{(d)}$$

A vehicle according to the second embodiment of the present invention includes the aforementioned heating plate.

According to the second embodiment of the present invention, invisibility of a conductive pattern in a defroster apparatus can be improved.

A second object of the present invention is to provide a heating plate capable of obtaining an excellent see-though property because a thin conductive wire disposed between glass plates is sufficiently thin, capable of obtaining suitable heat generation upon being powered although a line width of the thin conductive wire is thin, and to which thin conductive wires in a desired pattern can be easily given precisely, and a manufacturing method thereof. The second object is achieved by a third embodiment of the present invention.

A first heating plate according to the third embodiment of the present invention includes:
a pair of glass plates; and
a conductive pattern disposed between the pair of glass plates;
wherein:
the conductive pattern includes a plurality of thin conductive wires that are formed of a patterned copper film and are arranged in one direction, each thin conductive wire extending in the other direction not in parallel with the one direction apart from another thin conductive wire adjacent in the one direction;
a line width of the thin conductive wire is not less than 1 μm and not more than 20 μm; and
a pitch between the adjacent thin conductive wires is not less than 0.3 mm and not more than 2 mm.

A second heating plate according to the third embodiment of the present invention includes:
a pair of glass plates; and
a conductive pattern disposed between the pair of glass plates;
wherein:
the conductive pattern includes a plurality of thin conductive wires that are formed of a patterned copper film and are arranged in a line and space pattern;
a line width of the thin conductive wire is not less than 1 μm and not more than 20 μm; and
a pitch between the adjacent thin conductive wires is not less than 0.3 mm and not more than 2 mm.

In the first or second heating plate according to the third embodiment of the present invention, each thin conductive wire may extend in a pattern of a polygonal line shape or in a pattern of a corrugated shape.

In the first or second heating plate according to the third embodiment of the present invention, the copper film may be an electrolytic copper foil. In this case, a thickness of the electrolytic copper foil may be not more than 7 μm.

A manufacturing method of the first heating plate according to the third embodiment of the present invention is a manufacturing method of a heating plate including a pair of glass plates and a conductive pattern disposed between the pair of glass plates, the manufacturing method including:
laminating a copper film on a substrate; and
forming the conductive pattern including a plurality of thin conductive wires formed by patterning the copper film;
wherein:

the plurality of thin conductive wires are arranged in one direction;

each thin conductive wire extends in the other direction not in parallel with the one direction apart from another thin conductive wire adjacent in the one direction; and a line width of the thin conductive wire is not less than 1 μm and not more than 20 μm, and a pitch between the adjacent thin conductive wires is not less than 0.3 mm and not more than 2 mm.

A manufacturing method of the second heating plate according to the third embodiment of the present invention is: a manufacturing method of a heating plate including a pair of glass plates and a conductive pattern disposed between the pair of glass plates, the manufacturing method including:

laminating a copper film on the substrate; and forming the conductive pattern including a plurality of thin conductive wires formed by patterning the copper film;

wherein:

the plurality of thin conductive wires are arranged in a line and space pattern; and a line width of the thin conductive wire is not less than 1 μm and not more than 20 μm, and a pitch between the adjacent thin conductive wires is not less than 0.3 mm and not more than 2 mm.

In the first or second heating plate according to the third embodiment of the present invention, the copper film may be an electrolytic copper foil. In this case, a thickness of the electrolytic copper foil may be not more than 7 μm.

According to the third embodiment, it is possible to provide a heating plate capable of obtaining an excellent see-though property because a thin conductive wire disposed between glass plates is sufficiently thin, capable of obtaining suitable heat generation upon being powered although a line width of the thin conductive wire is thin, and to which thin conductive wires in a desired pattern can be easily given precisely, and a manufacturing method thereof.

A third object of the present invention is to provide a heating plate and a pattern sheet capable of obtaining an excellent see-though property because a thin conductive wire disposed between glass plates is sufficiently thin, and capable of obtaining suitable heat generation upon being powered although a line width of the thin conductive wire is thin, and a manufacturing method thereof. The third object is achieved by a fourth embodiment of the present invention.

A heating plate according to the fourth embodiment of the present invention includes:

a pair of glass plates; and a conductive pattern disposed between the pair of glass plates;

wherein:

the conductive pattern includes thin conductive wires formed of a patterned copper film and arranged in a mesh pattern; and a line width of the thin conductive wire is not less than 1 μm and not more than 20 μm.

In the heating plate according to the fourth embodiment of the present invention, the thin conductive wires may be arranged in a honeycomb pattern.

In this case, a pitch of adjacent hexagonal openings in the honeycomb pattern may be not less than 0.3 mm and not more than 7.0 mm.

In the heating plate according to the fourth embodiment of the present invention, the thin conductive wires may be arranged in a grid pattern.

In this case, a pitch of adjacent rectangular openings in the grid pattern may be not less than 0.3 mm and not more than 7.0 mm.

A conductive pattern sheet according to the fourth embodiment of the present invention is a conductive pattern sheet used in a heating plate that generates heat upon application of voltage thereto, the conductive pattern sheet including:

a substrate; and a conductive pattern disposed on the substrate;

wherein:

the conductive pattern includes thin conductive wires formed of a patterned copper film and arranged in a mesh pattern; and a line width of the thin conductive wire is not less than 1 μm and not more than 20 μm.

A manufacturing method of a heating plate according to the fourth embodiment of the present invention is a manufacturing method of a heating plate including a pair of glass plates and a conductive pattern disposed between the pair of glass plates, the manufacturing method including:

laminating a copper film on a substrate; and forming the conductive pattern including thin conductive wires formed by patterning the copper film;

wherein:

the thin conductive wires are arranged in a mesh pattern; and a line width of the thin conductive wire is not less than 1 μm and not more than 20 μm.

According to the fourth embodiment, it is possible to provide a heating plate and a pattern sheet capable of obtaining an excellent see-though property because a thin conductive wire disposed between glass plates is sufficiently thin, and capable of obtaining suitable heat generation upon being powered although a line width of the thin conductive wire is thin, and a manufacturing method thereof.

A fourth object of the present invention is to restrain bubbles from remaining in a heating plate. The fourth object is achieved by a fifth embodiment of the present invention.

A heating plate according to the fifth embodiment of the present invention includes: a heating plate including a pair of glass plates and a conductive pattern disposed between the pair of glass plates, the conductive pattern including thin conductive wires arranged in a pattern, the heating plate comprising:

a joint layer disposed between at least one of the pair of glass plates and the conductive pattern, the joint layer being directly in contact with the glass plate and the thin conductive wires so as to join the conductive pattern to the glass plate;

wherein the thin conductive wire is formed such that a line width thereof narrows as a certain point in the thin conductive wire comes close to the glass plates located on the side of the joint layer in contact with the thin conductive wires.

In the heating plate according to the fifth embodiment of the present invention, the thin conductive wires may be formed from a metal film that is patterned by etching.

In the heating plate according to the fifth embodiment of the present invention, the thin conductive wire may be formed to have a trapezoidal sectional shape in a direction perpendicular to an extension direction of the thin conductive wire.

In the heating plate according to the fifth embodiment of the present invention, the trapezoidal sectional shape in the thin conductive wire may have an angle which is defined by a line segment extending from an end of a lower base to an end of an upper base, with respect to a direction extending along the lower base, the angle being not less than 40 degrees and not more than 85 degrees.

In the heating plate according to the fifth embodiment of the present invention, the thin conductive wire may have a dark color layer at a position facing a side opposed to the glass plate located on the side of the joint layer in contact with the thin conductive wire. In this case, the dark color layer may be made of chrome oxide.

A conductive pattern sheet according to the fifth embodiment of the present is: a conductive pattern sheet having a conductive pattern to be disposed between a pair of glass plates, comprising:

a sheet-like substrate including a pair of opposed surfaces; wherein:

the conductive pattern is provided at least any of the pair of opposed surfaces of the substrate;

the conductive pattern includes thin conductive wires arranged in a pattern; and the thin conductive wire is formed such that a line width thereof narrows as a certain point in the thin conductive wire moves away outward from the substrate along a normal direction to a sheet plane of the substrate.

According to the fifth embodiment of the present invention, it is possible to restrain bubbles from remaining in a heating plate.

The fifth object of the present invention is to reduce the flickering or glare in a field of view through a heating plate, so as to ensure a clear field of view. The fifth object is achieved by a sixth embodiment of the present invention.

A heating plate according to the sixth embodiment of the present invention includes: a pair of glass plates; and a conductive pattern disposed between the pair of glass plates, the conductive pattern including thin conductive wires arranged in a mesh-like pattern;

wherein:

the thin conductive wires are an aggregation of a plurality of connection elements that extend between two branch points to define openings;

the connection element forming a longitudinal line has a shape that alternately projects to one side and to the other side to form convexities in a direction intersecting with a direction connecting the branch points at both ends thereof; and the connection element forming a longitudinal line is a connection element wherein, when the conductive pattern is projected on a vertical plane having a normal line that is located on the same vertical plane as a normal line, which is one of normal lines to a contact plane near the connection element on a surface of the heating plate, at a contact point between the contact plane and the surface of the heating plate, an angle formed by a line segment connecting both ends of the projection of the connection element on the vertical plane with respect to a vertical direction on the vertical plane is smaller than an angle with respect to a horizontal direction on the vertical plane.

In the heating plate according to the sixth embodiment of the present invention, a connection element other than the connection elements each forming a longitudinal line may have a shape that alternately projects to one side and to the other side to form convexities in a direction intersecting with a direction connecting the branch points at both ends thereof.

In the heating plate according to the sixth embodiment of the present invention, a ratio of a length of the connection element forming a longitudinal line with respect to a length of a line segment connecting the branch points at both ends thereof may be greater than a ratio of a length of a connection element other than the connection element forming a longitudinal line with respect to the length of the line segment connecting the branch points at both ends thereof.

A vehicle in the heating plate according to the sixth embodiment of the present invention includes any of the aforementioned heating plate.

DETAILED DESCRIPTION OF THE INVENTION

Figure 1:
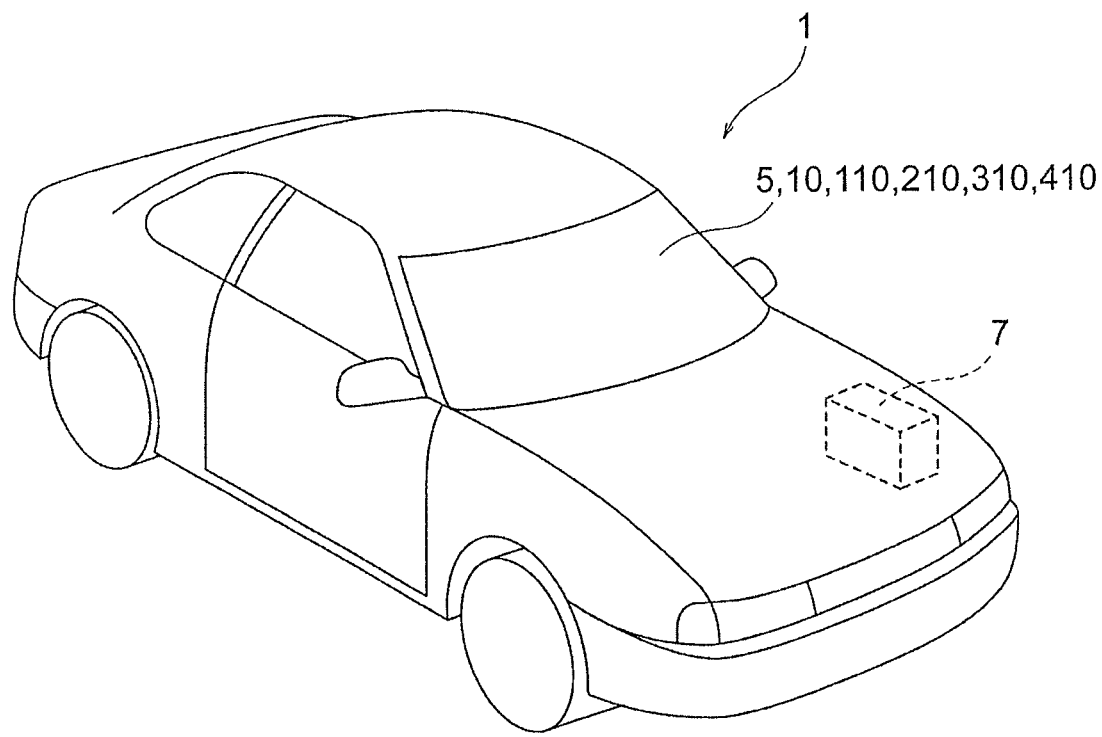
FIG. 1 is a perspective view for explaining a first embodiment according to the present invention, schematically showing a vehicle including a heating plate. In particular, FIG. 1 schematically shows, as an example of the vehicle, an automobile including the heating plate.

A plurality of embodiments of the present invention will be described herebelow with reference to the drawings. In the drawings attached to the specification, a scale size, an aspect ratio and so on are changed and exaggerated from the actual ones, for the convenience of easiness in illustration and understanding. In addition, structures and features of the embodiments described below can be suitably combined.

In this specification, the terms "plate", "sheet" and "film" are not differentiated from one another, based only on the difference of terms. For example, a "conductive pattern sheet" is a concept including a member that can be referred to as plate and film, and is not differentiated from a member referred to as "conductive pattern plate (substrate)" or "conductive pattern film" based only on the difference of terms.

In addition, the term "sheet plane (plate plane, film plane)" means a plane corresponding to a planar direction of a sheet-like (plate-like, film-like) member as a target that is seen as a whole in general.

In this specification, the term "joint" includes not only a "complete joint" where joint is perfectly completed but also a so-called "provisional joint" for provisional joint before the "complete joint".

Further, in this specification, terms specifying shapes, geometric conditions and their degrees, e.g., "parallel", "perpendicular", "same", etc., are not limited to their strict definitions, but construed to include a range with a view to obtaining the similar function.

First Embodiment

Figure 2:
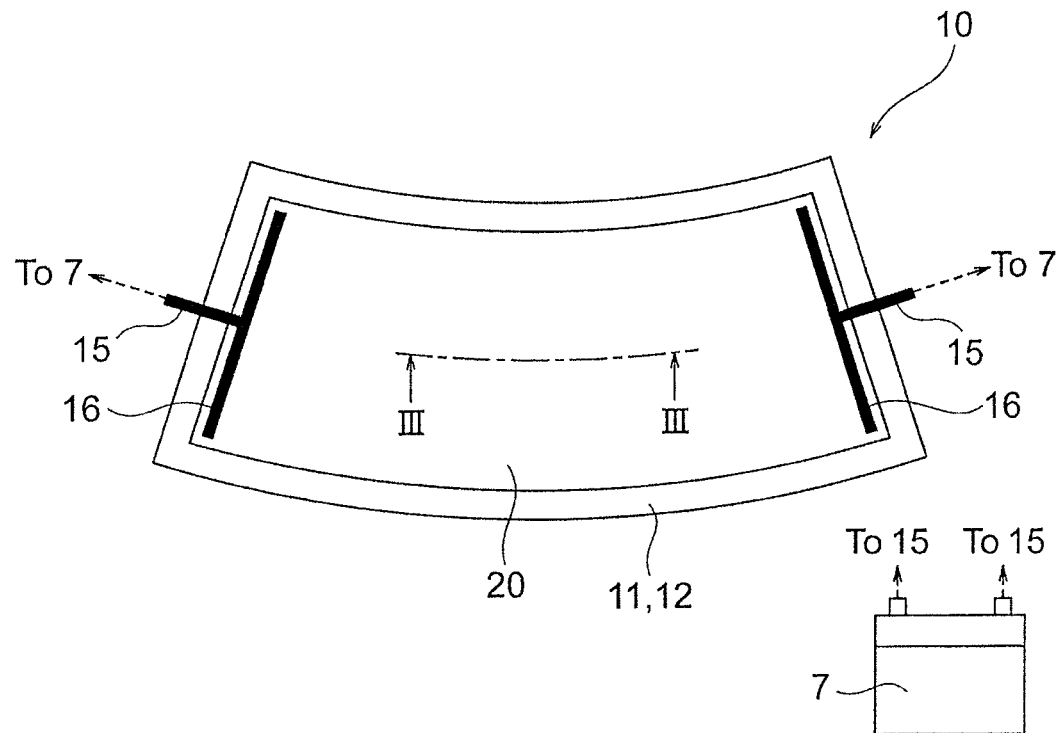
FIG. 2 is a view of the heating plate when viewed in a normal direction of a plate plane thereof.
Figure 3:
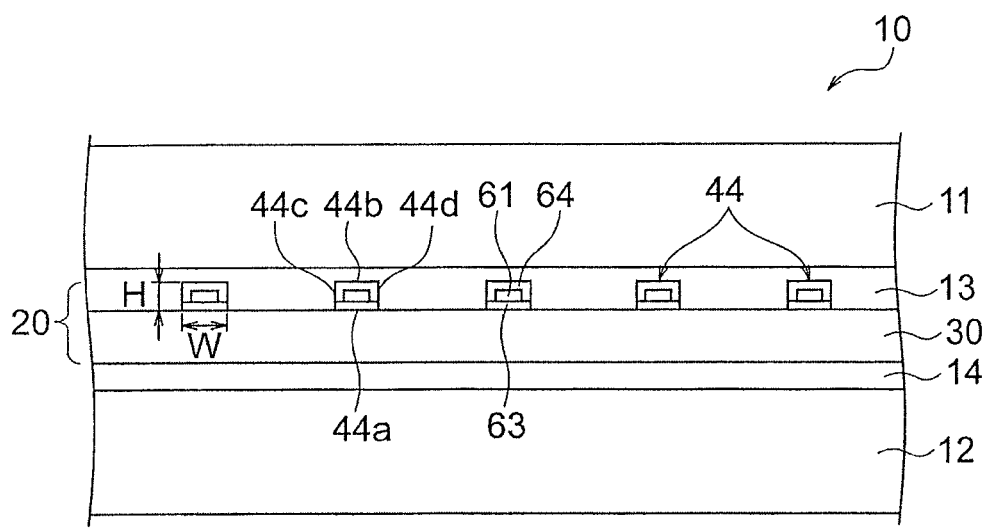
FIG. 3 is a cross-sectional view of the heating plate of FIG. 2.

FIGS. 1 to 22 are views for explaining a first embodiment according to the present invention. FIG. 1 is a view schematically showing an automobile including a heating plate. FIG. 2 is a view of the heating plate when viewed in a normal direction of a plate plane thereof. FIG. 3 is a cross sectional view of the heating plate of FIG. 2. The heating plate in this embodiment is sometimes referred to as "laminated glass".

As shown in FIG. 1, an automobile 1 as an example of a vehicle includes panes such as a front window, a rear window and side windows. Herein, a front window 5 is formed of a heating plate 10 by way of example. In addition, the automobile 1 includes a power source 7 such as a battery. Heating plates 110, 210, 310 and 410 according to the other embodiments described below can be applied to the automobile of FIG. 1.

FIG. 2 shows the heating plate 10 viewed in a normal direction of a plate plane thereof. In addition, FIG. 3 shows a cross-sectional view corresponding to a line III-III of the heating plate 10 of FIG. 2. In the example shown in FIG. 3, the heating plate 10 includes a pair of glass plates 11, 12, a conductive pattern sheet (pattern sheet) 20 disposed between the pair of glass plates 11, 12, a joint layer 13 (connecting layer 13) that joins (connects) the glass plate 11 and the conductive pattern sheet 20, and a joint layer 14 that joins the glass plate 12 and the conductive pattern sheet 20. In the example shown in FIGS. 1 and 2, the heating plate 10 is curved. However, FIG. 3 and FIGS. 13 to 20 planarly show the heating plate 10 and the glass plates 11, 12, for simplifying the illustration and facilitating the understanding.

The conductive pattern sheet 20 includes a sheet-like substrate 30, a conductive pattern 40 formed on the substrate 30, a wiring part 15 for powering the conductive pattern 40, and a connection part 16 connecting the conductive pattern 40 and the wiring part 15.

In the example shown in FIGS. 2 and 3, the conductive pattern 40 is powered by the power source 7, such as a battery, through the wiring part 15 and the connection part 16, so that the conductive pattern 40 generates heat by means of resistance heat. The heat generated by the conductive pattern 40 is transmitted to the glass plates 11, 12 through the joint layers 13, 14, so that the glass plates 11, 12 are warmed up. Thus, dew drops on the glass plates 11, 12 can be removed so that the glass plates 11, 12 can be defogged. When there is snow or ice on the glass plates 11, 12, the snow or ice can be unfrozen. Thus, an excellent field of view of a passenger can be ensured.

Particularly when used as a front window of an automobile, the glass plate 11, 12 preferably has a high visible light transmittance, in order not to hinder a field of view of a passenger. A material of such a glass plate 11, 12 may be soda lime glass, blue plate glass (float glass) and so on, for example. The glass plate 11, 12 preferably has a transmittance of 90% or more in a visible light area. The visible light transmittance of the glass plate 11, 12 is specified as follows. Transmittance of light with measurement wavelength range of from 380 nm to 780 nm is measured by using a spectrophotometer (manufactured by Shimadzu Corporation, "UV-3100PC", compliant with JIS K 0115). The visible light transmittance is an average value of the transmittances at the respective wavelengths. The visible light transmittance may be lowered by partially or totally coloring the glass plate 11, 12, for example. In this case, direct sunlight can be shielded and an inside of the automobile is less visible from outside.

In addition, the glass plate 11, 12 preferably has a thickness of not less than 1 mm and not more than 5 mm. With such a thickness, the glass plate 11, 12 excellent in strength and optical properties can be obtained.

The glass plates 11, 12 and the conductive pattern sheet 20 are joined to each other through the joint layers 13, 14, respectively. As such a joint layer 13, 14, a layer made of a material having various adhesion properties or glueing (pressure sensitive adhesive) properties can be employed. In addition, the joint layer 13, 14 preferably has a high visible light transmittance. A typical joint layer may be a layer made of polyvinyl butyral (PVB), for example. The joint layer 13, 14 preferably has a thickness of not less than 0.15 mm and not more than 0.7 mm.

Not limited to the illustrated example, the heating plate 10 may be provided with another function layer for exerting a specific function. In addition, one function layer may exert two or more functions. Alternatively, for example, a function may be given to at least one of the glass plate 11, 12 of the heating plate 10, the joint layer 13, 14 thereof, and the substrate 30 of the conductive pattern sheet 20 thereof, which is described later. The function that can be given to heating plate 10 may be an antireflection (AR) function, a hard coat (HC) function having an abrasion resistance, an infrared ray shield (reflection) function, an ultraviolet ray shield (reflection) function, a polarizing function, an antifouling function and so on, for example.

Next, the conductive pattern sheet 20 is described. The conductive pattern sheet 20 includes the sheet-like substrate 30, the conductive pattern 40 disposed on the substrate 30, the wiring part 15 for powering the conductive pattern 40, and the connection part 16 connecting the conductive pattern 40 and the wiring part 15. The conductive pattern 40 is formed by arranging thin conductive wires made of metal or the like in a predetermined pattern. The conductive pattern sheet 20 may have a planar dimension substantially the same as that of the glass plate 11, 12 so as to be placed all over the heating plate 10. Alternatively, the conductive pattern sheet 20 may be placed over only a part of the heating plate 10, such as a part in front of a driver's seat.

The sheet-like substrate 30 functions as a substrate that supports the conductive pattern 40. The substrate 30 is an electrically insulating substrate that transmits light of a wavelength (380 nm to 780 nm) of a visible light wavelength band, which is generally recognized as transparent.

Although any resin transmitting visible light can be used as a resin to be contained in the substrate 30, a thermoplastic resin may be preferably used. The thermoplastic resin may be an acryl resin made of, e.g., polymethyl methacrylate, a polyester resin made of, e.g., polyvinyl chloride, polyethylene terephthalate or amorphous polyethylene terephthalate (A-PET), a polyethylene resin, a polyolefin resin made of, e.g., polypropylene, a cellulose-based resin made of, e.g., triacetyl cellulose (cellulose triacetate), a polystyrene or polycarbonate resin, an AS resin and so on, for example. In particular, an acryl resin and a polyvinyl chloride are preferred because of their excellent etching resistance, weather resistance and light resistance.

In addition, in consideration of support property and light transmission of the conductive pattern 40, the substrate 30 preferably has a thickness of not less than 0.03 mm and not more than 0.3 mm.

The conductive pattern 40 is described with reference to FIGS. 4 to 6. The conductive pattern 40 is powered by the power source 7, such as a battery, through the wiring part 15 and the connection part 16, so as to generate heat by means of resistance heat. The heat is transmitted to the glass plates 11, 12 through the joint layers 13, 14, so that the glass plates 11, 12 are warmed up.

Figure 5:
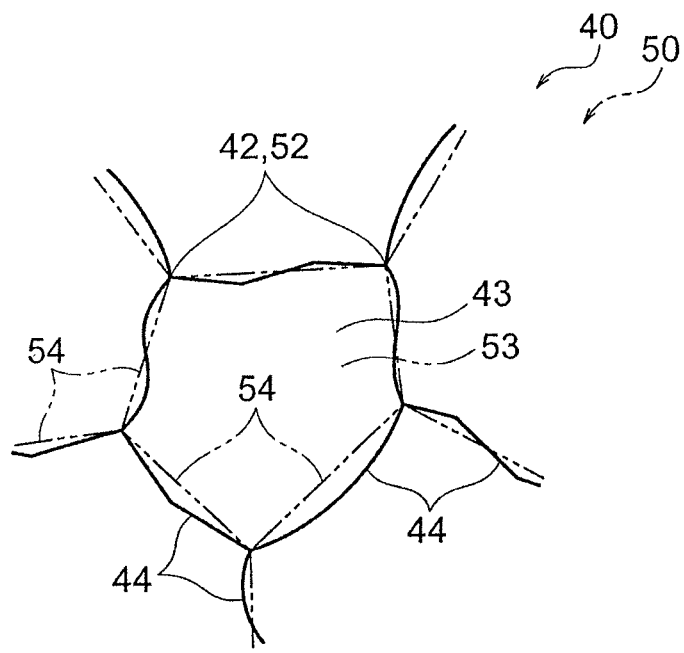
FIG. 5 is an enlarged view showing a part of the conductive pattern together with the reference pattern shown in FIG. 4.

A first feature of the conductive pattern 40 in this embodiment is a shape typically shown in the plan view of FIG. 5.

The conductive pattern 40 includes a plurality of connection elements 44 that extend between two branch points 42 to define a number of opening areas 43. Such opening areas 43 have random shapes and are arranged at random pitches. Typically, the opening areas 43 have shapes which do not have a repeated regularity (periodic regularity), and are arranged at pitches which do not have a repeated regularity (periodic regularity). A second feature of the conductive pattern 40 in this embodiment resides in that a rate of a sum of lengths of straight line segments of the connection elements 44 connecting the two branch points 42, relative to a sum of lengths of the connection elements 44 over the whole area of the conductive pattern 40, is less than 20%. Herebelow, this fact can also be expressed that "a rate of the connection elements, which are straight line segments connecting the two branch points, relative to the plurality of connection elements, is less than 20%".

The conductive pattern 40 having the above two features is typically formed by determining a reference pattern 50 formed of a plurality of ling segments 54 that extend between two branch points 52 to define opening areas 53, then determining positions of the branch points 42 of the conductive pattern 40 based on the branch points 52 of the reference pattern 50, and thereafter by determining positions of the connection elements 44 of the conductive pattern 40 based on the determined branch points 42 of the conductive pattern 40 and the line segments 54 of the reference pattern 50.

Figure 4:
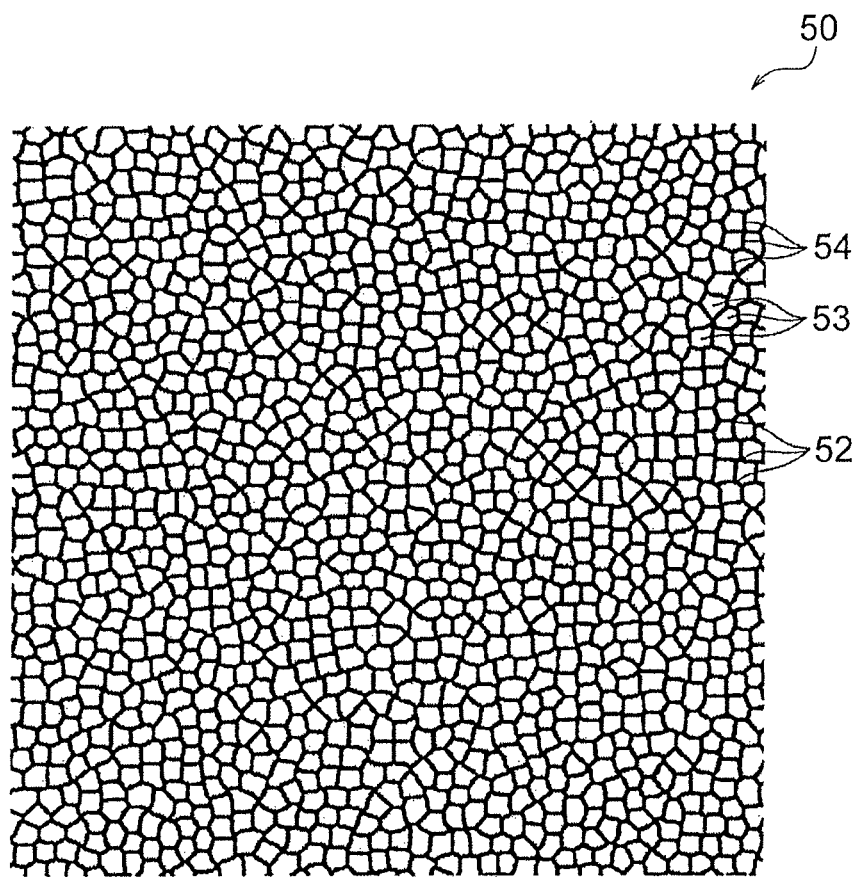
FIG. 4 is a plan view showing an example of a shape of a reference pattern which is referred to for determining a conductive pattern of the heating plate.

FIG. 4 is a plan view showing the reference pattern 50. As shown in FIG. 4, the reference pattern 50 is a mesh-like pattern defining a number of the opening areas 53. The reference pattern 50 includes a plurality of the line segments 54 that extend between the two branch points 52 to define the opening areas 53. Namely, the reference pattern 50 is an aggregation of a number of the line segments 54 each forming the branch points 52 at both ends thereof.

In the example shown in FIG. 4, a number of the opening areas 53 of the reference pattern 50 have shapes which do not have a repeated regularity (periodic regularity) and are arranged at pitches which do not have a repeated regularity (periodic regularity). Particularly in the illustrated example, the opening areas 53 are arranged so as to correspond to respective Voronoi areas in a Voronoi diagram obtained from generatrix points whose position coordinates in a plane have a predetermined random distribution. These randomly distributed generatrix points have a feature in which a distance between two adjacent generatrix points is distributed between a predetermined upper limit value and a predetermined lower limit value. In other words, the respective line segments 54 of the reference pattern 50 correspond to respective boundaries of the Voronoi areas in such a Voronoi diagram. In addition, the respective branch points 52 of the reference pattern 50 correspond to Voronoi points in the Voronoi diagram.

Since the Voronoi diagram can be obtained by the known methods disclosed in JP2012-178556A, JP2011-216378A and JP2012-151116A, for example, detailed description of the method of creating the Voronoi diagram is omitted herein.

FIG. 5 shows, in enlargement, a part of the conductive pattern 40 together with the reference pattern 50 shown in FIG. 4. Firstly, the respective branch points 42 of the conductive pattern 40 are disposed on the respective branch points 52 of the reference pattern 50. Then, the respective connection elements 44 of the conductive pattern 40 are disposed so as to connect the two branch points 42 corresponding to the two branch points 52 forming both ends of the line segments 54 of the reference pattern 50. Each connection element 44 may be formed to have a linear shape (straight line segment), a non-linear shape such as a curved shape or a shape formed by combining these shapes. For example, each connection element 44 may be formed to have, in addition to a part of a linear shape (straight line segment), a non-straight line shape such as a part of a quadratic curve such as arc, an elliptic arc, a parabolic arc and a hyperbolic arc, a part of a curve such as sine curve, a hyperbolic sine curve, a cycloid curve, an elliptic function curve, a Bessel function curve, and various corrugations, or a polygon. In all the connection elements 44 connecting the two branch points 42, a sum of values of lengths of straight lines (straight line segments) in the overall conductive pattern 40 is less than 20% of a sum of values of lengths measured along all the straight line segments and the non-straight line segments in all the connection elements 44. Namely, 80% or more of the connection elements 44 have a shape other than a linear shape (straight line segment), such as an arcuate shape, a polygonal line shape, a corrugated shape and so on.

In the example shown in FIG. 5, the conductive pattern 40 includes a plurality the branch points 42 arranged on the respective branch points 52 of the reference pattern 50, and a plurality of the connection elements 44 that extend between the two branch points 42 to define the opening areas 43. A total value of lengths of the straight line segments of the connection elements 44 connecting the two branch points 42 is less than 20% of a total value of lengths measured along each connection element of the plurality of connection elements 44. The conductive pattern 40 has a mesh-like pattern in which the plurality of connection elements 44 are arranged correspondingly to the respective line segments 54 of the reference pattern 50.

It is not necessary to specify a rate of the connection elements 44, which are straight lines (straight line segments) connecting the two branch points 42, relative to the plurality of connection elements 44, by checking all the area of the conductive pattern 40 and calculating the rate. Actually, it is possible to check the suitable number of elements to be checked in consideration of dispersion degree of elements, in a certain section having a planar dimension (an area) that is considered to be capable of reflecting a general tendency of a rate of the connection elements, which are straight lines (straight line segments) connecting the two branch points 42, relative to the plurality of connection elements 44, and calculate the rate. A value which was thus specified can be handled as a rate of the connection elements 44, which are straight lines (straight line segments) connecting the two branch points 42, relative to the plurality of connection elements 44. In the conductive pattern 40 in this embodiment, by observing 100 points included in an area of 300 mm×300 mm by means of an optical microscope or an electron microscope, a rate of the connection elements 44, which are straight lines (straight line segments) connecting the two branch points 42, relative to the plurality of connection elements 44 can be specified.

The material for constituting such a conductive pattern 40 may be selected from one or more of gold, silver, copper, platinum, aluminum, chrome, molybdenum, nickel, titanium, palladium, indium, tungsten and an alloy thereof, for example.

In the example shown in FIG. 3, the connection element 44 has a surface 44a on the side of the substrate 30, a surface 44b on the side opposed to the substrate 30, and side surfaces 44c and 44d. The connection element 44 has substantially a rectangular section in general. A width W of the connection element 44, i.e., the width W along the sheet plane of the substrate 30 is preferably not less than 1 µm and not more than 15 µm. More preferably, the width W is not more than 10 µm. Since the connection element 44 having such a width W is sufficiently thin, the conductive pattern 40 can be effectively made invisible. On the other hand, when the width W is too small, it is difficult to stably manufacture the connection elements. In addition, such a connection element can be easily broken by means of an external force or the like. Thus, the width W of the connection element 44 is preferably not less than 1 µm, and more preferably not less than 2 µm. Namely, when the width W of the connection element 44 is preferably not less than 1 µm and not more than 15 µm, and more preferably not less than 2 µm and not more than 10 µm, it is both possible that the conductive pattern 40 is invisible and that the connection elements can be stably manufactured while they are resistant to breakage. In addition, a height (thickness) H of the connection element 44, i.e., the height (thickness) H along the normal direction to the sheet plane of the substrate 30 is preferably not less than 1 µm and not more than 20 µm. Further, the height H of the connection element 44 is more preferably not less than 2 µm and not more than 20 µm. The height (thickness) of the connection element 44 can be said as a height (thickness) of the conductive pattern 40. Due to the connection element 44 having such a thickness (height) H, a sufficient conductivity can be ensured while a suitable resistance value is provided.

Figure 6:
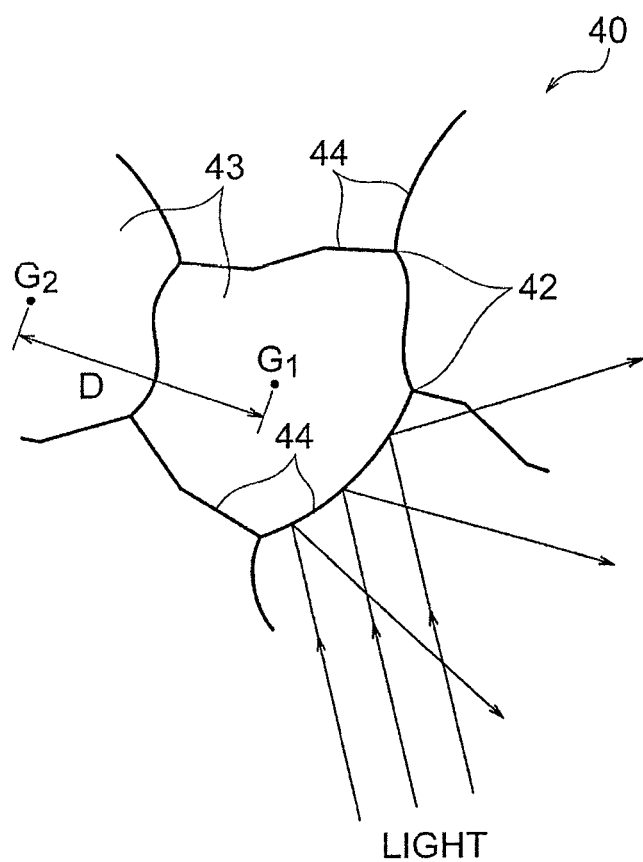
FIG. 6 is a view for explaining an operation of the conductive pattern in the first embodiment.

According to the above-described conductive pattern 40, as shown in FIG. 6, light incident on the side surface of the connection element 44 having a shape other than a linear shape (straight line segment), such as an arcuate shape, a polygonal line shape, a corrugated shape and so on, is reflected irregularly on the side surface. Thus, it can be restrained that the light incident on the side surface of the connection element 44 from a certain direction is reflected on the side surface in a certain direction correspondingly to the incident direction. Thus, it can be restrained that the reflected light is visible to an observer, so that the conductive pattern 40 having the connection elements 44 is visible to the observer. In particular, a total value of lengths of the straight line segments of the connection elements 44 connecting the two branch points 42 is less than 20% of a total value of lengths measured along each connection element of the plurality of connection elements 44. That is to say, 80% or more of the plurality of connection elements 44 have a shape other than a linear shape (straight line segment), such as an arcuate shape, a polygonal line shape, a corrugated shape and so on. In this case, it can be more effectively restrained that light reflected on the side surface of the connection element 44 is visible to an observer, so that the conductive pattern 40 having the connection elements 44 is visible to the observer.

In addition, when the connection element 44 has the height (thickness) H of not less than 1 µm, in particular, when the connection element 44 has the height H of not less than 2 µm, the light reflected on the side surface of the connection element 44 is more likely to be visible to an observer. Thus, in this case, in order to restrain that the light reflected on the side surface of the connection element 44 is visible to the observer, it is particularly effective that a rate of the connection elements 44, which are straight lines (straight line segments) connecting the two branch points 42, relative to the plurality of connection elements 44, is made to be less than 20%.

Further, when a distribution of the opening areas 43 is sparse so that an average length $D_{ave}$ between centers of gravity between the two adjacent opening areas 43 is longer, the length of each connection element 44 is also longer. When the length of each connection element 44 is longer, light reflected on the side surface of the connection element 44 in a certain direction is more visible. According to the research of the present inventors, when the average distance $D_{ave}$ between the centers of gravity between the two adjacent opening areas 43 is 80 λm or more, light reflected on the side surface of the connection element 44 tends to be visible to an observer. The average distance $D_{ave}$ may be 70 μm or more. Thus, in this case, in order to restrain that the light reflected on the side surface of the connection element 44 is visible to the observer, it is particularly effective that a rate of the connection elements 44, which are straight lines (straight line segments) connecting the two branch points 42, relative to the plurality of connection elements 44, is made to be less than 20%. The two adjacent opening areas 43 mean two adjacent opening areas 43 which share one connection element 44. In addition, the distance D between centers of gravity $G_1$, $G_2$ means a linear distance between the centers of gravity $G_1$, $G_2$.

A suitable range of the average distance $D_{ave}$ between the centers of gravity of the two adjacent opening areas 43 is set depending on properties required for the heating plate 10. In particular, when the uniformity in heat value of the conductive pattern 40 and the invisibility are required, the average distance $D_{ave}$ between the centers of gravity is preferably 800 μm or less, and more preferably 300 μm or less. On the other hand, when the average distance $D_{ave}$ between the centers of gravity is too small, a heat value per opening becomes excessive, and a visible light transmittance of the conductive pattern 40 lowers so that it is difficult for an observer to see the other side through the heating plate 10. Thus, the average distance $D_{ave}$ between the centers of gravity is 70 μm or more, in particular, 80 μm or more. Namely, when the average distance $D_{ave}$ between the centers of gravity is not less than 70 μm and not more than 800 μm, in particular, not less than 80 μm and not more than 300 μm, it is both possible that the conductive pattern is invisible, and a see-through property of the heating plate 10 is obtained while a heat value at each position in the conductive pattern can be made suitable and uniform.

Figure 89:
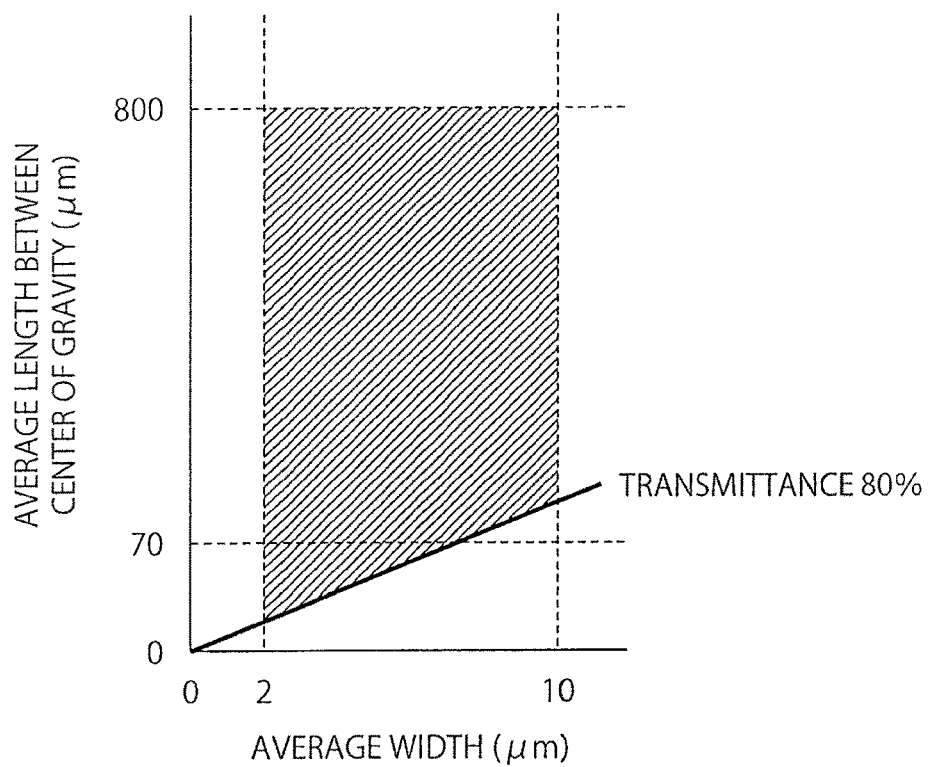
FIG. 89 is a graph showing a possible range which the heating plate according to the first embodiment of the present invention can take, with respect to an average line width of the connection elements and an average distance between centers of gravity of opening areas.

The graph of FIG. 89 shows a line at which the visible light transmittance of the conductive pattern 40 is 80%, with respect to the average line width of the connection elements 44 and the average distance $D_{ave}$ between centers of gravity of the opening areas 43. In the graph of FIG. 89, an inclination of the line showing a specific transmittance enlarges, as the transmittance value increases. Namely, an area in which the visible light transmittance is 80% or more is the line showing the visible light transmittance of 80% and an area above the line in the graph. When the visible light transmittance is in this area, the visible light transmittance of the heating plate 10 can be 70% or more.

Namely, when the average line width of the connection elements 44 is not less than 2 μm and not more than 10 μm, and the average distance $D_{ave}$ between centers of gravity of the opening areas 43 is 800 μm or less, the visible light transmittance of the heating plate 10 can be 70% or more whereby an excellent see-through property of the heating plate 10 can be ensured.

In the example shown in FIG. 3, the connection element 44 includes a first dark color layer 63 disposed on the substrate 30, a conductive metal layer 61 disposed on the first dark color layer 63, and a second dark color layer 64 disposed on the conductive metal layer 61. In other words, the surface of the conductive metal layer 61, which is located on the side of the substrate 30, is covered with the first dark color layer 63, and the surface of the conductive metal layer 61, which is located on the side opposed to the substrate 30, and both the side surfaces thereof are covered with the second dark color layer 64. The dark color layer 63, 64 may be a layer having a visible light reflectance lower than that of the conductive metal layer 61. For example, the dark color layer 63, 64 is a layer of a dark color such as black color. Owing to the dark color layers 63, 64, the conductive meal layer 61 can be more invisible, whereby a field of view of a passenger can be more suitably ensured.

Next, an example of a manufacturing method of the heating plate 10 is described with reference to FIGS. 7 to 13. FIGS. 7 to 13 are sectional views showing the example of the manufacturing method of the heating plate 10 in sequence.

Firstly, the sheet-like substrate 30 is prepared. The substrate 30 is an electrically insulating resin substrate that transmits light of a wavelength (380 nm to 780 nm) of a visible light wavelength band, which is generally recognized as transparent.

Figure 7:
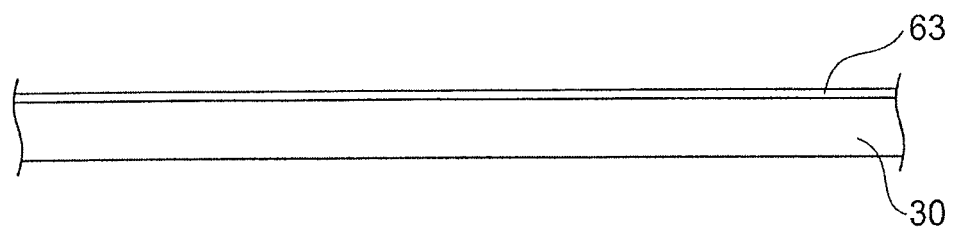
FIG. 7 is a view for explaining an example of a manufacturing method of the heating plate.

Then, as shown in FIG. 7, the first dark color layer 63 is disposed on the substrate 30. For example, the first dark color layer 63 can be disposed on the substrate 30 by a plating method including electrolytic plating and electroless plating, a spattering method, a CVD method, a PVD method, an ion plating method or a combination method of the two or more methods. Various known materials may be used as material of the first dark color layer 63. For example, the material may be copper nitride, copper oxide, nickel nitride and so on.

Figure 8:
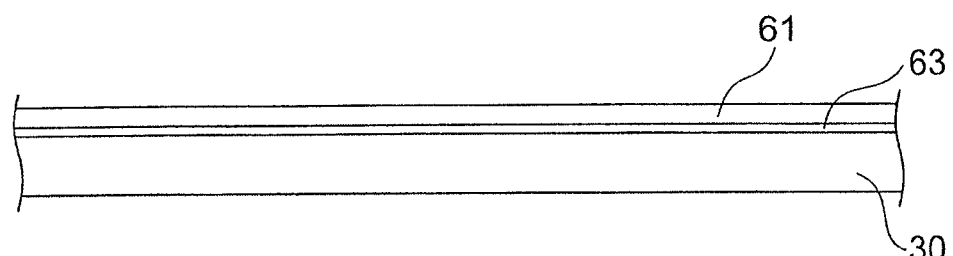
FIG. 8 is a view for explaining the example of the manufacturing method of the heating plate.

Next, as shown in FIG. 8, the conductive metal layer (conductive layer) 61 is disposed on the first dark color layer 63. As described above, the conductive metal layer 61 is a layer made of one or more of gold, silver, copper, platinum, aluminum, chrome, molybdenum, nickel, titanium, palladium, indium, tungsten and an alloy thereof. The conductive metal layer 61 may be formed by a known method. For example, there is employed a method of adhering a metal foil such as a copper foil by means of a weather-resistant adhesive or the like, a plating method including electrolytic plating and electroless plating, a spattering method, a CVD method, a PVD method, an ion plating method or a combination method of the two or more methods.

When the conductive metal layer 61 is formed of a metal foil such as a copper foil, the following method may be employed. Namely, the first color layer 63 is formed previously on one surface of the metal foil in advance. Then, the metal foil with the first dark color layer 63 is laminated on the substrate 30 through an adhesive layer or a glueing layer (pressure sensitive adhesive layer), such that the first color layer 63 faces the substrate 30. In this case, the first dark color layer 63 may be formed as follows. By subjecting a part of a material constituting the metal foil to a darkening treatment (blackening treatment), the first dark color layer 63 made of metallic oxide or metallic sulfide can be formed from the part constituting the metal foil. Alternatively, the first dark color layer 63 as a coating film made of a dark color material or a plated layer made of nickel or chrome may be disposed on a surface of the metal foil. In addition, the surface of the metal foil may be roughened, and the first dark color layer 63 may be disposed thereon.

Figure 9:
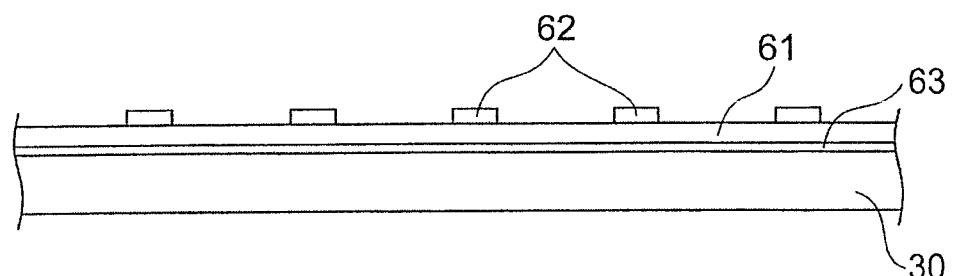
FIG. 9 is a view for explaining the example of the manufacturing method of the heating plate.

Then, as shown in FIG. 9, a resist pattern 62 is disposed on the conductive metal layer 61. The resist pattern 62 is a pattern that corresponds to a pattern of the conductive pattern 40 to be formed. In the method described herein, the resist pattern 62 is disposed only on a portion where the conductive pattern 40 is finally to be formed. The resist pattern 62 may be formed by a pattering method using a known photolithographic technique.

Figure 10:
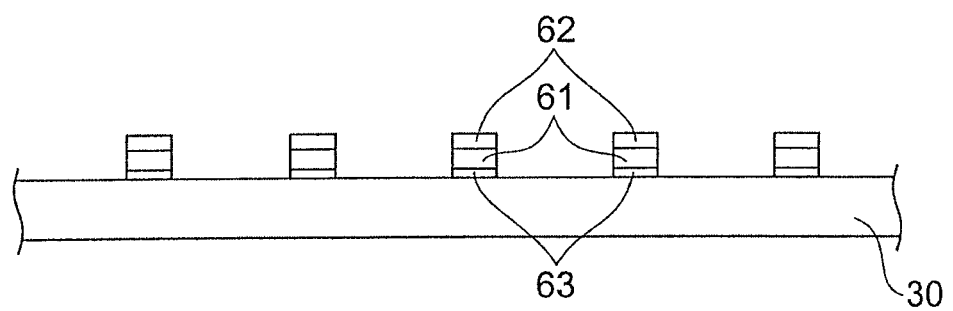
FIG. 10 is a view for explaining the example of the manufacturing method of the heating plate.
Figure 11:
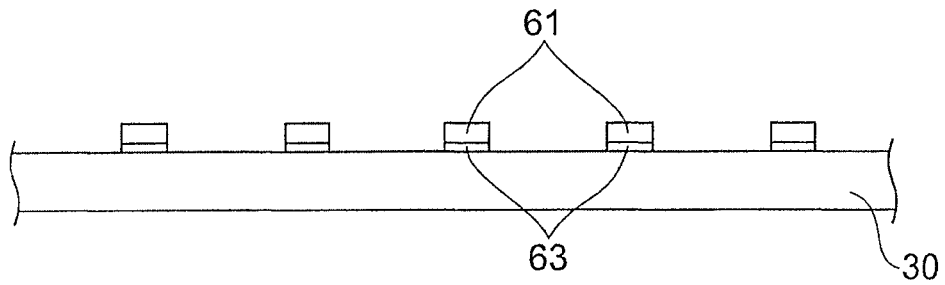
FIG. 11 is a view for explaining the example of the manufacturing method of the heating plate.

Then, as shown in FIG. 10, the conductive metal layer 61 and the first dark color layer 63 are etched with the resist pattern 62 serving as a mask. Due to this etching process, the conductive metal layer 61 and the first color layer 63 can be patterned substantially similar to the resist pattern 62. The etching method is not particularly limited, and a known method may be employed. The known method may be a wet etching method using etchant, a plasma etching method and so on. Thereafter, as shown in FIG. 11, the resist pattern 62 is removed.

Figure 12:
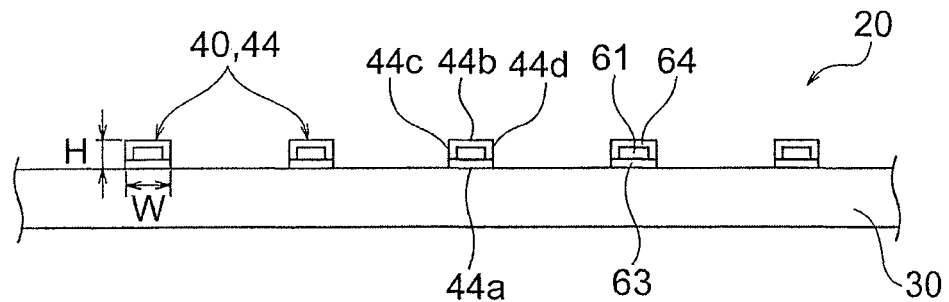
FIG. 12 is a view for explaining the example of the manufacturing method of the heating plate.
Figure 13:
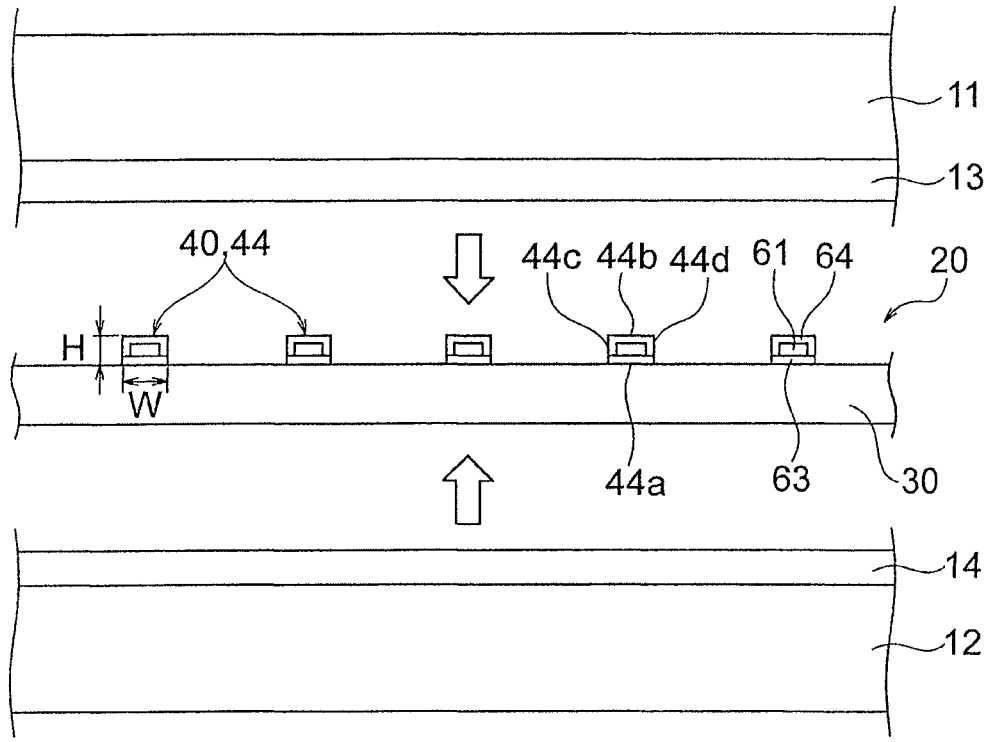
FIG. 13 is a view for explaining the example of the manufacturing method of the heating plate.
Figure 14:
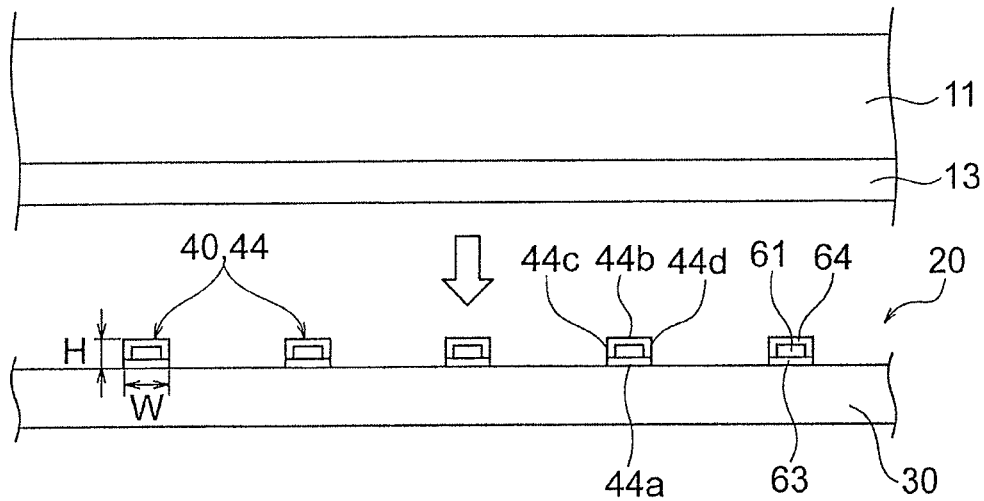
FIG. 14 is a view for explaining a modification example of the manufacturing method of the heating plate.

After that, as shown in FIG. 12, the second dark color layer 64 is formed on the surface 44*b* of the conductive metal layer 61 on the side opposed to the substrate 30 and the side surfaces 44*c*, 44*d*. The second dark color layer 64 may be formed as follows. By subjecting a part of a material constituting the conductive metal layer 61 to a darkening treatment (blackening treatment), the second dark color layer 64 made of metallic oxide or metallic sulfide can be formed from the part constituting the conductive metal layer 61. Alternatively, the second dark color layer 64 as a coating film made of a dark color material or a plated layer made of nickel or chrome may be disposed on a surface of the metal foil. In addition, the surface of the conductive metal layer 61 may be roughened, and the second dark color layer 64 may be disposed thereon.

In the manner as described above, the conductive pattern sheet 20 shown in FIG. 12 is manufactured.

Finally, the glass plate 11, the joint layer 13, the conductive pattern sheet 20, the joint layer 14 and the glass plate 12 are superposed in this order, and heated/pressurized. In the example shown in FIG. 13, firstly, the joint layer 13 is provisionally attached to the glass plate 11, and the joint layer 14 is provisionally attached to the glass plate 12. Then, the glass plate 11 to which the joint layer 13 has been provisionally attached, the conductive pattern sheet 20, the glass plate 12 to which the joint layer 14 has been provisionally attached, are superposed in this order and heated/pressurized, in such a manner that the side of the glass plate 11, to which the joint layer 13 has been provisionally attached, and the side of the glass plate 12, to which the joint layer 14 has been provisionally attached, face the conductive pattern sheet 20. Thus, the glass plate 11, the conductive pattern sheet 20 and the glass plate 12 are joined through the joint layers 13, 14, so that the heating plate 10 shown in FIG. 3 is manufactured.

The aforementioned heating plate 10 in the first embodiment includes the pair of glass plates 11, 12, the conductive pattern 40 disposed between the pair of glass plates 11, 12 and defining the plurality of opening areas 43, and the joint layers 13, 14 disposed between the conductive pattern 40 and at least one of the pair of glass plates 11, 12. The conductive pattern 40 includes the plurality of connection elements 44 that extend between the two branch points 42 to define the opening areas 43. A total value of lengths of the connection elements connecting the two branch points 42 as straight line segments is less than 20% of a total value of lengths measured along each connection element of the plurality of connection elements 44.

According to such a heating plate 10, as shown in FIG. 6, light incident on the side surface of the connection element 44 having a shape other than a linear shape (straight line segment), such as an arcuate shape, a polygonal line shape, a corrugated shape and so on, is reflected irregularly on the side surface. Thus, it can be restrained that the light incident on the side surface of the connection element 44 from a certain direction is reflected on the side surface in a certain direction correspondingly to the incident direction. Thus, it can be restrained that the reflected light is visible to an observer, so that the conductive pattern 40 having the connection elements 44 is visible to the observer.

The above first embodiment can be variously modified. Modification examples are described herebelow with reference suitably to the drawings. In the below description and the drawings for the description, a component that can be similarly made as the above embodiment is shown by the same symbol as a component corresponding to the above embodiment, and overlapped description is omitted.

A modification example of the manufacturing method of the heating plate 10 is described with reference to FIGS. 14 to 18. FIGS. 14 to 18 are sectional views showing the modification example of the manufacturing method of the heating plate 10 in sequence.

Firstly, the conductive pattern sheet 20 is manufactured. The conductive pattern sheet 20 may be manufactured by the method as described above in the example of the manufacturing method of the heating plate 10.

Figure 15:
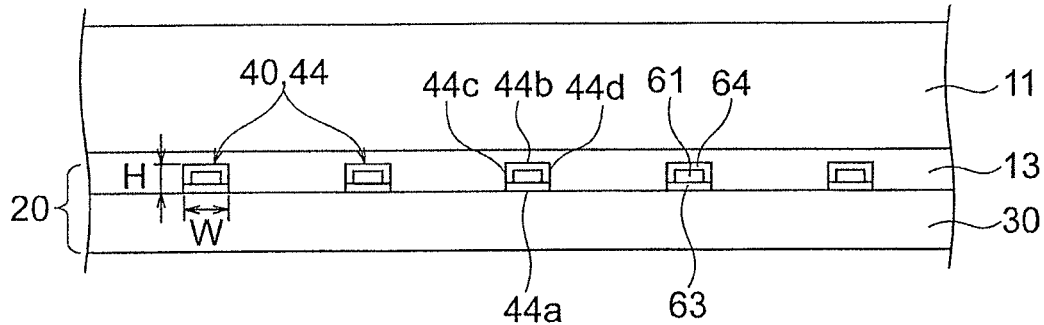
FIG. 15 is a view for explaining the modification example of the manufacturing method of the heating plate.

Then, the glass plate 11, the joint layer 13 and the conductive pattern sheet 20 are superposed in this order, and heated/pressurized. In the example shown in FIG. 14, the joint layer 13 is provisionally attached to the glass plate 11 firstly. Then, the glass plate 11 to which the joint layer 13 has been provisionally attached is superposed from the side of the conductive pattern 40 of the conductive pattern sheet 20 and heated/pressurized, in such a manner that the side of the glass plate 11, to which the joint layer 13 has been provisionally attached, faces the conductive pattern sheet 20. Thus, as shown in FIG. 15, the glass plate 11 and the conductive pattern sheet 20 are joined (provisionally joined or completely joined) through the joint layer 13.

Figure 16:
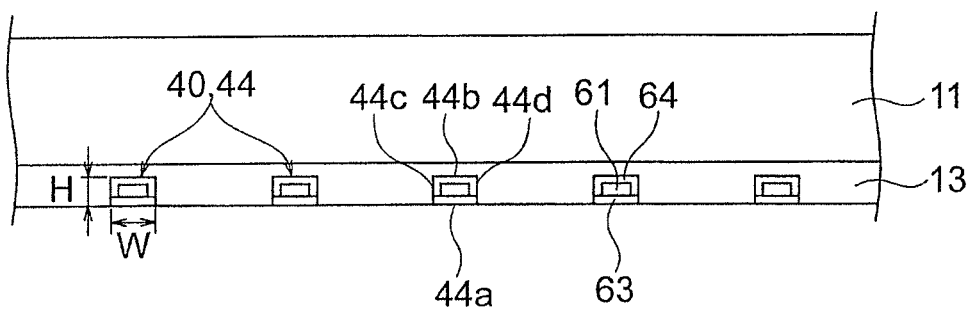
FIG. 16 is a view for explaining the modification example of the manufacturing method of the heating plate.
Figure 17:
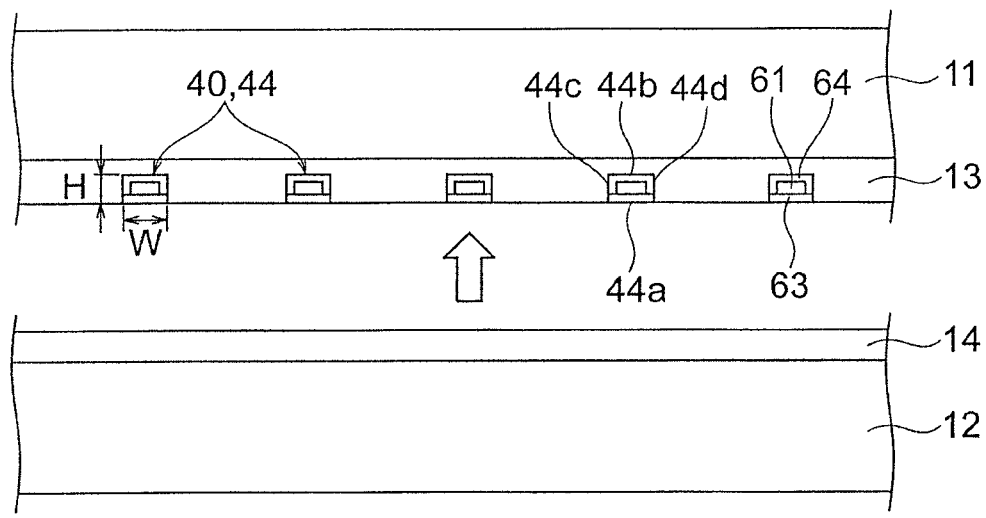
FIG. 17 is a view for explaining the modification example of the manufacturing method of the heating plate.

Then, as shown in FIG. 16, the substrate 30 of the conductive pattern sheet 20 is removed. For example, during the manufacture of the conductive pattern sheet 20, a peeling layer is formed on the substrate 30, and the conductive pattern 40 is formed on the peeling layer. Preferably, the peeling layer is not removed in the step in which the conductive metal layer 61 and the first dark color layer 63 are etched. In this case, the substrate 30 is joined to the conductive pattern 40 and the joint layer 13 through the peeling layer. In the step in which the substrate 30 is removed from the conductive pattern sheet 20, the substrate 30 of the conductive pattern sheet 20 is peeled from the conductive pattern 40 and the joint layer 13 by means of the peeling layer.

The peeling layer may be, for example, a peeling layer of an interface peeling type, a peeling layer of an interlayer peeling type, a peeling layer of a cohesion peeling type and so on. As a peeling layer of an interface peeling type, there may be suitably used a peeling layer having relatively a lower adhesive property to the conductive pattern 40 and the joint layer 13, than an adhesive property to the substrate 30. Such a layer may be a silicone resin layer, a fluororesin layer, a polyolefin resin layer and so on. In addition, it is possible to use a peeling layer having relatively a lower adhesive property to the substrate 30, than an adhesive property to the conductive pattern 40 and the joint layer 13. A peeling layer of an interlayer peeling type may be, for example, a peeling layer including a plurality of film layers, and having relatively a lower adhesive property between the plurality of layers, than an adhesive property to the conductive pattern 40, the joint layer 13 and the substrate 30. A peeling layer of a cohesion peeling type may be, for example, a peeling layer formed by dispersing fillers as a dispersal phase in a base resin as a continuous phase.

When a peeling layer of an interface peeling type including a layer having relatively a lower adhesive property to the conductive pattern 40 and the joint layer 13, than an adhesive property to the substrate 30, is used, a peeling phenomenon occurs between the peeling layer, and the conductive pattern 40 and the joint layer 13. In this case, it is possible to make the peeling layer not remain on the conductive pattern 40 and the joint layer 13. Namely, the substrate 30 is removed together with the peeling layer. When the substrate 30 and the peeling layer are removed in this manner, the joint layer 13 is exposed into the opening areas 43 of the conductive pattern 40.

On the other hand, when a peeling layer of an interface peeling type having relatively a lower adhesive property to the substrate 30, than an adhesive property to the conductive pattern 40 and the joint layer 13, is used, a peeling phenomenon occurs between the peeling layer and the substrate 30. When a peeling layer of an interlayer peeling type including a plurality of film layers, and having relatively a lower adhesive property between the plurality of layers, than an adhesive property to the conductive pattern 40, the joint layer 13 and the substrate 30, is used, a peeling phenomenon occurs between the plurality of layers. When a peeling layer of a cohesion peeling type, which is formed by dispersing fillers as a dispersal phase in a base resin as a continuous phase, is used, a peeling phenomenon occurs in the peeling layer by cohesion failure.

Finally, the glass plate 11, the joint layer 13 and the conductive pattern 40, the joint layer 14, and the glass plate 12 are superposed in this order, and heated/pressurized. In the example shown in FIG. 17, the joint layer 14 is attached to the glass plate 12 firstly. Then, the glass plate 11, the conductive pattern 40 and the joint layer 13, and the glass plate 12 to which the joint layer 14 has been provisionally attached are superposed in this order and heated/pressurized, in such a manner that the side of the glass plate 12, to which the joint layer 14 has been provisionally attached, faces the conductive pattern 40 and the joint layer 13. Thus, the glass plate 11, the conductive pattern 40, the glass plate 12 are joined (completely joined) through the joint layers 13, 14, whereby the heating plate 10 shown in FIG. 18 is manufactured.

Figure 18:
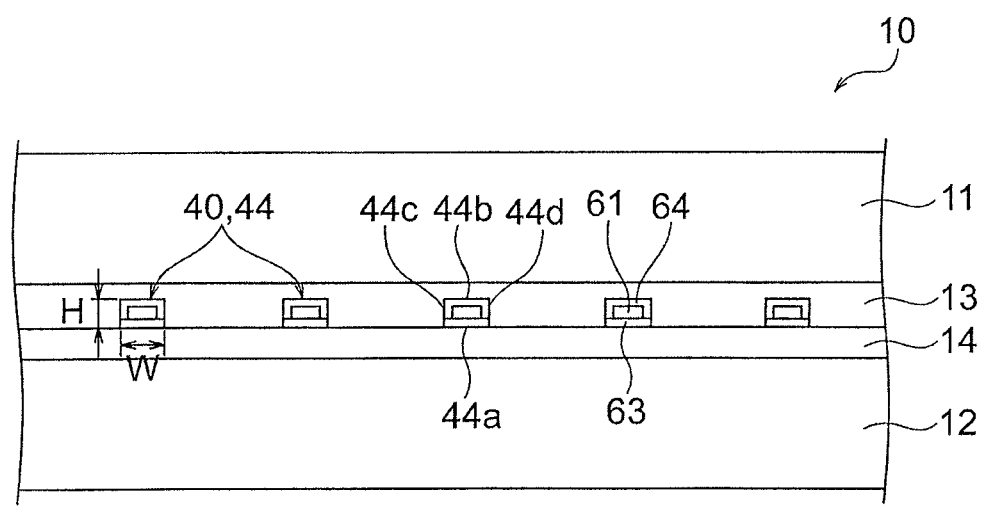
FIG. 18 is a view for explaining the modification example of the manufacturing method of the heating plate.

According to the heating plate 10 shown in FIG. 18, the heating plate 10 can be free of substrate 30. Thus, the thickness of the heating plate 10 as a whole can be reduced. In addition, the number of boundary faces in the heating plate 10 can be reduced. Thus, deterioration of optical properties, i.e., deterioration of visibility can be restrained.

Figure 19:
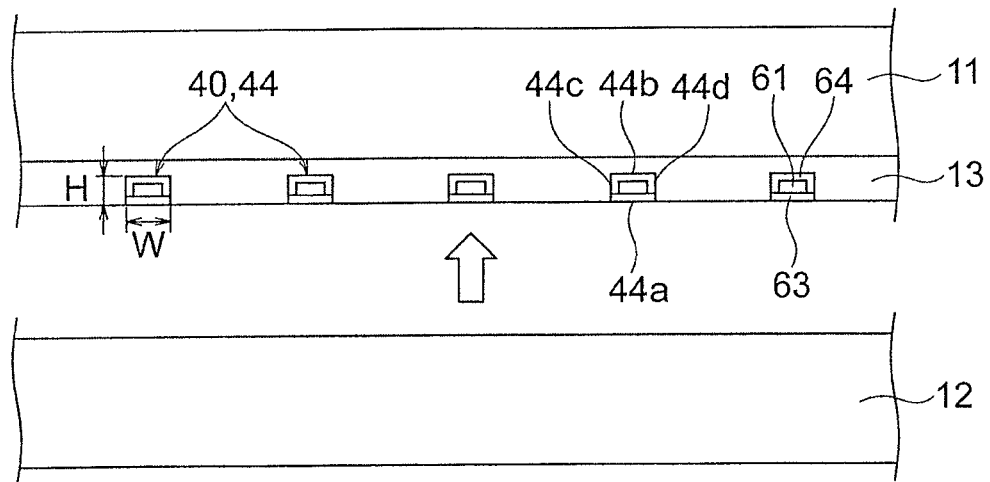
FIG. 19 is a view for explaining another modification example of the manufacturing method of the heating plate.
Figure 20:
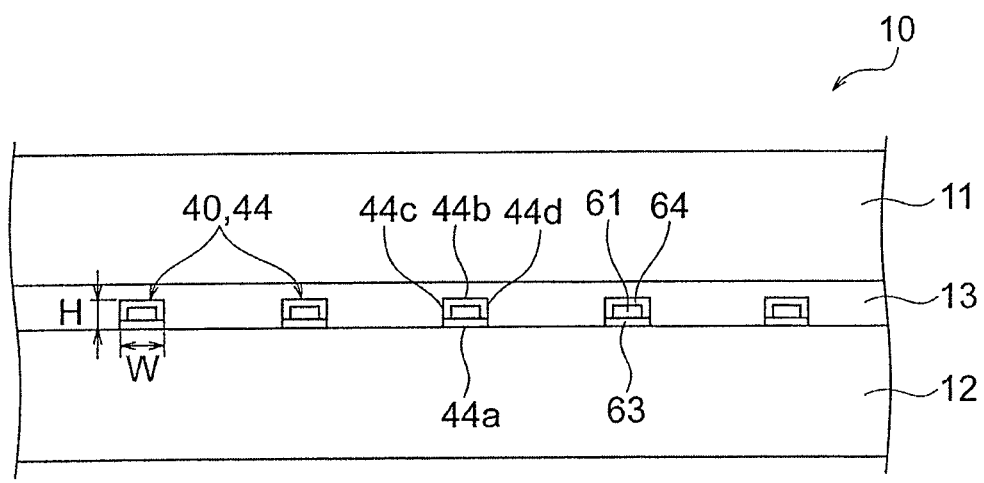
FIG. 20 is a view for explaining the other modification example of the manufacturing method of the heating plate.

Next, another modification example of the manufacturing method of the heating plate 10 is described with reference to FIGS. 19 and 20. FIGS. 19 and 20 are sectional views showing the other modification example of the manufacturing method of the heating plate 10 in sequence.

Firstly, by the same steps as those of the above modification example of the manufacturing method of the heating plate 10, the glass plate 11 and the conductive pattern sheet 20 are joined (provisionally joined) through the joint layer 13. Then, the substrate 30 is removed therefrom. Namely, the laminate of glass plate 11, the conductive pattern 40 and the joint layer 13 is obtained, which is described in the above modification example of the manufacturing method of the heating plate 10 with reference to FIG. 16.

Then, as shown in FIG. 19, the glass plate 11, the joint layer 13 and the conductive pattern 40, and the glass plate 12 are superposed in this order, and heated/pressurized. Thus, the glass plate 11 and the conductive pattern 40 are joined (completely joined) through the joint layer 13, and the glass plate 11 and the glass plate 12 are joined (completely joined) through the joint layer 13. Thus, the heating plate 10 shown in FIG. 20 is manufactured.

According to the heating plate 10 shown in FIG. 20, the heating plate 10 can be free of the substrate 30 and the joint layer 14. Thus, the thickness of the heating plate 10 as a whole can be further reduced. In addition, the number of boundary faces in the heating plate 10 can be further reduced. Thus, deterioration of optical properties, i.e., deterioration of visibility can be furthermore effectively restrained. Moreover, since the conductive pattern 40 and the glass plate 12 are in contact with each other, a heating efficiency of the glass plate 12 by the conductive pattern 40 can be increased.

Figure 21:
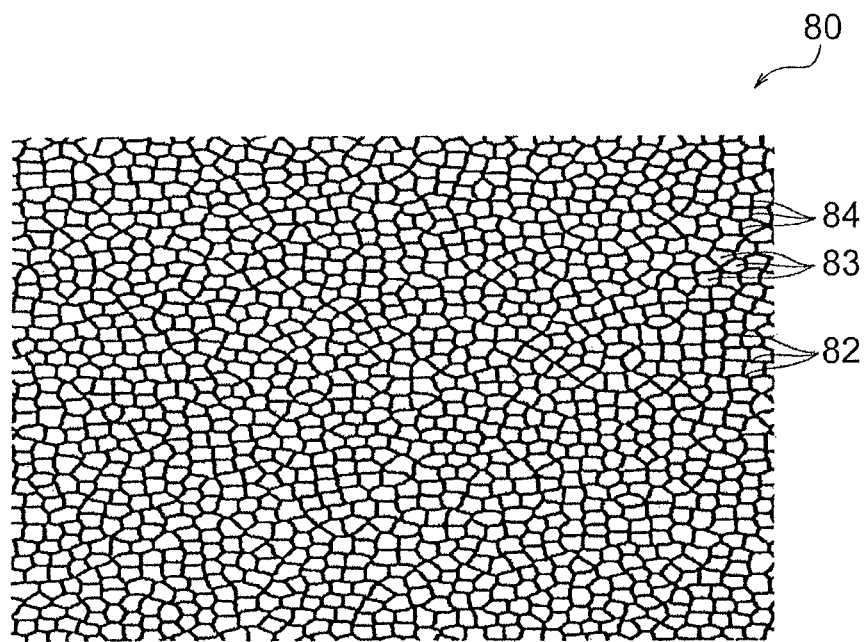
FIG. 21 is a plan view showing a modification example of the reference pattern.

As another modification example, FIG. 21 shows a modification example of the reference pattern. As shown in FIG. 21, a reference pattern 80 is a mesh-like pattern defining a number of opening areas 83. The reference pattern 80 includes a plurality of line segments 84 that extend between two branch points 82 to define the opening areas 83. Namely, the reference pattern 80 is an aggregation of a number of the line segments 84 each forming the branch points 82 at both ends thereof. Particularly in the illustrated example, the reference pattern 80 has a shape obtained by elongating the reference pattern 50 shown in FIG. 4 along a first direction (X). In other words, the reference pattern 80 has a shape obtained by compressing the reference pattern 50 shown in FIG. 4 along a second direction (Y) perpendicular to the first direction (X).

Figure 22:
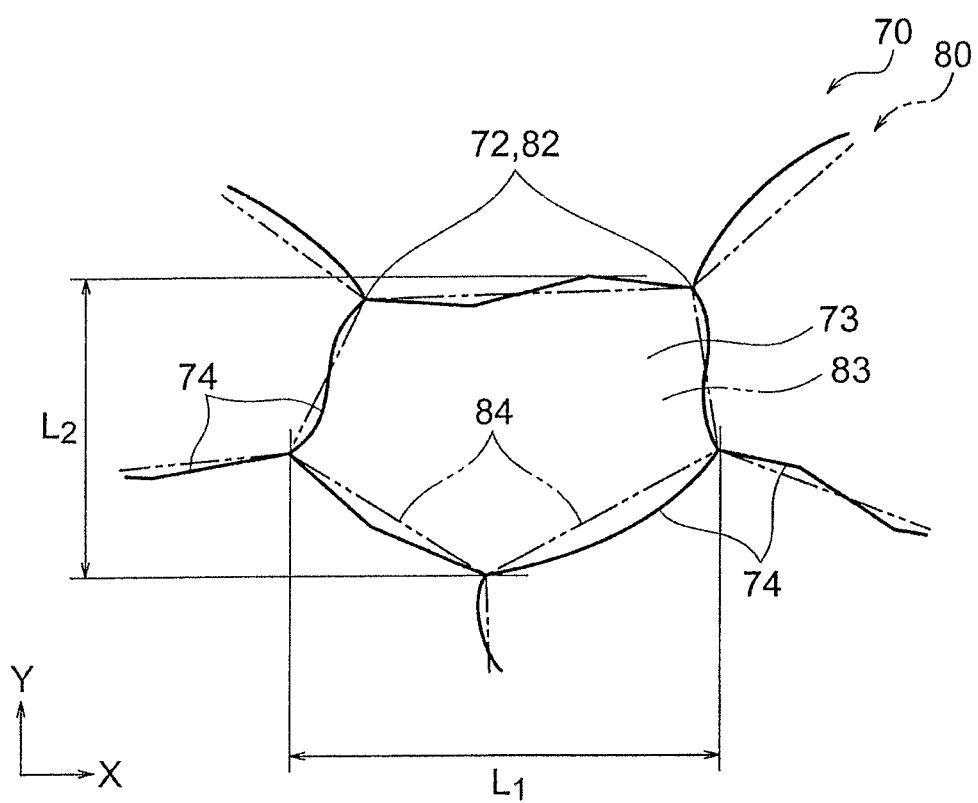
FIG. 22 is an enlarged view showing a part of the conductive pattern together with the reference pattern shown in FIG. 21.
Figure 23:
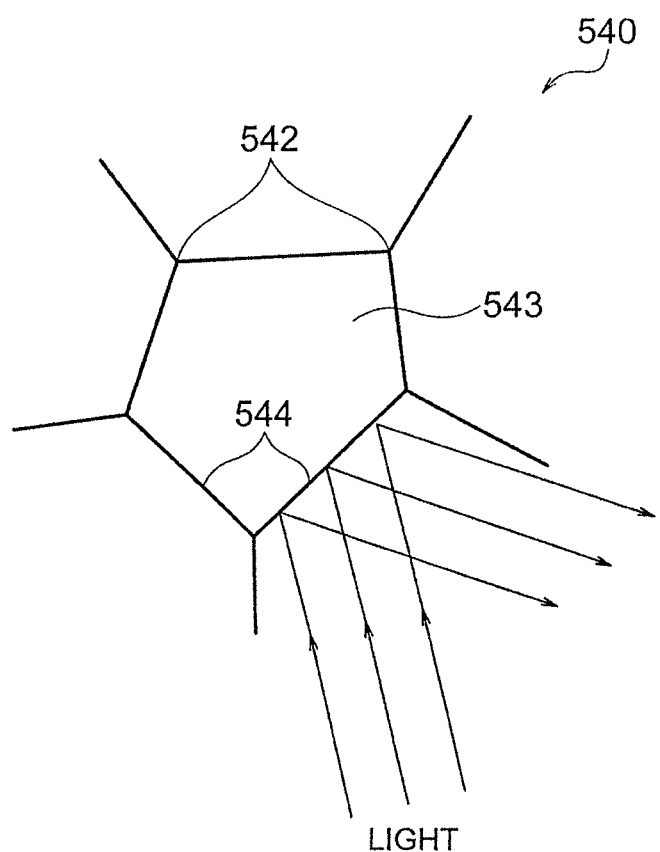
FIG. 23 is a view for explaining a conventional technique.

A part of a conductive pattern 70, which is determined by the method described above with reference to FIG. 5, based on the reference pattern 80 is shown in enlargement in FIG. 22 together with a corresponding part of the reference pattern 80. In the example shown in FIG. 22, the conductive pattern 70 includes a plurality of branch points 72 arranged on the respective branch points 82 of the reference pattern 80, and a plurality of connection elements 74 that extend between the two branch points 72 to define opening areas 73. A total value of lengths of the straight line segments of the connection elements connecting the two branch points 72 is less than 20% of a total value of lengths measured along each connection element of the plurality of connection elements 74. The conductive pattern 70 has a mesh-like pattern on which the plurality of connection elements 74 are arranged correspondingly to the respective line segments 84 of the reference pattern 80.

In the example shown in FIG. 22, an average of ratio ($L_1/L_2$) of a length $L_1$ of each opening area 73 of the conductive pattern 70 along the first direction (X), relative to a length $L_2$ of the opening area 73 along the second direction (Y) perpendicular to the first direction (X), is not less than 1.3 and not more than 1.8. When the conductive pattern 70 includes the opening area 73 of such a dimension, light reflected on the side surface of the connection element 74 is more likely to be visible to an observer. Thus, in this case, in order to restrain that the light reflected on the side surface of the connection element 74 is visible to the observer, it is particularly effective that a rate of the connection elements, which are straight lines (straight line segments) connecting the two branch points 72, relative to the plurality of connection elements 74 is made to be less than 20%.

It is not necessary to specify the respective dimensions of the conductive pattern 40, 70, such as an average distance $D_{ave}$ between centers of gravity of the two adjacent opening areas 43, and an average of ratio ($L_1/L_2$) of a length $L_1$ of each opening area 73 of the conductive pattern 70 along the first direction (X) relative to a length $L_2$ of the opening area 73 along the second direction (Y) perpendicular to the first direction (X), by checking all the areas of the conductive pattern 40, 70 and calculating average values. Actually, it is possible to check the suitable number of elements to be checked (an average distance $D_{ave}$ between centers of gravity of the two adjacent opening areas 43, and an average of ratio ($L_1/L_2$) of a length $L_1$ of each opening area 73 of the conductive pattern 70 along the first direction (X) relative to a length $L_2$ of the opening area 73 along the second direction (Y) perpendicular to the first direction (X)) in consideration of dispersion degree of elements to be checked, in a certain section having a planar dimension (an area) that is considered to be capable of reflecting a general tendency of the elements to be checked, and calculate average values. Values which were thus specified can be handled as an average distance $D_{ave}$ between centers of gravity of the two adjacent opening areas 43, and an average of ratio ($L_1/L_2$) of a length $L_1$ of each opening area 73 of the conductive pattern 70 along the first direction (X) relative to a length $L_2$ of the opening area 73 along the second direction (Y) perpendicular to the first direction (X). In the conductive pattern 40, 70 in this embodiment, by observing 100 points included in an area of 300 mm×300 mm by means of an optical microscope or an electron microscope, and calculating average values, respective dimensions of the conductive pattern 40, 70 can be specified.

As an anther modification example, in the above-described first embodiment, the conductive pattern 40, 70 has a pattern determined based on the Voronoi diagram, i.e., a number of the opening areas 53, 83 which have shapes which do not have a repeated regularity (periodic regularity) and are arranged at pitches which do not have a repeated regularity (periodic regularity). However, not limited to this pattern, there may be used, as the conductive pattern, various patterns such as a pattern in which triangular, rectangular, or hexagonal opening areas of the same shape are regularly arranged, a pattern in which opening areas of different shapes are regularly arranged, and so on.

In addition, in the example shown in FIGS. 7 to 20, the second dark color layer 64 provides the surface 44b of the connection element 44, which is opposed to the substrate 30, and the side surfaces 44c, 44d thereof. However, not limited thereto, the second dark color layer 64 may provide only the surface 44b of the connection element 44, which is opposed to the substrate 30, or the side surfaces 44c, 44d thereof. When the second dark color layer 64 provides only the surface 44b of the connection element 44, which is opposed to the substrate 30, the second dark color layer 64 and the resist pattern 62 are disposed in this order on the conductive metal layer (conductive layer) 61, after the step shown in FIG. 8, for example. Thereafter, the second dark color layer 64, the conductive metal layer 61 and the first dark color layer 63 may be etched with the resist pattern 62 serving as a mask. Alternatively, when the second dark color layer 64 provides only the side surfaces 44c, 44d of the connection element 44, the second dark color layer 64 is formed without removing the resist pattern 62, after the step shown in FIG. 10, for example, and thereafter the resist pattern 62 is removed. When the first dark color layer 63 is not necessary, the step of disposing the first dark color layer 63 on the substrate 30, which is shown in FIG. 7, may be omitted.

The heating plate 10 may be used in a rear window, a side window and a sun roof of the automobile 1. In addition, the heating plate 10 may be used in a window of a vehicle other than an automobile, such as a railway (train), an aircraft, a vessel, a space vessel and so on.

Further, in addition to a vehicle, the heating plate 10 may be used in a part by which an inside and an outside is partitioned, such as a window of a building, a store and a house.

Although some modification examples of the above first embodiment are described, the modification examples can be naturally combined with one another for application.

Second Embodiment

FIG. 1 and FIGS. 24 to 42 are views for explaining a second embodiment according to the present invention. In the second embodiment described below, a component corresponding to that of the first embodiment is shown by a symbol in 100s with the same last two digits, and overlapped description is omitted.

Figure 24:
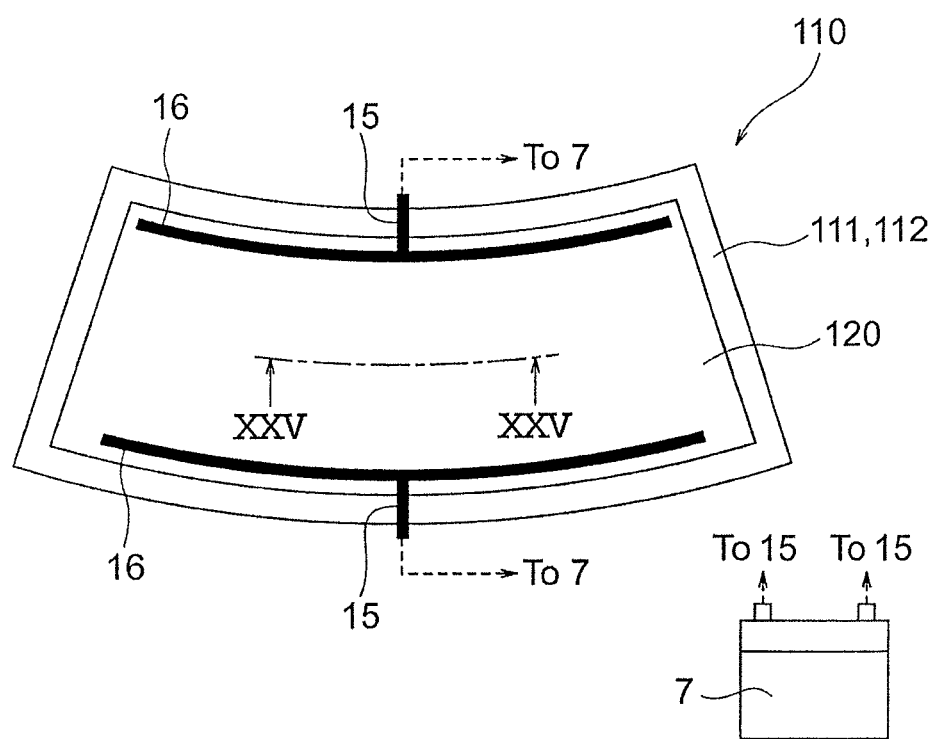
FIG. 24 is a view for explaining a second embodiment according to the present invention, showing the heating plate when viewed in a normal direction of a plate plane thereof.
Figure 25:
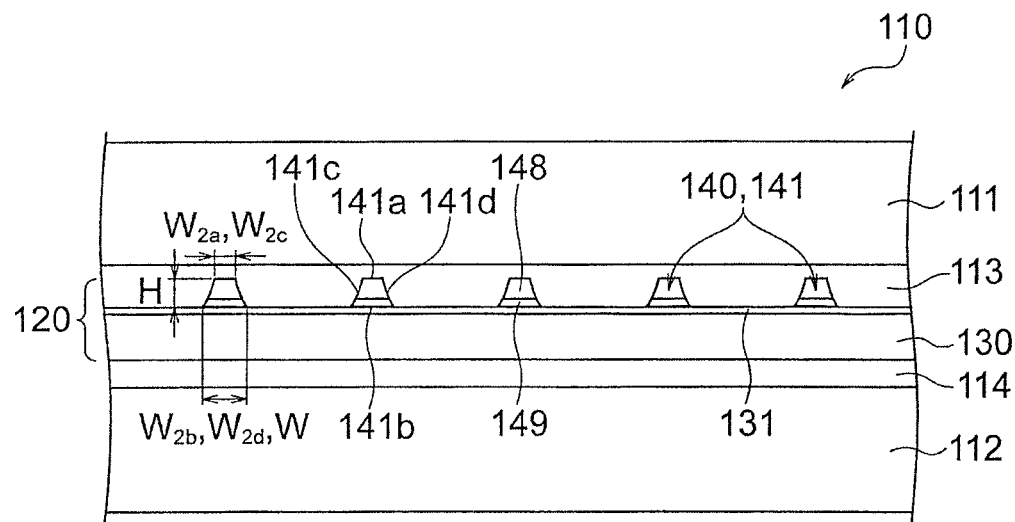
FIG. 25 is a cross-sectional view of the heating plate of FIG. 2.

FIG. 24 is a view of a heating plate when viewed in a normal direction of a plate plane thereof. FIG. 25 is a sectional view of the heating plate of FIG. 24. The heating plate in this embodiment is sometimes referred to as "laminated glass".

FIG. 24 shows a heating plate 110 when viewed in a normal direction of a plate plane thereof. FIG. 25 is a cross-sectional view corresponding to a XXV-XXV line of the heating plate 110 of FIG. 24. In the example shown in FIG. 25, the heating plate 110 includes a pair of glass plates 111, 112, a conductive pattern sheet (pattern sheet) 120 disposed between the pair of glass plates 111, 112, a joint layer 113 that joins the glass plate 111 and the conductive pattern sheet 120, and a joint layer 114 that joins the glass plate 112 and the conductive pattern sheet 120. In the example shown in FIGS. 1 and 24, the heating plate 110 is curved. However, FIGS. 25 and 35 to 42 planarly show the heating plate 110 and the glass plates 111, 112, for simplifying the illustration and facilitating the understanding.

The conductive pattern sheet 120 includes a sheet-like substrate 130, a holding layer 131 laminated on the substrate 130, a conductive pattern (conductive pattern member) 140 formed on the holding layer 131, a wiring part 15 for powering the conductive pattern 140, and a connection part 16 connecting the conductive pattern 140 and the wiring part 15.

In the example shown in FIGS. 24 and 25, the conductive pattern 140 is powered by a power source 7, such as a battery, through the wiring part 15 and the connection part 16, so that the conductive pattern 140 generates heat by means of resistance heat. The heat generated by the conductive pattern 140 is transmitted to the glass plates 111, 112 through the joint layers 113, 114, so that the glass plates 111, 112 are warmed up. Thus, dew drops on the glass plates 111, 112 can be removed so that the glass plates 111, 112 can be defogged. When there is snow or ice on the glass plates 111, 112, the snow or ice can be unfrozen. Thus, an excellent field of view of a passenger can be ensured.

Particularly when used as a front window of an automobile, the glass plate 111, 112 preferably has a high visible light transmittance, in order not to hinder a field of view of a passenger. A material of such a glass plate 111, 112 may be soda lime glass, blue plate glass and so on, for example. The glass plate 111, 112 preferably has a transmittance of 90% or more in a visible light area. The visible light transmittance is specified as follows. The visible light transmittance of the glass plate 111, 112 is specified as follows. Transmittance of light with measurement wavelength range of from 380 nm to 780 nm is measured by using a spectrophotometer (manufactured by Shimadzu Corporation, "UV-3100PC", compliant with JIS K 0115). The visible light transmittance is an average value of the transmittances at the respective wavelengths. The visible light transmittance may be lowered by partially or totally coloring the glass plate 111, 112, for example. In this case, direct sunlight can be shielded and an inside of the automobile is less visible from outside.

In addition, the glass plate 111, 112 preferably has a thickness of not less than 1 mm and not more than 5 mm. With such a thickness, the glass plate 111, 112 excellent in strength and optical properties can be obtained.

The glass plates 111, 112 and the conductive pattern sheet 120 are joined to each other through the joint layers 113, 114, respectively. As such a joint layer 113, 114, a layer made of a material having various adhesion properties or glueing (pressure sensitive adhesive) properties. In addition, the joint layer 113, 114 preferably has a high visible light transmittance. A typical joint layer may be a layer made of polyvinyl butyral (PVB), for example. The joint layer 113, 114 preferably has a thickness of not less than 0.15 mm and not more than 0.7 mm.

Not limited to the illustrated example, the heating plate 110 may be provided with another function layer for exerting a specific function. In addition, one function layer may exert two or more functions. Alternatively, for example, a function may be given to at least one of the glass plate 111, 112 of the heating plate 110, the joint layer 113, 114 thereof, and the substrate 130 of the conductive pattern sheet 120 thereof, which is described later. The function that can be given to heating plate 110 may be an antireflection (AR) function, a hard coat (HC) function having an abrasion resistance, an infrared ray shield (reflection) function, an ultraviolet ray shield (reflection) function, a polarizing function, an antifouling function and so on, for example.

Next, the conductive pattern sheet 120 is described. The conductive pattern sheet 120 includes the sheet-like substrate 130, the holding layer 131 laminated on the substrate 130, the conductive pattern 140 formed on the holding layer 131, the wiring part 15 for powering the conductive pattern 140, and the connection part 16 connecting the conductive pattern 140 and the wiring part 15. The conductive pattern sheet 120 may have a planar dimension (an area) substantially the same as that of the glass plate 111, 112 so as to be placed all over the heating plate 110. Alternatively, the conductive pattern sheet 120 may be placed over only a part of the heating plate 110, such as a part in front of a driver's seat.

The sheet-like substrate 130 functions as a substrate that supports the holding layer 131 and the conductive pattern 140. The substrate 130 is an electrically insulating substrate that transmits light of a wavelength (380 nm to 780 nm) of a visible light wavelength band, which is generally recognized as transparent. In the example shown in FIGS. 24, 26 and 27, the substrate 130 has substantially the same dimensions as those of the glass plate 111, 112 and has substantially a trapezoidal planar shape.

Any resin can be used as a resin to be contained in the substrate 130, as long as it transmits visible light and can suitably support the holding layer 131 and the conductive pattern 140. Preferably, a thermoplastic resin may be used. The thermoplastic resin may be an acryl resin made of, e.g., polymethyl methacrylate, a polyester resin made of, e.g., polyvinyl chloride, polyethylene terephthalate or amorphous polyethylene terephthalate (A-PET), a polyethylene resin, a polyolefin resin made of, e.g., polypropylene, a cellulose-based resin made of, e.g., triacetyl cellulose (cellulose triacetate), a polystyrene or polycarbonate resin, an AS resin and so on, for example. In particular, an acryl resin and a polyvinyl chloride are preferred because of their excellent etching resistance, weather resistance and light resistance.

In addition, in consideration of support property and light transmission of the conductive pattern 140, the substrate 130 preferably has a thickness of not less than 0.03 mm and not more than 0.3 mm.

The holding layer 131 has a function for improving a joint property between the substrate 130 and the conductive pattern 140 to hold the conductive pattern 140. The holding layer 131 may be formed either by laminating a transparent electrically insulating resin sheet with the substrate 130 or by coating the substrate 130 with a resin material. The holding layer 131 may be made of, e.g., polyvinyl butyral (PVB), a two-pack curable urethane adhesive, or a two-pack curable epoxy adhesive. In addition, as described below, when the conductive pattern sheet 120 is joined (provisionally joined) to the glass plate 111 through the joint layer 113 and then the substrate 130 is peeled, the holding layer 131 may include a peeling layer. A thickness of the holding layer 131 may be not less than 1 μm and not more than 100 μm, in consideration of a light transmission and a joint property to the substrate 130 and the conductive pattern 140. Preferably, the thickness of the holding layer 131 may be not less than 1 μm and not more than 15 μm.

Figure 26:
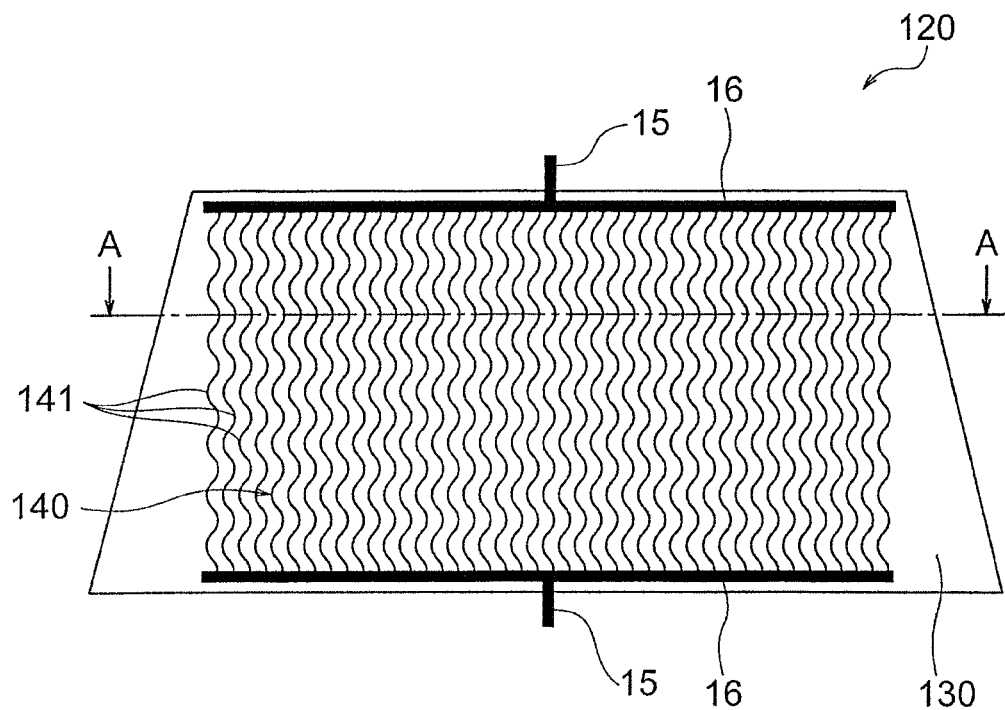
FIG. 26 is a plan view showing an example of a pattern shape of the conductive pattern of the heating plate.
Figure 27:
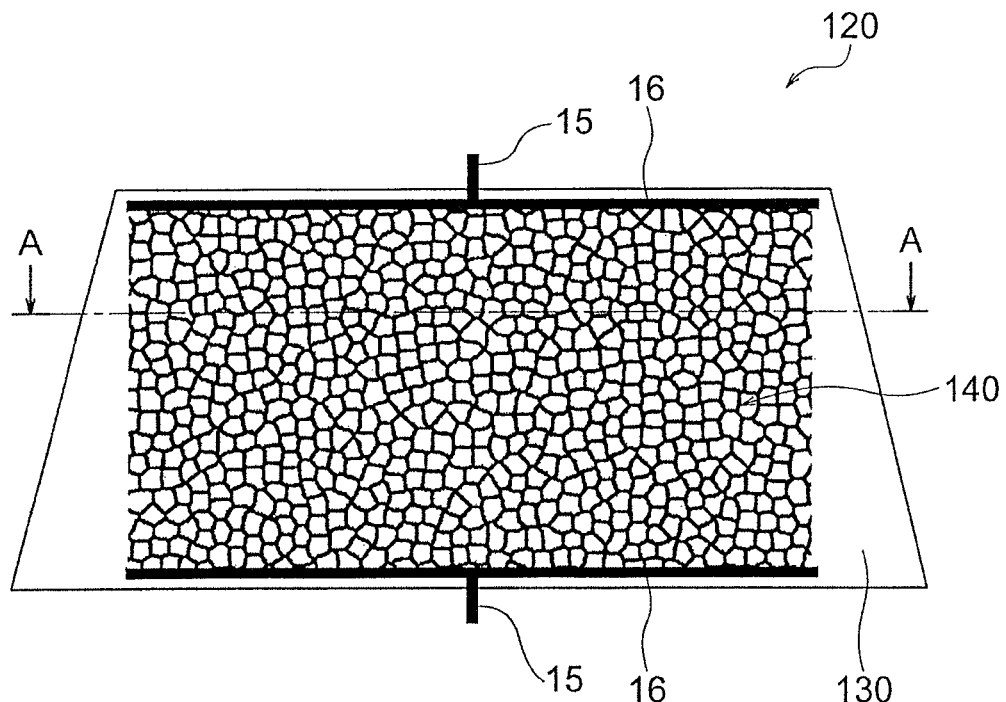
FIG. 27 is a plan view showing another example of the pattern shape of the conductive pattern of the heating plate.
Figure 28:
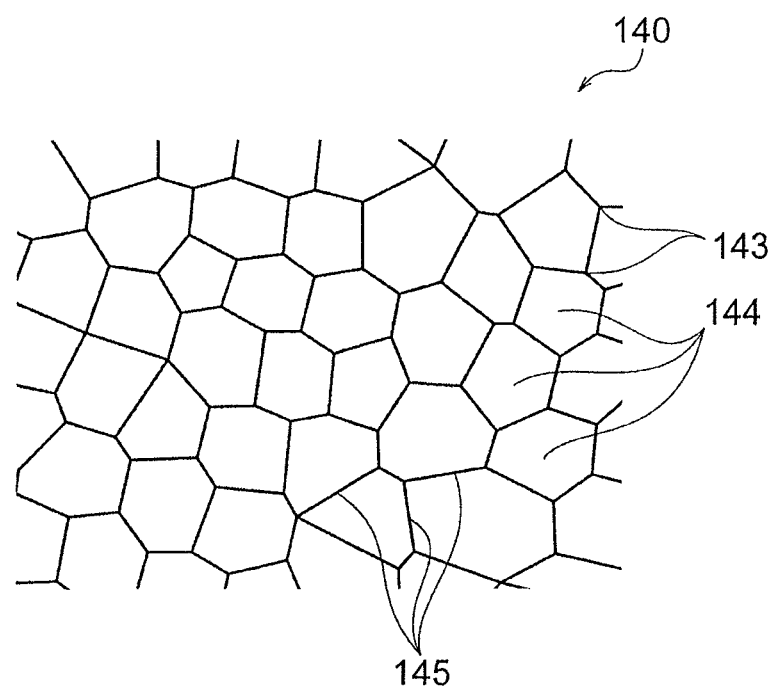
FIG. 28 is an enlarged view showing a part of the conductive pattern of FIG. 27.

The conductive pattern 140 is described with reference to FIGS. 26 to 28. FIGS. 26 and 27 are plan views of the conductive pattern sheet 120 when viewed in a normal direction of a sheet plane thereof. FIG. 28 is a view showing in enlargement a part of the conductive pattern 140 of FIG. 27.

The conductive pattern 140 is powered by the power source 7, such as a battery, through the wiring part 15 and the connection part 16, so as to generate heat by means of resistance heat. The heat is transmitted to the glass plates 111, 112 through the joint layers 113, 114, so that the glass plates 111, 112 are warmed up.

FIG. 26 shows an example of a pattern shape of the conductive pattern 140. In the example shown in FIG. 26, the conductive pattern 140 includes a plurality of thin conductive wires 141 connecting a pair of the connection parts 16. In the illustrated example, each of the plurality of thin conductive wires 141 extends in a corrugated pattern from the one connection part 16 to the other connection part 16. The thin conductive wires 141 are arranged apart from one another in a direction not in parallel with a direction in which the thin conductive wires 141 extend. In particular, the thin conductive wires 141 are arranged perpendicular to the direction in which the thin conductive wires 141 extend. In place of the corrugated shape, each thin conductive wire 141 may extend between the pair of connection parts 16 in a linear pattern, a polygonal line pattern or a sine wave pattern. The thin conductive wires 141, which are adjacent to each other in a direction not in parallel with the direction in which the thin conductive wires 141 extend, may be connected via a thin wire, i.e., a connection wire.

FIGS. 27 and 28 show another example of a pattern shape of the conductive pattern 140. In the example shown in FIGS. 27 and 28, the thin conductive wires 141 of the conductive pattern 140 are arranged in a mesh-like pattern defining a number of opening areas 144. The conductive pattern 140 includes a plurality of connection elements 145 that extend between two branch points 143 to define the opening areas 144. Namely, the reference pattern 140 is an aggregation of a number of the connection elements 145 each forming the branch points 143 at both ends thereof.

In the example shown in FIGS. 27 and 28, a number of the opening areas 144 of the conductive pattern 140 have shapes which do not have a repeated regularity (periodic regularity) and are arranged at pitches which do not have a repeated regularity (periodic regularity). Particularly in the illustrated example, the opening areas 144 are arranged so as to correspond to respective Voronoi areas in a Voronoi diagram obtained from generatrix points whose position coordinates in a plane have a predetermined random two-dimensional distribution. These randomly distributed generatrix points have a feature in which a distance between two adjacent generatrix points is distributed between a predetermined upper limit value and a predetermined lower limit value. In other words, the respective connection elements 145 of the conductive pattern 140 correspond to respective boundaries of the Voronoi areas in such a Voronoi diagram. In addition, the respective branch points 143 of the conductive pattern 140 correspond to Voronoi points in the Voronoi diagram. Since the Voronoi diagram can be obtained by the known methods disclosed in JP2012-178556A and JP2013-238029A, for example, a detailed description of the method of creating the Voronoi diagram is omitted herein.

When a conductive pattern has a number of opening areas that have shapes having a repeated regularity (periodic regularity), such as a tetragonal lattice arrangement or a honeycomb arrangement, and are arranged at pitches having a repeated regularity (periodic regularity), light beam stripes are sometimes visible because of the repeated regularity of the arrangement of the opening areas. These visible light beam stripes are caused when light enters a heating plate from a side opposite to an observer, e.g., when light of a headlight of an oncoming automobile enters a front window of the automobile, the light is dispersed to light beam stripes along a predetermined pattern such as a stripe pattern on the heating plate so that the light beam stripes can be seen. In particular, when a number of the opening areas of the conductive pattern have shapes having a repeated regularity and are arranged at pitches having a repeated regularity, such light beam stripes tend to be easily visible. The fact that the light beam stripes are visible to an observer such as a driver deteriorates a visibility of the observer through the pane. On the other hand, as shown in FIGS. 27 and 28, the conductive pattern 140 having a number of the opening areas 144 of the conductive pattern 140 have shapes which do not have a repeated regularity and are arranged at pitches which do not have a repeated regularity can effectively restrain generation of light beam stripes in the heating plate 110.

In the conductive pattern 140 shown in FIGS. 27 and 28, an average of the number of the connection elements 145 extending from one branch point 143 is more than 3.0 and less than 4.0. When an average of the number of the connection elements 145 extending from one branch point 143 is more than 3.0 and less than 4.0, an irregular honeycomb arrangement pattern can be obtained. When an average of the number of the connection elements 145 extending from one branch point 143 is more than 3.0 and less than 4.0, the arrangement of the opening areas 144 can be made irregular whereby the presence of a direction in which the opening areas 144 are arranged with a repeated regularity (periodic regularity) can be prevented stably. As a result, generation of light beam stripes in the heating plate 110 can be more effectively restrained. At the same time, since the connection elements 145 are arranged basically based on a honeycomb arrangement, the connection elements 145 are uniformly dispersed so that non-uniform heat generation can be effectively restrained.

Strictly speaking, an average of the number of connection elements 145 extending from one branch point 143 is obtained by checking the number of the connection elements 145 extending from all the branch points 143 included in the conductive pattern 140, and by calculating an average value. However, actually, considering a size of the one opening area 144 defined by the thin conductive wires 141, it is possible to check the branch points 143 the number of which is considered as suitable in consideration of dispersion degree of elements to be checked, in a certain section having a planar dimension (an area) that is considered to be capable of reflecting a general tendency of the number of connection elements 145 extending from the one branch point 143, and calculate an average value thereof. An average value which was thus specified can be handled as an average value of the number of connection elements 145 extending from one branch point 143. For example, an average value obtained by counting and calculating the number of connection elements 145 extending from the 100 branch points 143 included in an area of 300 mm×300 mm by means of an optical microscope or an electron microscope, can be handled as an average of the number of the connection elements 145 extending from one branch point 143.

In the conductive pattern 140 shown in FIGS. 27 and 28, the conductive pattern 140 includes the opening areas 144 surrounded by the four, five, six or seven connection elements 145. Among the opening areas 144 included in the conductive pattern 140, the number of opening areas 144 surrounded by the six connection elements 145 is predominant. Namely, as to the opening areas 144 included in the conductive elements 145, the number of opening areas 144 surrounded by the six connection elements 145 is larger than the number of the opening areas 144 surrounded by the four, five or seven connection elements 145.

In such a conductive pattern 140, the arrangement of the opening areas 144 is an irregular honeycomb arrangement in which the respective opening areas lack a regularity in shape and arrangement, as compared with a honeycomb arrangement in which in which hexagons of the same shape are regularly arranged. In other words, the opening areas 144 are arranged such that shapes and positions of the respective opening areas are random, basically based on the honeycomb arrangement. Thus, it can be restrained that the opening areas 144 are arranged too densely or too sparsely, whereby the opening areas 144 can be distributed at substantially uniform density, i.e., in a uniform manner. As a result, the heat generation non-uniformity can be effectively restrained. In addition, it is stably possible to make completely irregular the arrangement of the opening areas 144, i.e., to prevent the presence of a direction in which the opening areas 144 are regularly arranged. Thus, generation of light beam stripes in the heating plate 110 can be more effectively restrained.

Strictly speaking, the number of connection elements 145 surrounding one opening area 144 is obtained by checking the number of connection elements 145 surrounding all the opening areas 144 included in the conductive pattern 140. However, actually, considering a size of the one opening area 144 defined by the thin conductive wires 141, it is possible to check the opening areas 144 the number of which is considered to be suitable in consideration of the number of dispersion degree of elements to be checked, in a certain section having a planar dimension (an area) that is considered to be capable of reflecting a general tendency of the number of connection elements 145 surrounding one opening area 144, and multiply the number of opening areas 144 for each number of the connection elements 145 surrounding the opening area 144. For example, it can be judged which number of opening areas 144 surrounded by the certain number of connection elements 145 included in the conductive pattern 140 is the largest, by using a value obtained by counting the number of connection elements 145 surrounding the 100 opening areas 144 included in an area of 300 mm×300 mm by means of an optical microscope or an electron microscope, and multiplying the number of opening areas 144 for each number of the connection elements 145 surrounding the opening area 144.

The material for constituting such a conductive pattern 140 may be one or more of metal such as gold, silver, copper, platinum, aluminum, chrome, molybdenum, nickel, titanium, palladium, indium, tungsten, and an alloy of metals selected from two or more kinds of these metals, such as nickel-chrome alloy, brass, bronze and so on, for example.

Figure 29:
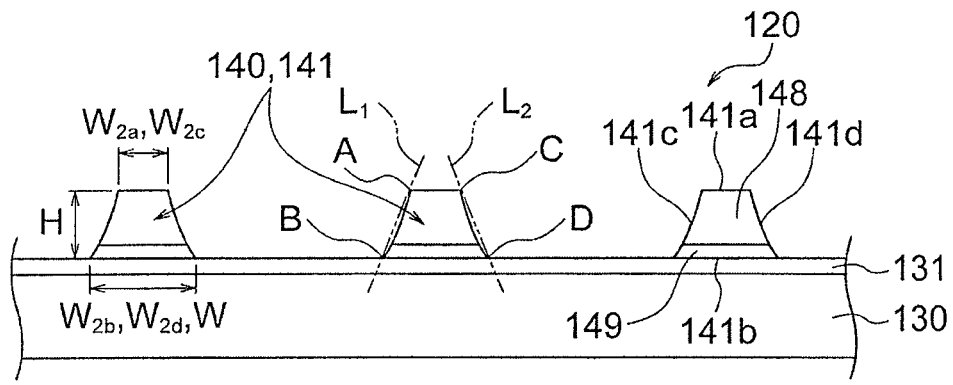
FIG. 29 is a sectional view showing a sectional shape of a thin conductive wire of the conductive pattern.

Next, a sectional shape of the thin conductive wire 141 of the conductive pattern 140 is described with reference to FIG. 29. FIG. 29 is a view showing in enlargement a section of the conductive pattern sheet 120 correspondingly to an A-A line in FIGS. 26 and 27.

In the example shown in FIG. 29, the conductive pattern sheet 120 includes a sheet-like substrate 130, a holding layer 131 laminated on the substrate 130, and a conductive pattern 140 formed on the holding layer 131. In a section (section shown in FIG. 29, which is referred to also as "main cut plane" hereinafter) perpendicular to an extension direction (longitudinal direction) of the thin conductive wire 141, the thin conductive wire 141 has a proximal surface 141b forming a surface on the side of the substrate 130, a distal surface 141a facing the proximal surface 141b, and side surfaces 141c, 141d connecting the distal surface 141a and the proximal surface 141b. In this embodiment, the distal surface 141a of the thin conductive wire 141 forms a first surface which finally faces one of the pair of glass plates 111, 112 of the heating plate 110, and the proximal surface 141b of the thin conductive wire 141 forms a second surface which finally faces the other of the pair of glass plates 111, 112 of the heating plate 110.

In the heating plate in which the conductive pattern 140 shown in FIG. 29 is incorporated, i.e., in the heating plate 110 shown in FIG. 25, when a width of the first surface 141a of the thin conductive wire 141 along the plate plane of the heating plate 110 in the main cut plane is represented as $W_{2a}$ (μm), a width of the second surface 141b of the thin conductive wire 141 along the plate plane of the heating plate 110 in the main cut plane is represented as $W_{2b}$ (μm), and a cross-sectional area of the thin conductive wire 141 in the main cut plane is represented as $S_{2a}$ (μm²), the following relationships are satisfied.

$$0<|W_{2a}-W_{2b}|\leq 10 \quad (a)$$

$$S_{2a}\geq 10 \quad (b)$$

In the conductive pattern sheet 120 shown in FIG. 29, when a width of the proximal surface 141b of the thin conductive wire 141 along the sheet plane of the conductive pattern sheet 120 in the main cut plane is represented as $W_{2d}$ (μm), a width of the distal surface 141a of the thin conductive wire 141 along the sheet plane of the conductive pattern sheet 120 in the main cut plane is represented as $W_{2c}$ (μm), and a cross-sectional area of the thin conductive wire 141 in the main cut plane is represented as $S_{2b}$ (μm²), the following relationships are satisfied.

$$0<|W_{2c}-W_{2d}|\leq 10 \quad (c)$$

$$S_{2b}\geq 10 \quad (d)$$

In the example shown in FIG. 29, the first surface (distal surface) 141a of the thin conductive wire 141 and the second surface (proximal surface) 141b thereof are in parallel. The one side surface 141c of the thin conductive wire 141 forms a tapered surface that is tapered to come close to the other side surface 141d as a certain point in the side surface 141c moves away from the substrate 130 along a normal direction of the sheet plane of the conductive pattern sheet 120. In addition, the other side surface 141d of the thin conductive wire 141 forms a tapered surface that is tapered to come close to the one side surface 141c as a certain point in the side surface 141d moves away from the substrate 130 along the normal direction of the sheet plane of the conductive pattern sheet 120. Thus, the thin conductive wire 141 is formed such that a line width thereof becomes narrow as a certain point in the thin conductive wire 141 moves away from the substrate 130 along the normal direction of the sheet plane of the conductive pattern sheet 120.

In the example shown in FIG. 25, when the conductive layer 140 is incorporated in the heating plate 110, the one side surface 141c of the thin conductive wire 141 forms a tapered surface that is tapered to come close to the other side surface 141d as a certain point in the side surface 141c moves away from the glass plate 12 along a normal direction of the plate plane of the heating plate 110. In addition, the other side surface 141d of the thin conductive wire 141 forms a tapered surface that is tapered to come close to the one side surface 141c as a certain point in the side surface 141d moves away from the glass plate 112 along the normal direction of the plate plane of the heating plate 110. Thus, the thin conductive wire 141 is formed such that the line width thereof becomes narrow as a certain point in the thin conductive wire moves away from the glass plate 112 along the normal direction of the plate plane of the heating plate 110.

Namely, the thin conductive wire 141 has substantially a trapezoidal shape in general, in the section perpendicular to its extension direction (longitudinal direction). In more detail, one side surface 141c of the thin conductive wire 141 has a shape that is concaved inward (toward the other side surface 141d) from a line $L_1$ connecting one end A along a direction (which is referred to as width direction of the thin conductive wire 141 herebelow) in parallel with the sheet plane of the conductive pattern sheet 120 (plate plane of the heating plate 110) in the first surface (distal surface) 141a and perpendicular to the extension direction of the thin conductive wire 141, and one end B along the width direction of the thin conductive wire 141 in the second surface (proximal surface) 141b. Similarly, the other side surface 141d of the thin conductive wire 141 has a shape that is concaved inward (toward the one side surface 141c) from a line $L_2$ connecting the other end C along the width direction of the thin conductive wire 141 in the first surface (distal surface) 141a and the other end D along the width direction of the thin conductive wire 141 in the second surface (proximal surface) 141b.

In the conductive pattern 140 as structured above, the widths $W_{2a}$, $W_2$ of the first surface (distal surface) 141a of the thin conductive wire 141 may be not less than 2 μm and not more than 13 μm. In addition, the width $W_{2b}$, $W_{2d}$ of the second surface (proximal surface) 141b of the thin conductive wire 141 may be not less than 5 μm and not more than 15 μm. Further, a height H of the thin conductive wire 141, i.e., the height H along the normal direction of the plate plane of the heating plate 110 (sheet plane of the conductive pattern sheet 120) may be not less than 2 μm and not more than 15 μm. According to the conductive pattern 140 including the thin conductive wires 141 of such dimensions, since each thin conductive wire 141 is sufficiently thin, the conductive pattern 140 can be effectively made invisible.

In the example shown in FIGS. 25 and 29, the width $W_{2b}$ of the second surface 141b of the thin conductive wire 141 (width $W_{2d}$ of the proximal surface 141b of the thin conductive wire 141) corresponds to a maximum width W of the thin conductive wire 141.

According to the conductive pattern 140 including the thin conductive wires 141 having the dimensions and the cross-sectional areas satisfying the relationships (a) and (b) or the relationships (c) and (d), it is possible to ensure a cross-sectional area sufficient for obtaining a suitable conductivity, while reducing the maximum width W of the thin conductive wire 141. Thus, a suitable conductivity of the conductive pattern 140 can be obtained, while the conductive pattern 140 can be effectively made invisible.

On the other hand, when a value of ($|W_{2a}-W_{2b}|$) or ($|W_{2c}-W_{2d}|$) is greater than 10 μm, it is necessary to increase the maximum width W of the thin conductive wire 141 in order to ensure a sufficient cross-sectional area in terms of ensuring a suitable conductivity. In this case, the invisibility of the conductive pattern 140 is deteriorated. In addition, when the maximum width W of the thin conductive wire 141 is reduced, a sufficient cross-sectional area cannot be ensured so that an electric resistance of the conductive pattern 140 becomes too large. Thus, the conductivity of the conductive pattern 140 is deteriorated. That is to say, it is impossible to sufficiently ensure a suitable conductivity and to make invisible the conductive pattern 140 at the same time.

As to the widths $W_{2a}$, $W_{2c}$ of the first surface (distal surface) 141a of the thin conductive wire 141, the widths $W_{2b}$, $W_{2d}$ of the second surface (proximal surface) 141b of the thin conductive wire 141, and the height H of the thin conductive wire 141, actually it is possible to measure the respective dimensions of the thin conductive wires 141 (connection elements 145) the number of which is considered to be suitable in consideration of dispersion degree of elements to be checked, in a certain section having a planar dimension (an area) that is considered to be capable of reflecting a general tendency of the respective dimensions. For example, dimensions obtained by measuring the 100 thin conductive wires 141 (connection elements 145) included in an area of 300 mm×300 mm by means of an optical microscope or an electron microscope may be handled as the respective dimensions of the thin conductive wire 141 (connection element 145) of the conductive pattern 140.

In the example shown in FIGS. 25 and 29, the thin conductive wire 141 constituting the conductive pattern 140 includes a dark color layer 149 located on the side of the substrate 130 of the thin conductive wire 141 to form the second surface (proximal surface) 141b of the thin conductive wire 141, and a conductive metal layer 148 located on the side opposed to the substrate 130 of the thin conductive wire 141 to form the first surface (distal surface) 141a of the thin conductive wire 141. In other words, the surface of the conductive meal layer 148 on the side of the substrate 130 is covered with the dark color layer 149.

The dark color layer 149 may be provided by subjecting a part of a material constituting the conductive metal layer 148 to a darkening treatment (blackening treatment), and forming a coating film made of metallic oxide or metallic sulfide on the part of the conductive metal layer 148. The conductive metal layer 148 and the dark color layer 149 have different etching speeds. In an etching step of the conductive metal layer 148 and the dark color layer 149 using a photolithographic technique as described below, by using the dark color layer 149, the etching speed of the conductive metal layer 148 can be suitably adjusted. Since the dark color layer 149 formed by the darkening treatment (blackening treatment) has a roughened surface, the dark color layer 149 can exert an effect of improving contact between the conductive pattern 140 and the holding layer 131.

Next, an example of a manufacturing method of the heating plate 110 is described with reference to FIGS. 30 to 35. FIGS. 30 to 35 are sectional views showing the example of the manufacturing method of the heating plate 110 in sequence.

Firstly, a metal foil 151 is prepared, and a dark color film 152 is formed on one surface of the metal foil 151. The metal foil 151 will form the conductive metal layer 148 of the thin conductive wire 141. The dark color film 152 will form the dark color layer 149 of the thin conductive wire 14. The metal foil 151 may be a foil made of metal such as gold, silver, copper, platinum, aluminum, chrome, molybdenum, nickel, titanium, palladium, indium, and an alloy of metals selected from two or more kinds of these metals, such as nickel-chrome alloy, brass and so on, for example. In addition, a thickness of the metal foil 151 may be not less than 2 μm and not more than 15 μm. The dark color film 152 may be provided by subjecting a part of a material constituting the metal foil 151 to a darkening treatment (blackening treatment), and forming a coating film made of metallic oxide or metallic sulfide on the part of the metal foil 151.

In addition, the substrate 130 is prepared, and the holding layer 131 is formed on one surface of the substrate 130. The substrate 130 may be made of a thermoplastic resin transmitting visible light, for example. The thermoplastic resin may be an acryl resin made of, e.g., polymethyl methacrylate, a polyester resin made of, e.g., polyvinyl chloride, polyethylene terephthalate (PET), amorphous polyethylene terephthalate (A-PET) or polyethylene naphthalate (PEN), a polyolefin resin made of, e.g., polyethylene, polypropylene, polymethyl pentene or cyclic polyolefin, a cellulose-based resin made of, e.g., triacetyl cellulose (cellulose triacetate), a polystyrene or polycarbonate resin, an AS resin and so on, for example. In particular, an acryl resin and polyvinyl chloride are preferred because of their excellent etching resistance, weather resistance and light resistance. The holding layer 131 may be made of, e.g., polyvinyl butyral (PVB), a two-pack curable urethane adhesive, or a two-pack curable epoxy adhesive. The holding layer 131 may be formed by laminating a sheet-like material on the substrate 130, or may be formed by applying a flowable material to the substrate 130.

Figure 30:
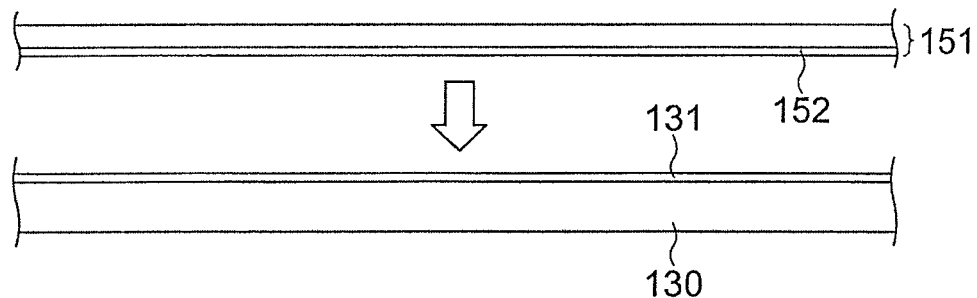
FIG. 30 is a view for explaining an example of a manufacturing method of the heating plate.
Figure 31:
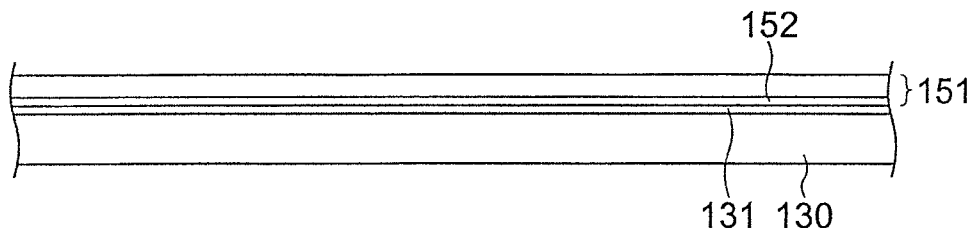
FIG. 31 is a view for explaining the example of the manufacturing method of the heating plate.

Then, as shown in FIG. 30, the metal foil 151 on which the dark color film 152 has been formed and the substrate 130 on which the holding layer 131 has been formed are laminated in such a manner that the dark color film 152 and the holding layer 131 face to each other. At this time, since the surface of the dark color film 152 in contact with the holding layer 131 is roughened by the darkening treatment (blackening treatment), the resin material constituting the holding layer 131 enter fine irregularities in the surface of the dark color film 152. Thus, the dark color film 152 and the holding layer 131 are securely joined to each other by a so-called anchoring effect. Thus, the metal foil 151 and the substrate 130 are securely joined to each other. Thus, as shown in FIG. 31, there is obtained a laminate in which the substrate 130, the holding layer 135, the dark color film 152 and the metal foil 151 are superposed in this order.

Figure 32:
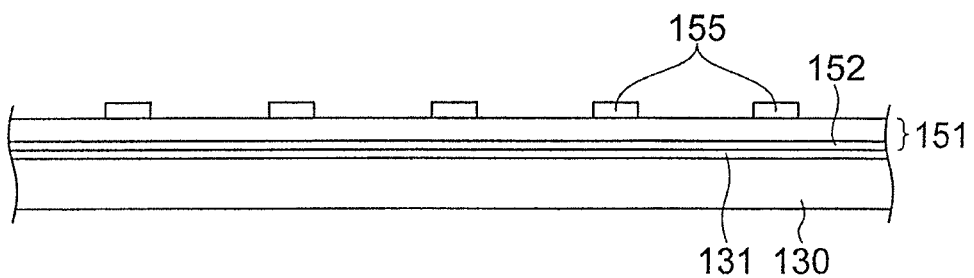
FIG. 32 is a view for explaining the example of the manufacturing method of the heating plate.

Next, as shown in FIG. 32, a resist pattern 155 is disposed on the metal foil 151. The resist pattern 155 is a pattern corresponding to a pattern of the conductive pattern 140 to be formed. In the method described herein, the resist pattern 155 is disposed only a portion where the conductive pattern 140 is finally to be formed. The resist pattern 155 may be formed by a patterning method using a known photolithographic technique.

Figure 33:
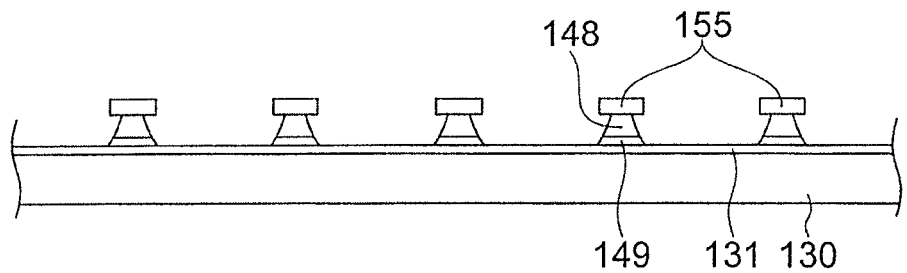
FIG. 33 is a view for explaining the example of the manufacturing method of the heating plate.

Then, as shown in FIG. 33, the metal foil 151 including the dark color film 152 is etched (etched by corrosion) with the resist pattern 155 serving as a mask. Due to this etching process, the metal foil 151 including the dark color film 152 can be patterned substantially similar to the resist pattern 155. As a result, the conductive metal layer 148 and the dark color layer 149, which will form the thin conductive wire 141, is formed from the patterned metal foil 151. As a corrosion solution used in the etching process, a known corrosion solution may be suitably selected and used depending on a material(s) of the metal foil 151 and the dark color film 152 (if it exits). For example, when the metal foil 151 is made of copper and the dark color film 152 is made of copper oxide (II) (CuO), a ferric chloride solution may be used for both the metal foil 151 and the dark color film 152. Alternatively, a ferric chloride solution may be used for a part (copper) forming the metal foil 151, and diluted hydrochloric acid may be used for a part (copper oxide (II)) forming the dark color film 152.

Generally, as compared with the conductive metal layer 148 made of a metal material, the dark color layer 149 made of oxide or sulfide of the metal material is easily corroded by etching. Thus, as compared with the dark color layer 149, lateral corrosion by side etching is more likely to proceed in the conductive metal layer 148. Thus, the lateral corrosion by side etching is more likely to proceed in the conductive metal layer 148 than in the dark color layer 149. In addition, also in the conductive metal layer 148, the lateral corrosion by side etching is more likely to proceed in an area distant from the dark color layer 149 than in an area close to the dark color layer 149. Thus, by selecting an etchant and adjusting an etching period, the thin conductive wire 141 can be manufactured, which has a width that changes to narrow from the side of the substrate 130 toward the resist pattern 155, i.e., which has a tapered cross-sectional shape. Similarly, by selecting an etchant and adjusting an etching period, the widths $W_{2a}$, $W_{2c}$ of the first surface (distal surface) 141$a$ of the thin conductive wire 141 and the widths $W_{2b}$, $W_{2d}$ of the second surface (proximal surface) 141$b$ thereof can be formed into desired widths.

Figure 34:
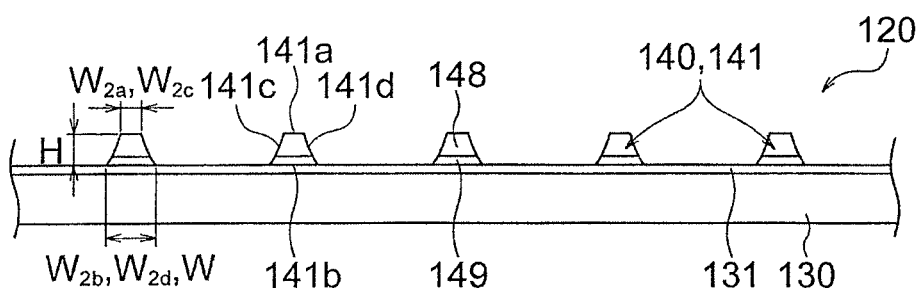
FIG. 34 is a view for explaining the example of the manufacturing method of the heating plate.
Figure 35:
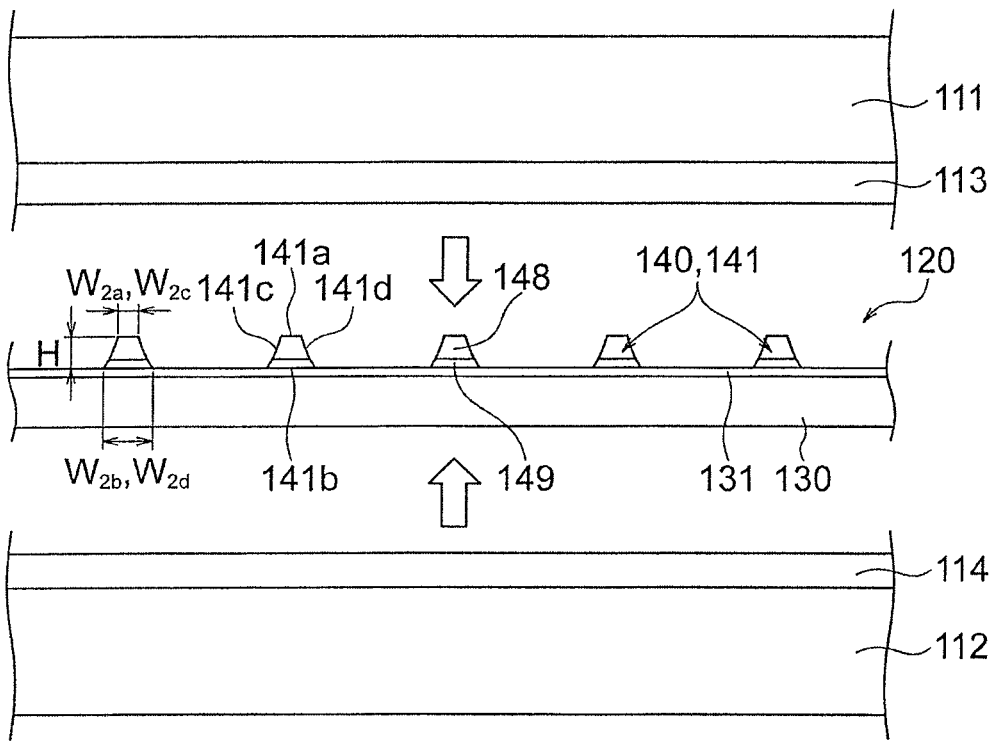
FIG. 35 is a view for explaining the example of the manufacturing method of the heating plate.
Figure 36:
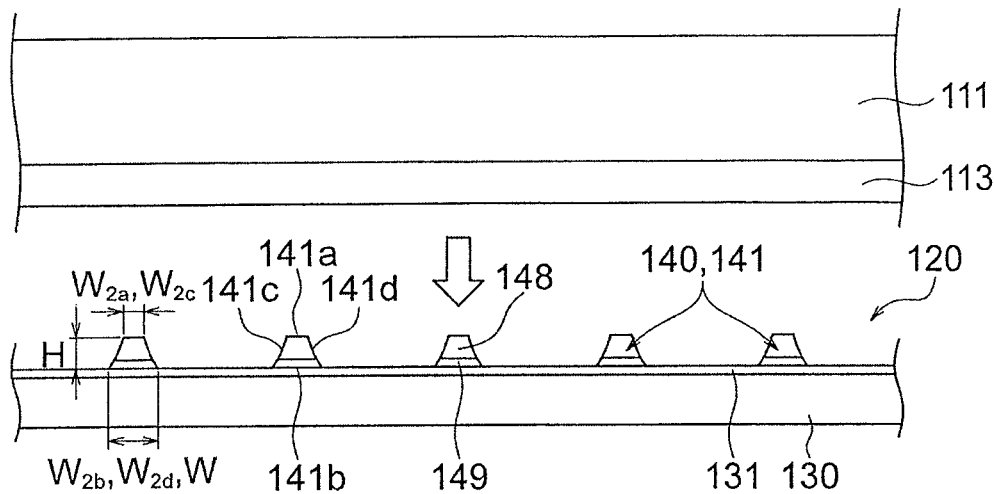
FIG. 36 is a view for explaining a modification example of the manufacturing method of the heating plate.
Figure 37:
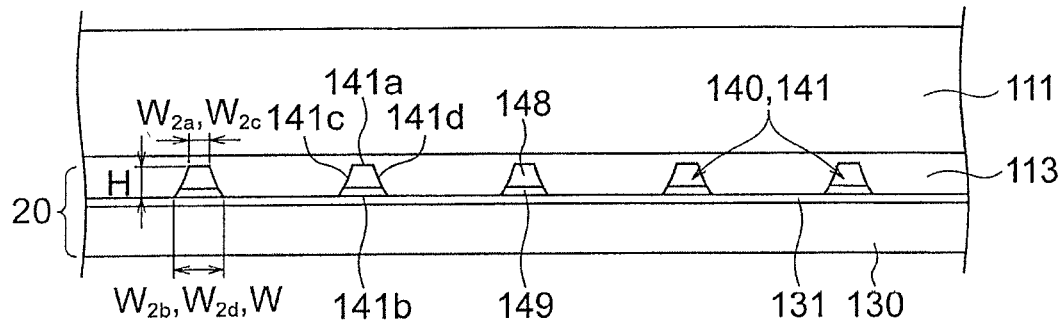
FIG. 37 is a view for explaining the modification example of the manufacturing method of the heating plate.

Thereafter, the resist pattern 155 is removed so that the conductive pattern sheet 120 shown in FIG. 34 is manufactured.

Finally, the glass plates 111, the joint layer 113, the conductive pattern sheet 120, the joint layer 114 and the glass plate 112 are superposed in this order, and heated/pressurized. In the example shown in FIG. 35, the joint layer 113 is provisionally attached to the glass plate 111, and the joint layer 114 is provisionally attached to the glass plate 112. Then, the glass plate 111 to which the joint layer 113 has been provisionally attached, the conductive pattern sheet 120, and the glass plate 112 to which the joint layer 114 has been provisionally attached are superposed in this order, and heated/pressurized, in such a manner that the side of the glass plate 111, to which the joint layer 113 has been provisionally attached, and the side of the glass plate 112, to which the joint layer 114 has been provisionally attached, face the conductive pattern sheet 120. Thus, the glass plates 111, the conductive pattern sheet 120 and the glass plates 112 are joined through the joint layers 113, 114, whereby the heating plate 110 shown in FIG. 25 is manufactured.

The aforementioned heating plate 110 in this embodiment includes the pair of glass plates 111, 112, the conductive pattern 140 disposed between the pair of glass plates 111, 112 and including the thin conductive wires 141, and the joint layers 113, 114 disposed between the conductive pattern 140 and at least one of the pair of glass plates 111, 112. The thin conductive wire 141 of the conductive pattern 140 has the first surface 141$a$ facing one of the pair of glass plates 111, 112, and the second surface 141$b$ facing the other of the pair of glass plates 111, 112. When a width of the first surface 141$a$ of the thin conductive wire 141 is represented as $W_{2a}$ (μm), a width of the second surface 141$b$ of the thin conductive wire 14 is represented as $W_{2b}$ (μm), and a cross-sectional area of the thin conductive wire 141 is represented as $S_{2a}$ (μm$^2$), the following relationships represented (a) and (b) are satisfied.

$$0<|W_{2a}-W_{2b}|\leq 10 \quad\quad (a)$$

$$S_{2a}\geq 10 \quad\quad (b)$$

In addition, the aforementioned conductive pattern sheet 120 in the second embodiment includes the substrate 130, and the conductive pattern sheet 140 disposed on the substrate 130 and including the thin conductive wires 141. The thin conductive wire 141 of the conductive pattern 140 has the proximal surface 141$b$ forming the surface on the side of the substrate 130, and the distal surface 141$a$ facing the proximal surface 141$b$. When a width of the distal surface 141$a$ of the thin conductive wire 141 is represented as $W_2$ (μm), a width of the proximal surface 141$b$ of the thin conductive wire 141 is represented as $W_{2d}$ (μm), and a cross-sectional area of the thin conductive wire 141 is represented as $S_{2b}$ (μm$^2$), the following relationships represented (c) and (d) are satisfied.

$$0<|W_{2c}-W_{2d}|\leq 10 \quad\quad (c)$$

$$S_{2b}\geq 10 \quad\quad (d)$$

According to such a heating plate 110 and such a conductive pattern sheet 120, it is possible to ensure a cross-sectional area sufficient for obtaining a suitable conductivity, while reducing the maximum width W (in the example shown in FIGS. 25 and 29, $W_{2b}$, $W_{2d}$) of the thin conductive wire 141. Thus, a suitable conductivity of the conductive pattern 140 can be obtained, while the conductive pattern 140 can be effectively made invisible.

The aforementioned second embodiment can be variously modified. Modification examples are described with reference suitably to the drawings. In the below description and the drawings for the description, a component that can be similarly made as the above embodiment is shown by the same symbol as a component corresponding to the above embodiment, and overlapped description is omitted.

A modification examples of the manufacturing method of the heating plate 110 are described with reference to FIGS. 36 to 40. FIGS. 36 to 40 are sectional views showing the modification example of the manufacturing method of the heating plate 110 in sequence.

Firstly, the conductive pattern sheet 120 is manufactured. The conductive pattern sheet 120 may be manufactured by the method as described above in the example of the manufacturing method of the heating plate 110.

Then, the glass plate 111, the joint layer 113 and the conductive pattern sheet 120 are superposed in this order, and heated/pressurized. In the example shown in FIG. 36, the joint layer 113 is provisionally attached to the glass plate 111 firstly. Then, the glass plate 111 to which the joint layer 113 has been provisionally attached is superposed from the side of the conductive pattern 140 of the conductive pattern sheet 120 and heated/pressurized, in such a manner that the side of the glass plate 111, to which the joint layer 113 has been provisionally attached, faces the conductive pattern sheet 120. Thus, as showing in FIG. 37, the glass plates 111 and the conductive pattern sheet 120 are joined (provisionally joined or completely joined) through the joint layer 113.

Figure 38:
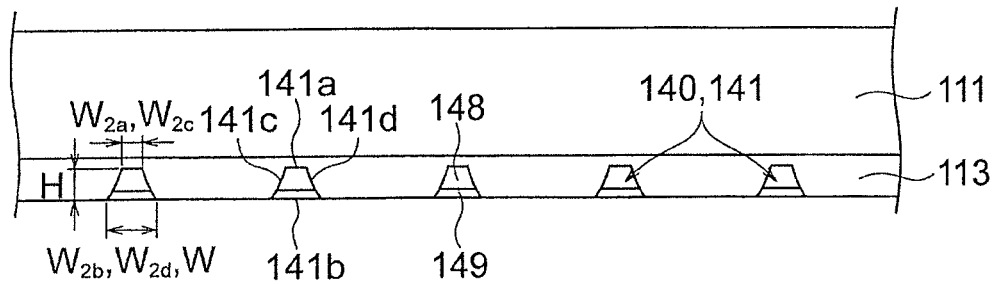
FIG. 38 is a view for explaining the modification example of the manufacturing method of the heating plate.
Figure 39:
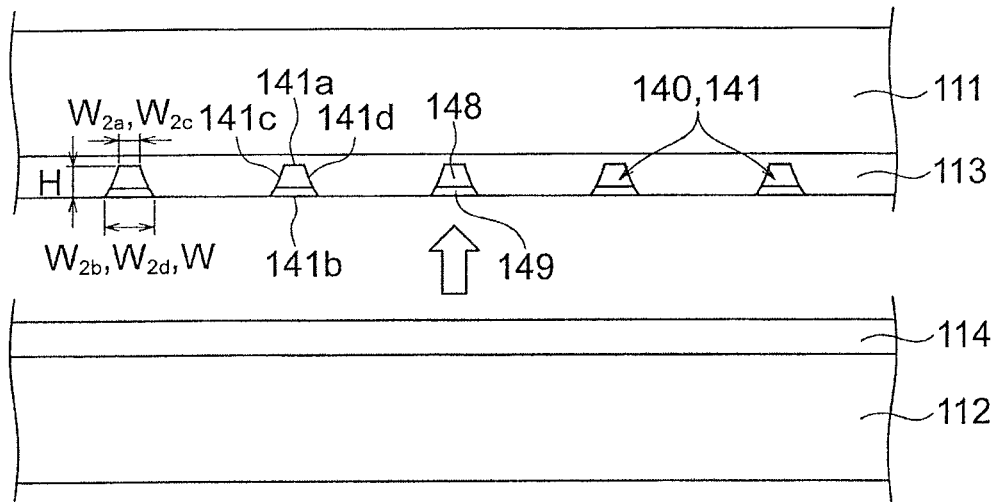
FIG. 39 is a view for explaining the modification example of the manufacturing method of the heating plate.

Then, as shown in FIG. 38, the substrate 130 of the conductive pattern sheet 120 is removed. For example, when the holding layer 131 is formed to include a peeling layer, the substrate 130 of the conductive pattern sheet 120 can be peeled from the conductive pattern 140 and the joint layer 113 by means of the peeling layer.

The peeling layer may be, for example, a peeling layer of an interface peeling type, a peeling layer of an interlayer peeling type, a peeling layer of a cohesion peeling type and so on. As a peeling layer of an interface peeling type, there may be suitably used a peeling layer having relatively a lower adhesive property to the conductive pattern 140 and the joint layer 113, than an adhesive property to the substrate 130. Such a layer may be a silicone resin layer, a fluororesin layer, a polyolefin resin layer and so on. In addition, it is possible to use a peeling layer having relatively a lower adhesive property to the substrate 130, than an adhesive property to the conductive pattern 140 and the joint layer 113. A peeling layer of an interlayer peeling type may be, for example, a peeling layer including a plurality of film layers, and having relatively a lower adhesive property between the plurality of layers, than an adhesive property to the conductive pattern 140, the joint layer 113 and the substrate 130. A peeling layer of a cohesion peeling type may be, for example, a peeling layer formed by dispersing fillers as a dispersal phase in a base resin as a continuous phase.

When a peeling layer of an interface peeling type including a layer having relatively a lower adhesive property to the conductive pattern 140 and the joint layer 113, than an adhesive property to the substrate 130, is used, a peeling phenomenon occurs between the peeling layer, and the conductive pattern 140 and the joint layer 113. In this case, it is possible to make the peeling layer not remain on the conductive pattern 140 and the joint layer 113. Namely, the substrate 130 is removed together with the peeling layer. When the substrate 130 and the peeling layer are removed in this manner, the joint layer 113 is exposed into the opening areas 144 of the conductive pattern 140.

On the other hand, when a peeling layer of an interface peeling type having relatively a lower adhesive property to the substrate 130, than an adhesive property to the conductive pattern 140 and the joint layer 113, is used, a peeling phenomenon occurs between the peeling layer and the substrate 130. When a peeling layer of an interlayer peeling type including a plurality of layers, and having relatively a lower adhesive property between the plurality of film layers, than an adhesive property to the conductive pattern 140, the joint layer 113 and the substrate 130, is used, a peeling phenomenon occurs between the plurality of layers. When a peeling layer of a cohesion peeling type, which is formed by dispersing fillers as a dispersal phase in a base resin as a continuous phase, is used, a peeling phenomenon occurs in the peeling layer by cohesion failure.

Finally, the glass plate 111, the joint layer 113 and the conductive pattern 140, the joint layer 114, and the glass plate 112 are superposed in this order, and heated/pressurized. In the example shown in FIG. 39, the joint layer 114 is attached to the glass plate 112 firstly. Then, the glass plate 111, the conductive pattern 140 and the joint layer 113, and the glass plate 112 to which the joint layer 114 has been provisionally attached are superposed in this order and heated/pressurized, in such a manner that the side of the glass plate 112, to which the joint layer 114 has been provisionally attached, faces the conductive pattern 140 and the joint layer 113. Thus, the glass plate 111, the conductive pattern 140, the glass plates 112 are joined (completely joined) through the joint layers 113, 114, whereby the heating plate 110 shown in FIG. 40 is manufactured.

Figure 40:
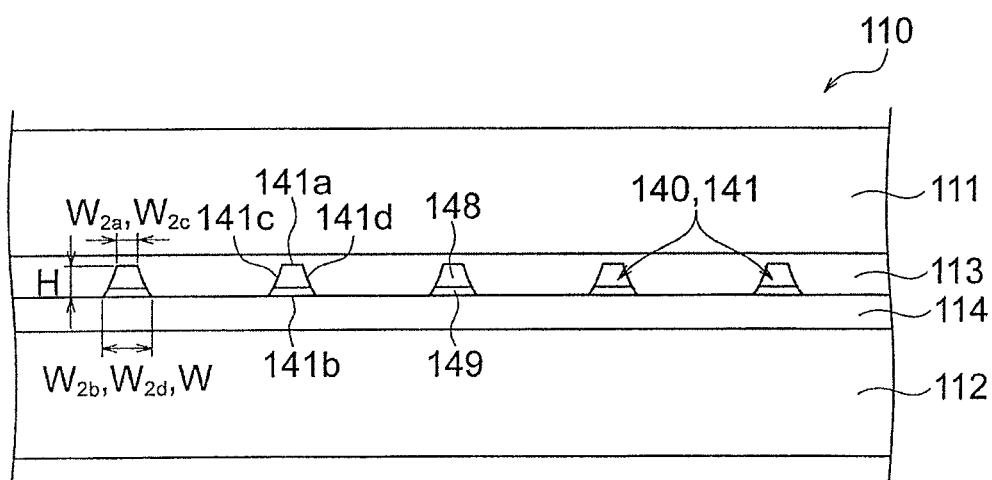
FIG. 40 is a view for explaining the modification example of the manufacturing method of the heating plate.

According to the heating plate 110 shown in FIG. 40, the heating plate 110 can be free of substrate 130. Thus, the thickness of the heating plate 110 as a whole can be reduced. In addition, the number of boundary faces in the heating plate 110 can be reduced. Thus, deterioration of optical properties, i.e., deterioration of visibility can be restrained.

Figure 41:
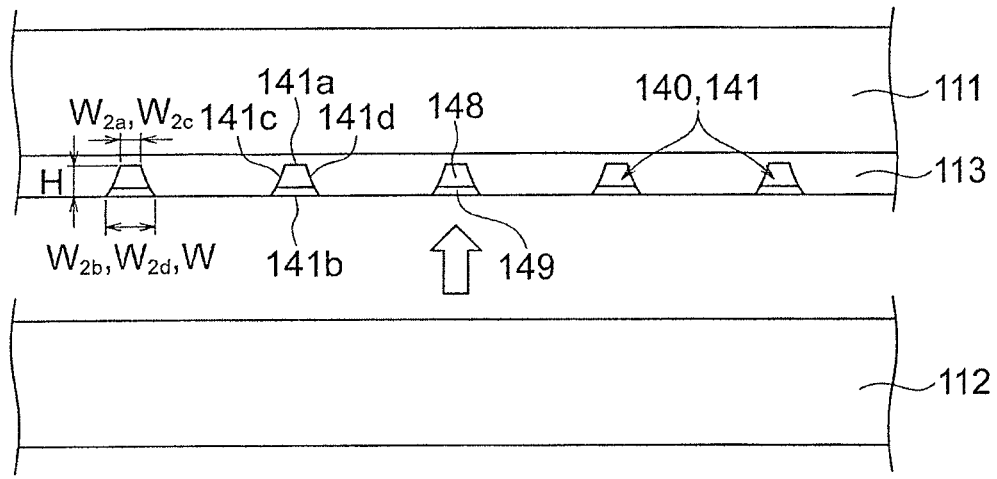
FIG. 41 is a view for explaining another modification example of the manufacturing method of the heating plate.
Figure 42:
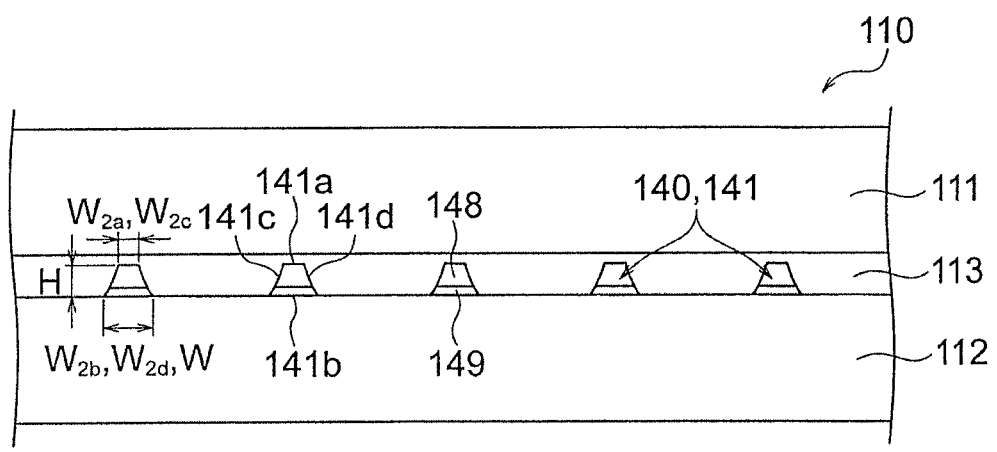
FIG. 42 is a view for explaining another modification example of the manufacturing method of the heating plate.

Next, another modification example of the manufacturing method of the heating plate 110 is described with reference to FIGS. 41 and 42. FIGS. 41 and 42 are sectional views showing the other modification example of the manufacturing method of the heating plate 110 in sequence.

Firstly, by the same steps as those of the above modification example of the manufacturing method of the heating plate 110, the glass plate 111 and the conductive pattern sheet 120 are joined (provisionally joined) through the joint layer 113. Then, the substrate 130 is removed therefrom. Namely, the laminate of the glass plate 111, the conductive pattern 140 and the joint layer 113 is obtained, which is described in the above modification example of the manufacturing method of the heating plate 110 with reference to FIG. 38.

Then, as shown in FIG. 41, the glass plate 111, the joint layer 113 and the conductive pattern 140, and the glass plate 112 are superposed in this order, and heated/pressurized. Thus, the glass plate 111 and the conductive pattern 140 are joined (completely joined) through the joint layer 113, and the glass plate 111 and 0s the glass plate 112 are joined (completely joined) through the joint layer 113. Thus, the heating plate 110 shown in FIG. 42 is manufactured.

According to the heating plate 10 shown in FIG. 42, the heating plate 110 can be free of the substrate 130 and the joint layer 114. Thus, the thickness of the heating plate 110 as a whole can be further reduced. In addition, the number of boundary faces in the heating plate 110 can be further reduced. Thus, deterioration of optical properties, i.e., deterioration of visibility can be furthermore effectively restrained. Moreover, since the conductive pattern 140 and the glass plate 112 are in contact with each other, a heating efficiency of the glass plate 112 by the conductive pattern 140 can be increased.

In the aforementioned second embodiment, the plurality of connection elements 145 included in the conductive pattern 140 each have a linear shape (linear line segments) when viewed in the normal direction of the plate plane of the heating plate 110. However, not limited thereto, at least some of the plurality of connection elements 145 may have a shape other than a linear shape such as a curved shape or a polygonal line shape. Specifically, the connection element 145 may have an arcuate shape, a parabolic shape, a corrugated shape, a zigzag shape, a combination shape of a curved line and a linear line, and so on. In particular, it is preferable that a rate of the connection elements 145 which are straight lines (straight line segments) connecting the two branch points 143, relative to the plurality of connection elements 145, is less than 20%. Namely, it is preferable that 80% or more of the connection elements 145 have a shape other than a linear shape (straight line segment).

According to the conductive pattern 140 including the connection elements 145 having a shape other than a linear shape (straight line segment), light incident on the side surface of the connection element 145 having a curved shape or a polygonal line shape and so on is reflected irregularly on the side surface. Thus, it can be restrained that the light incident on the side surface of the connection element 145 from a certain direction (headlight of an oncoming automobile, sunlight and so on) is reflected on the side surface in a certain direction correspondingly to the incident direction. Thus, it can be restrained that the reflected light is visible to an observer such as a driver, so that the conductive pattern 140 having the connection elements 145 is visible to the observer. As a result, the deterioration of visibility of an observer through a pane, which is caused by the visible conductive pattern 140, can be restrained.

In the aforementioned second embodiment, the conductive pattern 140 has a pattern determined based on the Voronoi diagram, i.e., a number of the opening areas 144 which have shapes which do not have a repeated regularity (periodic regularity) and are arranged at pitches which do not have a repeated regularity (periodic regularity). However, not limited to this pattern, there may be used, as the conductive pattern 140, various patterns such as a pattern in which triangular, rectangular, or hexagonal opening areas of the same shape are regularly arranged, a pattern in which opening areas of different shapes are regularly arranged, and so on.

The heating plate 110 may be used in a rear window, a side window and a sun roof of the automobile 1. In addition, the heating plate 110 may be used in a window or a transparent part of a door of a vehicle other than an automobile, such as a railway, an aircraft, a vessel, a space vessel and so on, or a window or a door of a building, and a window or a transparent part of a door of a refrigerator, an exhibition box and a storage or preservation installation such as a cabinet.

Further, in addition to a vehicle, the heating plate 110 may be used in a part by which an inside and an outside is partitioned, such as a window of a building, a store and a house.

Although some modification examples of the above second embodiment are described, the modification examples can be naturally combined with one another for application.

Third Embodiment

FIG. 1 and FIGS. 43 to 56 are views for explaining a third embodiment according to the present invention. In the third embodiment described below, a component corresponding to that of the first and second embodiments is shown by a symbol in 200s with the same last two digits, and overlapped description is omitted.

Figure 43:
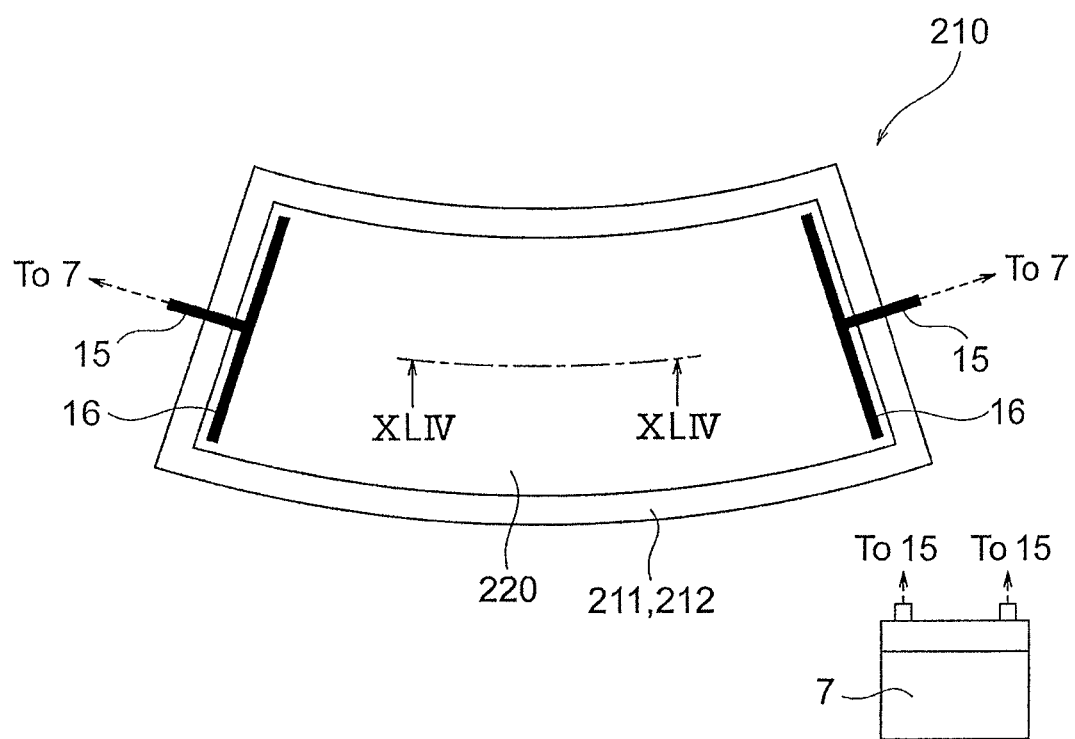
FIG. 43 is a view for explaining a third embodiment according to the present invention, showing the heating plate when viewed in a normal direction of a plate plane thereof.
Figure 44:
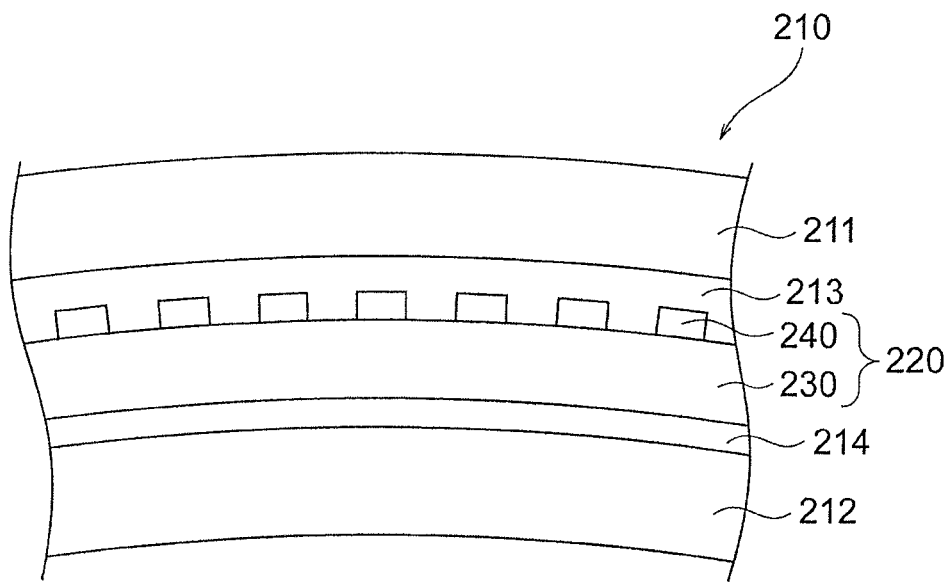
FIG. 44 is a cross-sectional view of the heating plate of FIG. 43.
Figure 45:
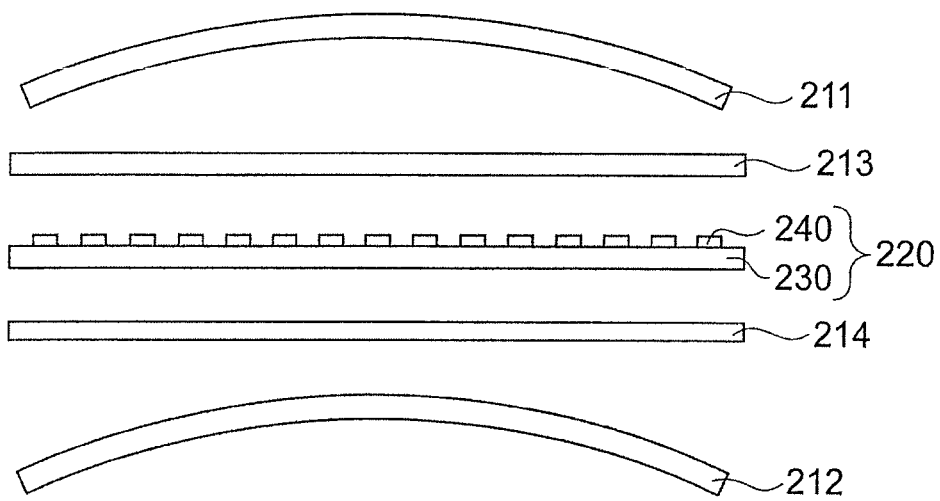
FIG. 45 is a view showing conditions of respective members constituting the heating plate of FIG. 44 before the respective members are laminated.

FIG. 43 is a view of a heating plate when viewed in a normal direction of a plate plane thereof. FIG. 44 is a cross sectional view of the heating plate of FIG. 43. FIG. 45 is a view showing conditions of respective members constituting the heating plate of FIG. 44 before the respective members are laminated. The heating plate in this embodiment is sometimes referred to as "laminated glass".

FIG. 43 shows a heating plate 210 when viewed in a normal direction of a plate plane thereof. FIG. 44 is a cross-sectional view corresponding to a XLIV-XLIV line of the heating plate 210 of FIG. 43. The heating plate 210 includes a pair of curved glass plates 211, 212, a conductive pattern sheet (pattern sheet) 220 disposed between the pair of curved glass plates 211, 212, a joint layer 213 that joins the glass plate 211 and the conductive pattern sheet 220, and a joint layer 214 that joins the glass plate 212 and the conductive pattern sheet 220.

The conductive pattern sheet 220 includes a substrate 230, a conductive pattern 240 formed on the substrate 230, a wiring part 15 for powering the conductive pattern 240, and a connection part 16 connecting the conductive pattern 240 and the wiring part 15.

In the example shown in FIGS. 43 and 44, the conductive pattern 240 is powered by a power source 7, such as a battery, through the wiring part 15 and the connection part 16, so that the conductive pattern 240 generates heat by means of resistance heat. The heat generated by the conductive pattern 240 is transmitted to the glass plates 211, 212 through the joint layers 213, 214, so that the glass plates 211, 212 are warmed up. Thus, dew drops on the glass plates 211, 212 can be removed so that the glass plates 211, 112 can be defogged. When there is snow or ice on the glass plates 211, 212, the snow or ice can be unfrozen. Thus, an excellent field of view of a passenger can be ensured.

In order to manufacture the heating plate 210, as shown in FIG. 45, the curved glass plate 211, the joint layer 213, the conductive pattern sheet 220, the joint layer 214 and the curved glass plate 212 are superposed in this order, and heated/pressurized, so that the curved glass plates 211, the conductive pattern sheet 220 and the curved glass plates 212 are joined by the joint layers 213, 214.

Particularly when used as a front window, the glass plate 211, 212 preferably has a high visible light transmittance in order not to hinder a field of view of a passenger. A material of such a glass plate 211, 212 may be soda lime glass, blue plate glass and so on, for example. The glass plate 211, 212 preferably has a transmittance of 90% or more in a visible light area. The visible light transmittance of the glass plate 211, 212 is specified as follows. Transmittance of light with measurement wavelength range of from 380 nm to 780 nm is measured by using a spectrophotometer (manufactured by Shimadzu Corporation, "UV-3100PC", compliant with JIS K 0115). The visible light transmittance is an average value of the transmittances at the respective wavelengths. The visible light transmittance may be lowered by partially or totally coloring the glass plate 211, 212, for example. In this case, direct sunlight can be shielded and an inside of the automobile is less visible from outside.

In addition, the glass plate 211, 212 preferably has a thickness of not less than 1 mm and not more than 5 mm. With such a thickness, the glass plate 211, 212 excellent in strength and optical properties can be obtained.

The glass plates 211, 212 and the conductive pattern sheet 220 are joined to each other through the joint layers 213, 214, respectively. As such a joint layer 213, 214, a layer made of a material having various adhesion properties or glueing (pressure sensitive adhesive) properties can be employed. In addition, the joint layer 213, 214 preferably has a high visible light transmittance. A typical joint layer may be a layer made of polyvinyl butyral (PVB), for example. The joint layer 213, 214 preferably has a thickness of not less than 0.15 mm and not more than 0.7 mm.

Not limited to the illustrated example, the heating plate 210 may be provided with another function layer for exerting a specific function. In addition, one function layer may exert two or more functions. Alternatively, for example, a function may be given to at least one of the glass plate 211, 212 of the heating plate 210, the joint layer 213, 214 thereof, and the substrate 230 of the conductive pattern sheet 220 thereof, which is described later. The function that can be given to heating plate 210 may be an antireflection (AR) function, a hard coat (HC) function having an abrasion resistance, an infrared ray shield (reflection) function, an ultraviolet ray shield (reflection) function, a polarizing function, an antifouling function and so on, for example.

Next, the conductive pattern sheet 220 is described. The conductive pattern sheet 220 includes the substrate 230, the conductive pattern 240 disposed on the substrate 230, the wiring part 15 for powering the conductive pattern 240, and the connection part 16 connecting the conductive pattern 240 and the wiring part 15. The conductive pattern sheet 220 may have a planar dimension substantially the same as that of the glass plate 211, 212 so as to be placed all over the heating plate 210. Alternatively, the conductive pattern sheet 220 may be placed over only a part of the heating plate 210, such as a part in front of a driver's seat.

The substrate 230 functions as a substrate that supports the conductive pattern 240. The substrate 230 is an electrically insulating substrate that transmits light of a wavelength (380 nm to 780 nm) of a visible light wavelength band, which is generally recognized as transparent. The substrate 230 contains a thermoplastic resin.

A thermoplastic resin contained as a main component in the substrate 230 may be any thermoplastic resin as long as it transmits visible light. The thermoplastic resin may be an acryl resin made of, e.g., polymethyl methacrylate, a polyolefin resin made of e.g., polypropylene, a polyester resin made of, e.g., polyethylene terephthalate or polyethylene naphthalate, a cellulose-based resin made of, e.g., triacetyl cellulose (cellulose triacetate), polyvinyl chloride, polystyrene, a polycarbonate resin, an AS resin and so on, for example. In particular, an acryl resin and polyethylene terephthalate are preferred because of their excellent optical properties and moldability.

In addition, in consideration of support property during manufacture and light transmission of the conductive pattern 240, the substrate 230 preferably has a thickness of not less than 0.02 mm and not more than 0.20 mm.

Figure 46:
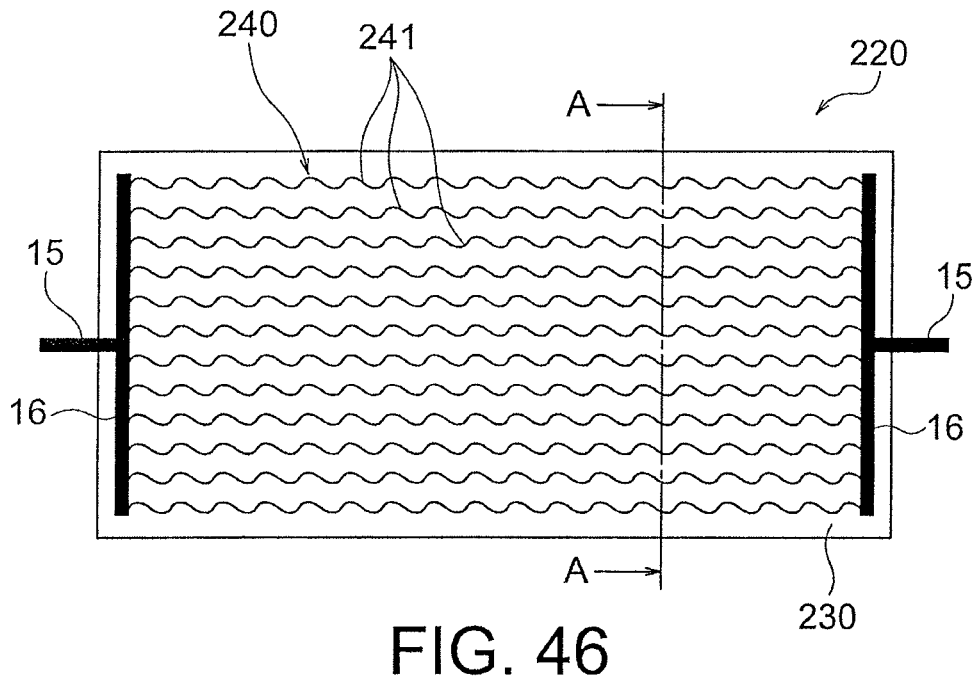
FIG. 46 is a plan view showing an example of the conductive pattern.

The conductive pattern 240 is described with reference to FIGS. 46 to 48. FIG. 46 is a plan view of the conductive pattern sheet 220 when viewed in a normal direction of a sheet plane thereof, showing an example of an arrangement pattern of the conductive pattern 240.

The conductive pattern 240 is powered by the power source 7, such as a battery, through the wiring part 15 and the connection part 16, so as to generate heat by means of resistance heat. The heat is transmitted to the glass plates 211, 212 through the joint layers 213, 214, so that the glass plates 211, 212 are warmed up.

The conductive pattern 240 shown in FIG. 46 includes a plurality of thin conductive wires 241 that are arranged in a line and space pattern. Namely, the conductive pattern 240 includes the plurality of thin conductive wires 241 arranged in one direction. Each thin conductive wire 241 extends in the other direction not in parallel with the one direction, apart from another thin conductive wire 241 adjacent in the one direction. In the illustrated example, each thin conductive wire 241 is apart from another thin conductive wire 241 and connects the pair of connection parts 16. Namely, in the illustrated example, the one direction is an extension direction of the connection part 16, which is an up and down direction of the automobile 1. In addition, the other direction is a right and left direction of the automobile 1. Although each thin conductive wire 241 extends in the other direction in a corrugated pattern, the thin conductive wire 241 may extend in a polygonal line shape or in a linear shape.

Although not formed in the illustrated example, the conductive pattern 240 may include a thin wire connecting adjacent thin conductive wires 241, i.e., a connection line. In addition, in the illustrated example, each thin conductive wire 241 extends in the right and left direction of the automobile 1, which is the other direction, each thin conductive wire 241 may extend in the up and down direction of the automobile 1.

In this embodiment, a copper film is used as a material for constituting such a conductive pattern 240. A copper film means an electrolytic copper foil, a rolled copper foil, a copper film formed (deposited) by a spattering method, a vacuum deposition method and so on. Although the details are described later, the conductive pattern 240 is formed by patterning a copper film by an etching process.

Figure 47:
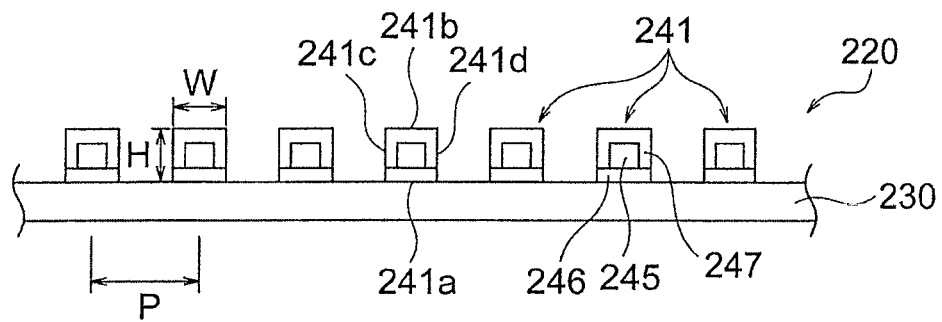
FIG. 47 is a sectional view corresponding to an A-A line of FIG. 46, showing an example of a sectional shape of the thin conductive wire.

FIG. 47 is a sectional view corresponding to an A-A line of FIG. 46, showing an example of a sectional shape of the thin conductive wire. The plurality of thin conductive wires 241 constituting the conductive pattern 240 are formed on the substrate 230. In the illustrated example, the thin conductive wire 241 has a surface 241a on the side of the substrate 230, a surface 241b on the side opposed to the substrate 230, and side surfaces 241c, 241d. The thin conductive wire 241 has substantially a rectangular section in general. In this embodiment, a line width W (herebelow simply as "width") of the thin conductive wire 241, i.e., the width W along the sheet plane of the substrate 230 is not less than 1 μm and not more than 20 μm, preferably not less than 2 μm and not more than 15 μm. Thus, the conductive pattern 240 is seen transparent in general, and has an excellent see-through property. In addition, a height (thickness) H of the thin conductive wire 241, i.e., the height (thickness) H along the normal direction to the sheet plane of the substrate 230 is preferably not less than 1 μm and not more than 20 μm, and more preferably not less than 1 μm and not more than 10 μm. Since the thin conductive wire 241 having such a height dimension, in addition to the line width W, is sufficiently thin, the conductive pattern 240 can be effectively made invisible.

In FIG. 47, the symbol P represents a pitch between the adjacent thin conductive wires (distance between the adjacent thin conductive wires 241) in the conductive pattern 240. The pitch P is not less than 0.3 mm and not more than 2 mm. The pitch may be not less than 0.3 mm and not more than 7 mm.

In addition, the thin conductive wire 241 includes a first dark color layer 246 disposed on the substrate 230, a conductive metal layer 245 disposed on the first dark color layer 246, and a second dark color layer 247 disposed on the conductive metal layer 245. In other words, the surface of the conductive metal layer 245 on the side of the substrate 230 is covered with the first dark color layer 246, and the surface of the conductive metal layer 245 on the side opposed to the substrate 230 and both side surfaces thereof are covered with the second dark color layer 247.

The conductive metal layer 245 made of a metal material has relatively a high reflectance. When light is reflected on the conductive metal layer 245 forming the thin conductive wires 241 of the conductive pattern 240, the reflected light may be visible, which hinders a field of view of a passenger. In addition, when the conductive metal layer 245 is visible from outside, design is sometimes impaired. Thus, the dark color layers 246, 247 are disposed at least a part of the surface of the conductive metal layer 245. The dark color layers 246, 247 are layer having a visible light reflectance that is lower than that of the conductive metal layer 245, and are black-colored dark color layers, for example. Due to the dark color layers 246, 247, the conductive metal layer 245 becomes less visible, whereby an excellent field of view of a passenger can be ensured. In addition, impairment of design when seen from outside can be prevented. However, such dark color layers 246, 247 may be omitted. In this case, the width W of the thin conductive wire 241 is a width of the single conductive metal layer 245.

Figure 48:
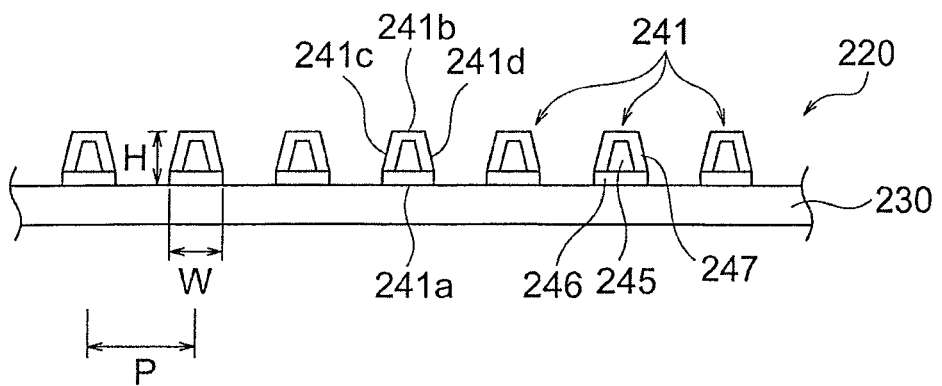
FIG. 48 is a sectional view corresponding to the A-A line of FIG. 46, showing another example of a sectional shape of the thin conductive wire.

FIG. 48 is a sectional view corresponding to the A-A line of FIG. 46, showing another sectional shape of the thin conductive wire. In the illustrated example, the thin conductive wire 241 includes a surface 241a on the side of the substrate 230, a surface 241b on the side opposed to the substrate 230, and side surfaces 241c, 241d. The surface 241a on the side of the substrate 230 and the surface 241b on the side opposed to the substrate 230 are in parallel. The side surface 241c forms a tapered surface that is tapered to come close to the side surface 241d as a certain point in the side surface 241c moves away from the substrate 230 along the normal direction of the sheet plane of the conductive pattern sheet 220. The side surface 241d also forms a tapered surface that is tapered to come close to the side surface 241c as a certain point in the side surface 241d moves away from the substrate 230 along the normal direction of the sheet plane of the conductive pattern sheet 220. The thin conductive wire 241 has substantially a trapezoidal section in general. Namely, the width of the thin conductive wire 241 changes to narrow as a certain point in the thin conductive wire 241 moves away from the substrate 230 along the normal direction of the conductive pattern sheet 220. In addition, similarly to the example shown in FIG. 47, the surface of the conductive metal layer 245 on the side of the substrate 230 is covered with the first dark color layer 246, and the surface of the conductive metal layer 245 on the side opposed to the substrate 230 and both side surfaces thereof are covered with the second dark color layer 247.

FIG. 48 shows that the thin conductive wire 241 has substantially a trapezoidal section in general, and that the width of the thin conductive wire 241 changes to narrow as a certain point in the thin conductive wire 241 moves away from the substrate 230 along the normal direction of the conductive pattern sheet 220. However, not limited thereto, the side surfaces 241c, 241d may be formed of curved lines, or may be formed in a tier-like shape. In addition, the width of the thin conductive wire 241 may be partially wider as a certain point in the thin conductive wire 241 moves away from the substrate 230 along the normal direction of the conductive pattern sheet 220. Namely, when the section of the thin conductive wire 241 is seen generally and comprehensively, it is sufficient that the width of the conductive wire 241 changes to narrow as a certain point in the thin conductive wire 241 moves away from the substrate 230 along the normal direction of the conductive pattern sheet 220.

In the example shown in FIG. 48, since the width of the thin conductive wire 241 changes to narrow as a certain point in the thin conductive wire 241 moves away from the substrate 230 along the normal direction of the conductive pattern sheet 220, when the glass plates 211, 212, the joint layers 213, 214 and the conductive pattern sheet 220 are laminated, the conductive pattern 240 can be reliably embedded in the joint layer 213, and bubbles in an interface between the conductive pattern 240 and the joint layer 213 can be restrained from remaining therein.

Next, an example of a manufacturing method of the heating plate 210 is described with reference to FIGS. 49 to 56. FIGS. 49 to 56 are sectional views showing the example of the manufacturing method of the heating plate 210 in sequence, particularly views for explaining manufacture of the conductive pattern sheet 220 in detail. After the conductive pattern sheet 220 is manufactured, the conductive pattern sheet 220 is sandwiched between the glass plates 211, 212 so that the heating plate 210 is manufactured.

Figure 49:
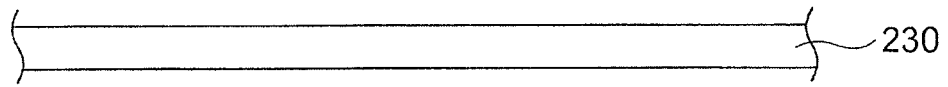
FIG. 49 is a view for explaining an example of a manufacturing method of the heating plate.

In order to manufacture the conductive pattern sheet 220, as shown in FIG. 49, the substrate 230 is firstly prepared. The substrate 230 is an electrically insulating substrate that transmits light of a wavelength (380 nm to 780 nm) of a visible light wavelength band, which is generally recognized as transparent. The substrate 230 contains a thermoplastic resin.

Figure 50:
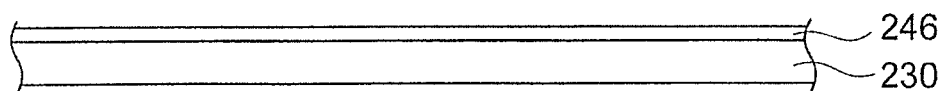
FIG. 50 is a view for explaining the example of the manufacturing method of the heating plate.

Then, as shown in FIG. 50, the first dark color 246 is disposed on the substrate 230. For example, the first dark color layer 263 can be disposed on the substrate 230 by a plating method including electrolytic plating and electroless plating, a spattering method, a vacuum deposition method, an ion plating method, a PVD method and a CVD method other than these methods, or a combination method of the two or more methods. Various known materials may be used as material of the first dark color layer 246. For example, the material may be copper nitride, copper oxide, nickel nitride and so on.

Figure 51:
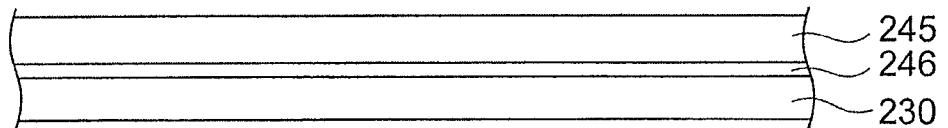
FIG. 51 is a view for explaining the example of the manufacturing method of the heating plate.

Then, as shown in FIG. 51, the conductive metal layer 245 is disposed on the first dark color layer 246. The conductive metal layer 245 is a layer formed of a copper film. When an electrolytic copper foil or a rolled copper foil is used to form the conductive metal layer 245, the conductive metal layer 245 is disposed on the first dark color layer 246 through a two-pack mixture type urethane ester-based adhesive (illustration omitted), for example. When an electrolytic copper foil is used, an electrolytic copper foil of not more than 7 μm is preferably used in order to make thin the thin conductive wire 241 as much as possible. When a copper film formed by a spattering method or a vacuum vapor deposition method is used, the conductive metal layer 245 is disposed by depositing a film on the first dark color layer 246 through an adhesive primer (illustration omitted). When a copper film formed by a spattering method or a vacuum vapor deposition method is used as the conductive metal layer 245, an electrolytic plated layer may be deposited on the copper film, so as to form the conductive metal layer 245 including the copper film formed by a spattering method or a vacuum vapor deposition method, and the electrolytic plated layer. As a film deposition method for a copper film, a spattering method, a vacuum vapor deposition method, an ion plating method, a PVD method other than these methods or a combination method thereof may be employed. In addition, as described above, a copper film may be formed by an electrolytic plating method. Moreover, it is possible to employ a method in which an electrolytic plating method is combined to the above described spattering method, the vacuum vapor deposition method, the ion plating method and so on.

Figure 52:
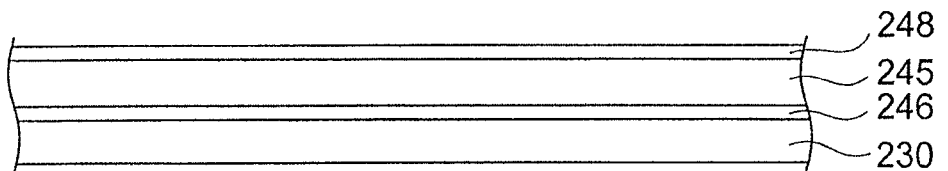
FIG. 52 is a view for explaining the example of the manufacturing method of the heating plate.

Then, as shown in FIG. 52, the resist layer 248 is disposed on the conductive metal layer 245. The resist layer 248 is a resin layer having a photosensitivity to light of a predetermined wavelength range, such as ultraviolet light. The resin layer may be formed by adhering a resin film, or may be formed by applying a flowable resin. A concrete photosensitive property of the resist layer 248 is not specifically limited. For example, a photo-curing type photosensitive material or a photo-dissolving photosensitive material may be used as the resist layer 248.

Figure 53:
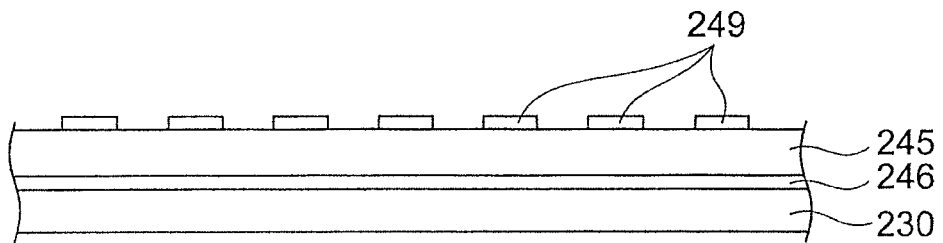
FIG. 53 is a view for explaining the example of the manufacturing method of the heating plate.

Thereafter, as shown in FIG. 53, the resist layer 248 is patterned to form the resist pattern 249. Various known methods may be used as the method of patterning the resist layer 248. In this example, a resin layer having a photosensitivity to light of a predetermined wavelength range, such as ultraviolet light, is used as the resist layer 248, and a known photolithographic technique is used for patterning the resist layer 248. Firstly, a mask which opens a part to be patterned or a mask which shields a part to be patterned is placed on the resist layer 248, and the resist layer 248 is irradiated with ultraviolet light through the mask. Thereafter, the part shielded by the mask from the ultraviolet light or the part irradiated with the ultraviolet light is removed by means of developing or the like. Thus, the patterned resist pattern 249 can be formed. A laser patterning method without mask can be used.

Figure 54:
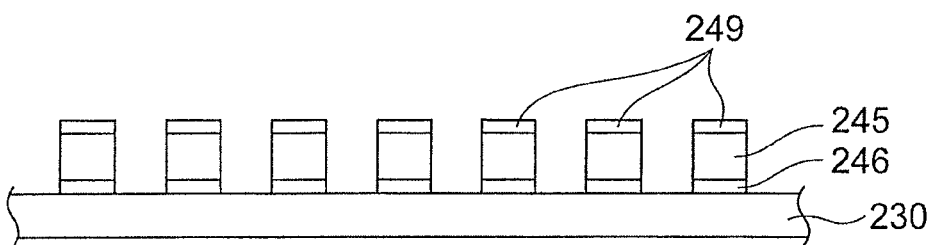
FIG. 54 is a view for explaining the example of the manufacturing method of the heating plate.
Figure 55:
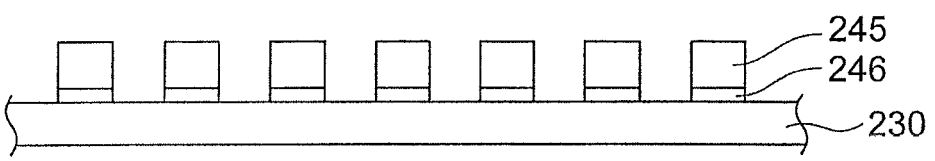
FIG. 55 is a view for explaining the example of the manufacturing method of the heating plate.
Figure 56:
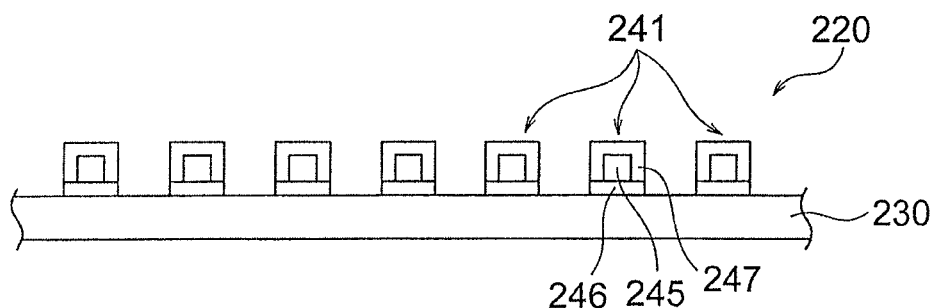
FIG. 56 is a view for explaining the example of the manufacturing method of the heating plate.

Then, as shown in FIG. 54, the conductive metal layer 245 and the first dark color layer 246 are etched with the resist pattern 249 serving as a mask. Due to this etching process, the conductive metal layer 245 and the first dark color layer 246 are patterned substantially similar to the resist pattern 249. The etching method is not particularly limited, and a known method may be employed. The known method may be a wet etching method using etchant, a plasma etching method and so on. Thereafter, as shown in FIG. 55, the resist pattern 249 is removed.

Finally, the second dark color layer 247 is formed on the surface 241b of the conductive metal layer 245 on the side opposed to the substrate 230 and the side surfaces 241c, 241d. The second dark color layer 247 is formed by, e.g., subjecting a part of a material constituting the conductive metal layer 245 to a darkening treatment (blackening treatment). Namely, in this case, the second dark color layer 247 made of metallic oxide or metallic sulfide can be formed from the part constituting the conductive metal layer 245. Alternatively, the second dark color layer 247 as a coating film made of a dark color material or a plated layer made of nickel or chrome may be disposed on the surface of the conductive metal layer 245. In addition, the surface of the conductive metal layer 245 may be roughened, and the second dark color layer 247 may be disposed thereon.

In this example, the second dark color layer 247 is formed on the surface 241b of the conductive metal layer 245 on the side opposed to the substrate 230 and the side surfaces 241c, 241d. However, not limited thereto, the second dark color layer 247 may be formed only on the surface 241b of the conductive metal layer 245 on the side opposed to the substrate 230, or only on the side surfaces 241c, 241d of the conductive metal layer 245.

When the second dark color layer 247 is formed only on the surface 241b of the conductive metal layer 245 on the side opposed to the substrate 230, after the step shown in FIG. 51, for example, the second dark color layer 247 and the resist layer 248 are disposed in this order on the conductive metal layer 245, and the resist pattern 249 is formed by patterning the resist layer 248. Thereafter, the second dark color layer 247, the conductive metal layer 245 and the first dark color layer 246 are etched with the resist pattern 249 serving as a mask.

Alternatively, when the second dark color layer 247 is formed only on the side surfaces 241c, 241d of the conductive metal layer 245, after the step shown in FIG. 54, for example, the second dark color layer 247 is formed without removing the resist pattern 249. After that, the resist pattern 249 is removed.

When the first dark color layer 246 is not necessary, the step of disposing the first dark color layer 246 on the substrate 230, which is shown in FIG. 50, is omitted.

Then, after the above conductive pattern sheet 220 is manufactured, the curved glass plate 211, the joint layer 213, the conductive pattern sheet 220, the joint layer 214 and the curved glass plate 212 are superposed in this order and heated/pressurized, whereby the heating plate 210 is manufactured. The heating plate 210 includes the pair of curved glass plates 211, 212, the conductive pattern sheet 220 disposed between the pair of curved glass plates 211, 212, the joint layer 213 disposed between the glass plate 211 and the conductive pattern sheet 220 to join the glass plate 211 and the conductive pattern sheet 220, and the joint layer 214 disposed between the glass plate 212 and the conductive pattern sheet 220 to join the glass plate 212 and the conductive pattern sheet 220. The conductive pattern sheet 220 includes the substrate 230 and the conductive pattern 240 formed on the substrate 230. A desired pattern is easily given precisely to the conductive pattern 240 by the aforementioned patterning method. Since the plurality of thin conductive wires 241 forming a pattern in the conductive pattern 240 are disposed between the glass plates 211, 212, positions of the thin conductive wires 241 are fixed. Thus, a desired pattern of the thin conductive wires 241 can be easily given precisely to the heating plate 210.

According to the heating plate 210 in the third embodiment, the conductive pattern 240 includes the plurality of thin conductive wires 241 that are formed of a patterned copper film and arranged in the one direction. Each thin conductive wire 241 extends in the other direction not in parallel the one direction, apart from another thin conductive wire 241 adjacent in the one direction. To be more specific, the conductive pattern 240 includes the thin conductive wires 241 that are arrange in a line and space pattern. The line width of the thin conductive wire 241 is formed to be not less than 1 μm and not more than 20 μm. In addition, the pitch between the adjacent thin conductive wires 241 is formed to be not less than 0.3 mm and not more than 2 mm. Thus, since the thin conductive wire 241 is sufficiently thin, an excellent see-through property can be obtained. In addition, a volume resistivity of the thin conductive wire 241 made of copper is low. Thus, although the line width is thin, suitable heat generation can be obtained when the thin conductive wire 241 is powered. In this embodiment, the conductive pattern 240 is formed by patterning (through a step including an etching process) a copper film. Thus, as described above, this embodiment is advantageous in that a desired pattern of the thin conductive wires 241 can be easily given precisely to the heating plate 210.

The aforementioned third embodiment may be variously modified.

For example, the conductive pattern 240 of the conductive pattern sheet 220 may be provided, not on the surface of the substrate 230 on the side of the joint layer 211, but on the surface on the side of the joint layer 212. Alternatively, the conductive pattern 240 may be provided both on the surfaces of the substrate 230 on the side of the joint layer 211 and on the side of the joint layer 212.

The heating plate 210 may be used in a rear window, a side window and a sun roof of the automobile 1. In addition, the heating plate 210 may be used in a window of a vehicle other than an automobile, such as a railway, an aircraft, a vessel, a space vessel and so on.

Further, in addition to a vehicle, the heating plate 210 may be used in a part by which an inside and an outside is partitioned, such as a window of a building, a store and a house.

Although some modification examples of the above third embodiment are described, the modification examples can be naturally combined with one another for application.

Examples Related to Third Embodiment

Although the third embodiment is described in more detail herebelow by using examples, the third embodiment is not limited to these examples. In addition, a comparative example is also described.

Example 1

The heating plate 210 in Example 1 was manufactured as follows. As the substrate 230, there was firstly prepared a PET (polyethylene terephthalate) film (manufactured by TOYOBO Co., Ltd A4300) having a thickness of 100 μm, a width of 98 cm and a length of 100 m. A two-pack mixture type urethane ester-based adhesive was applied to the substrate 230 by a gravure coater, such that a thickness of the cured adhesive became 7 μm. Then, an electrolytic copper foil having a thickness of 10 μm, a width of 97 cm and a length of 80 m was laminated as the conductive metal layer 245 on the substrate 230 through an adhesive. The electrolytic copper foil and the substrate 230 were maintained for 4 days in an environment of 50° C., so that the electrolytic copper foil was secured on the substrate 230.

Thereafter, the resist layer 248 was laminated on the electrolytic copper foil (conductive metal layer 245), and was exposed in a line and space pattern of 1.5 mm in pitch and 4 μm in line width. Then, an unnecessary resist was cleaned (removed) to form the resist pattern 249. The electrolytic copper foil was etched with the resist pattern 249 serving as a mask. Then, after cleaning, there was obtained the conductive pattern sheet 220 with the conductive pattern 240 including the thin conductive wires 241 that were arranged in the line and space pattern of 1.5 mm in pitch and 4 μm in line width.

Then, the thus obtained conductive pattern sheet 220 was cut to have an upper base of 125 cm, a lower base of 155 cm and a height of 96 cm. Then, the conductive pattern sheet 220 was disposed between the glass plates 211, 212 having a shape, when viewed in a normal direction, which has an upper base of 120 cm, a lower base of 150 cm and height of 95 cm, through the joint layers 213, 214 formed of PBV adhesive sheets having the same size as that of the glass plates 211, 212. Then, the laminate of these members was heated/pressurized (vacuum laminated). Then, the joint layer and the conductive pattern sheet 220 projecting from between the glass plates 211, 212 were trimmed so as to obtain the heating plate 210 according to Example 1.

Upon inspection of the heating plate 210 according to Example 1 with eyes, the heating plate 210 was found to have an excellent see-through property. In addition, light beam stripes were not conspicuous. Light beam stripes are visible stripes of light. When a heating wire (thin conductive wire) in a defroster apparatus is thick, light beam strips tend to be large and thus can be conspicuous. Since a resistance between the wiring parts 15 was 0.7Ω, it was confirmed that suitable heat generation could be obtained when the heating plate 210 was powered. The above resistance between the wiring parts 15 was a resistance in a case where a current of 12V was applied.

Example 2

The heating plate 210 in Example 2 was manufactured as follows. As the substrate 230, there was firstly prepared a PET (polyethylene terephthalate) film (manufactured by TOYOBO Co., Ltd A4300) having a thickness of 100 μm, a width of 98 cm and a length of 100 m. Copper was spattered to the substrate 330 though an adhesive primer such that the copper had a thickness of 500 nm. Further, copper was laminated by plating on the spattered copper, so as to obtain a conductive metal layer (copper film) 345 formed of the spattered copper film and the plated copper, with a total thickness of 2 μm.

Thereafter, the resist layer 248 was laminated on the conductive metal layer 245, and was exposed in a line and space pattern of 0.3 mm in pitch and 2 μm in line width. Then, an unnecessary resist was cleaned (removed) to form the resist pattern 249. The copper film was etched with the resist pattern 249 serving as a mask. Then, after cleaning, there was obtained the conductive pattern sheet 220 with the conductive pattern 240 including the thin conductive wires 241 that were arranged in the line and space pattern of 0.3 mm in pitch and 2 μm in line width.

Then, the thus obtained conductive pattern sheet 220 was cut to have an upper base of 125 cm, a lower base of 155 cm and a height of 96 cm. Then, the conductive pattern sheet 220 was disposed between the glass plates 211, 212 having a shape, when viewed in a normal direction, which has an upper base of 120 cm, a lower base of 150 cm and height of 95 cm, through the joint layers 213, 214 formed of PBV adhesive sheets having the same size as that of the glass plates 211, 212. Then, the laminate of these members was heated/pressurized (vacuum laminated). Then, the joint layer and the conductive pattern sheet 220 projecting from between the glass plates 211, 212 were trimmed so as to obtain the heating plate 210 according to Example 2.

Upon inspection of the heating plate 210 according to Example 2 with eyes, the heating plate 210 was found to have an excellent see-through property. In addition, light beam stripes were not conspicuous. Since a resistance between the wiring parts 15 was 1.3Ω, it was confirmed that suitable heat generation could be obtained when the heating plate 210 was powered. The above resistance between the wiring parts 15 was a resistance in a case where a current of 12V was applied.

Example 3

In the manufacture of the heating plate 210 in Example 3, when the conductive pattern sheet 220 was manufactured, a copper foil having a thickness of 6 μm was used. The resist layer 248 on the copper foil (conductive metal layer 245) was exposed in a line and space pattern of 1 mm in pitch and 6 μm in line width. Other than that, by using the same materials and the same steps as those of Example 1, the heating plate 210 was obtained. The conductive pattern sheet 220 in the heating plate 210 was provided with the conductive pattern 240 including the thin conductive wires 241 that were arranged in the line and space pattern of 1 mm in pitch and 6 μm in line width. In the heating plate 210 in Example 3, since a resistance between the wiring parts 15 was 0.5Ω, it was confirmed that suitable heat generation could be obtained when the heating plate 210 was powered. The above resistance between the wiring parts 15 was a resistance in a case where a current of 12V was applied.

Example 4

In the manufacture of the heating plate 210 in Example 4, when the conductive pattern sheet 220 was manufactured, a copper foil having a thickness of 10 μm was used. The resist layer 248 on the copper foil (conductive metal layer 245) was exposed in a line and space pattern of 1.7 mm in pitch and 8 μm in line width. Other than that, by using the same materials and the same steps as those of Example 1, the heating plate 210 was obtained. The conductive pattern sheet 220 in the heating plate 210 was provided with the conductive pattern 240 including the thin conductive wires 241 that were arranged in the line and space pattern of 1.7 mm in pitch and 8 μm in line width. In the heating plate 210 in Example 4, since a resistance between the wiring parts 15 was 0.4Ω, it was confirmed that suitable heat generation could be obtained when the heating plate 210 was powered. The above resistance between the wiring parts 15 was a resistance in a case where a current of 12V was applied.

Example 5

In the manufacture of the heating plate 210 in Example 5, when the conductive pattern sheet 220 was manufactured, copper was spattered to have a thickness of 1000 nm, and the conductive metal layer 245 (copper film) was laminated on the substrate 230 without plating copper. The resist layer 248 on the conductive metal layer 245 was exposed in a line and space pattern of 0.3 mm in pitch and 9 μm in line width. Other than that, by using the same materials and the same steps as those of Example 2, the heating plate 210 was obtained. The conductive pattern sheet 220 in the heating plate 210 was provided with the conductive pattern 240 including the thin conductive wires 241 that were arranged in the line and space pattern of 0.3 mm in pitch and 9 μm in line width. In the heating plate 210 in Example 5, since a resistance between the wiring parts 15 was 0.6Ω, it was confirmed that suitable heat generation could be obtained when the heating plate 210 was powered. The above resistance between the wiring parts 15 was a resistance in a case where a current of 12V was applied.

Example 6

In the manufacture of the heating plate in Example 6, a copper foil having a thickness of 6 μm was used similarly to Example 3. The resist layer 248 on the copper foil was exposed in a line and space pattern of 0.4 mm in pitch and 1 μm in line width. Other than that, by using the same materials and the same steps as those of Example 3, there was obtained a heating plate with conductive pattern sheet including the conductive pattern having the thin conductive wires that were arranged in the line and space pattern of 0.4 mm in pitch and 1 μm in line width. In the heating plate in Example 6, disconnection occurred in a lot of locations, so that suitable heat generation was not obtained when the heating plate was powered. However, unless disconnection occurred, it is considered that an excellent see-through property can be obtained as well as suitable heat generation can be obtained.

Example 7

In the manufacture of the heating plate in Example 7, a conductive metal layer, which included a spattered copper film and a plated copper, with a total thickness of 2 μm, was laminated on the substrate similarly to Example 2. The resist layer 248 on the conductive metal layer was exposed in a line and space pattern of 1 mm in pitch and 15 μm in line width. Other than that, by the same steps as those of Example 2, there was obtained a heating plate with a conductive pattern including thin conductive wires that were arranged in the line and space pattern of 1 mm in pitch and 15 μm in line width. In the heating plate in Example 7, since copper wires were visible, an excellent see-through property could not be obtained. However, there could be obtained a see-through property which did not hinder driving of an automobile, for example.

Comparative Example

In the manufacture of a heating plate in Comparative Example, a copper foil having a thickness of 10 μm was used similarly to Example 4. A resist layer on the copper foil was exposed in a line and space pattern of 3 mm in pitch and 8 μm in line width. Other than that, by the same steps as those of Example 4, there was obtained a heating plate with a conductive pattern including thin conductive wires that were arranged in the line and space pattern of 3 mm in pitch and 8 μm in line width. The heating plate in the Comparative Example had an excellent transparency. On the other hand, after being stored in a refrigerator, the heating plate in the Comparative Example was taken out and powered. In this case, increase of temperature at an intermediate between copper wires was slow, and it took more time than that of examples to defog the heating plate.

Fourth Embodiment

FIG. 1 and FIGS. 57 to 70 are views for explaining a fourth embodiment according to the present invention. In the fourth embodiment described below, a component corresponding to that of the first and second embodiments is shown by a symbol in 300s with the same last two digits, and overlapped description is omitted.

Figure 57:
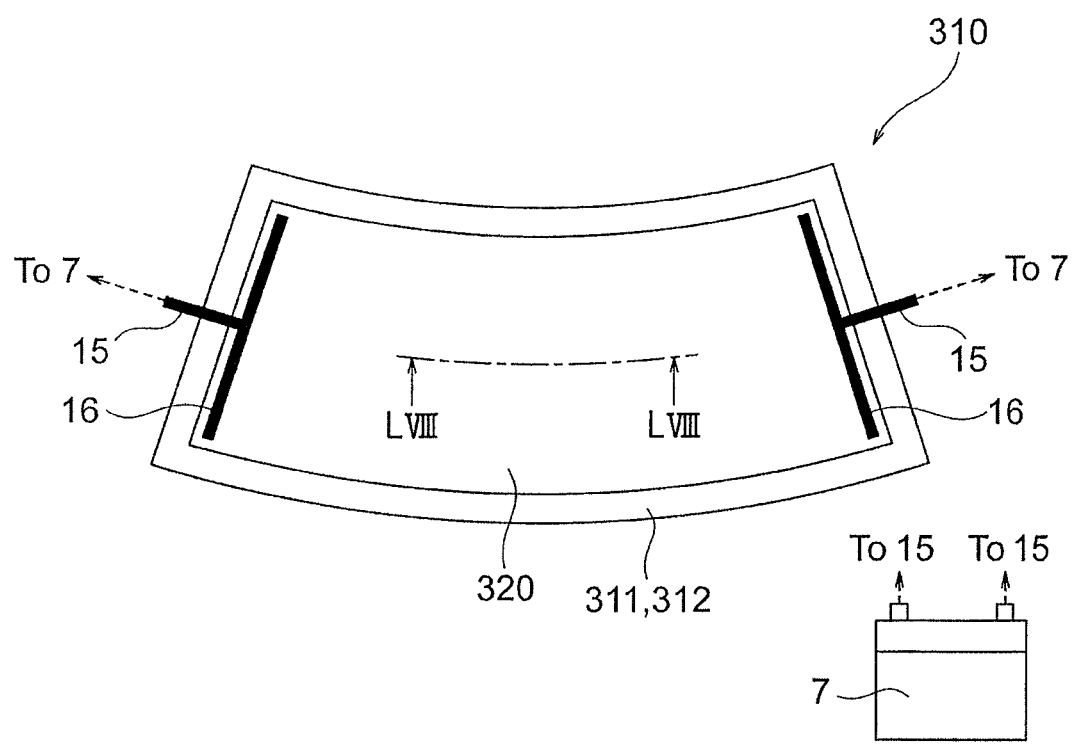
FIG. 57 is a view for explaining a fourth embodiment according to the present invention, showing the heating plate when viewed in a normal direction of a plate plane thereof.
Figure 58:
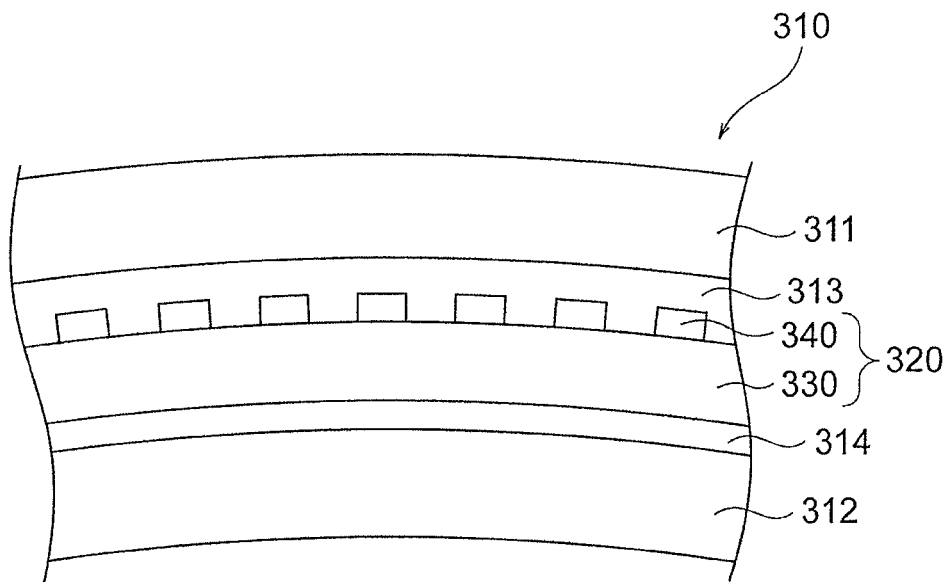
FIG. 58 is a cross-sectional view of the heating plate of FIG. 57.
Figure 59:
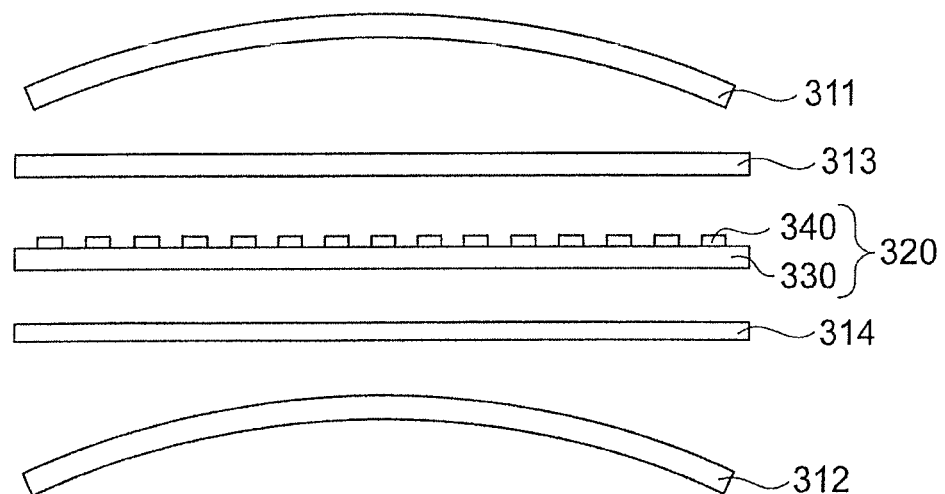
FIG. 59 is a view showing conditions of respective members constituting the heating plate of FIG. 58 before the respective members are laminated.

FIG. 57 is a view of a heating plate when viewed in a normal direction of a plate plane thereof. FIG. 58 is a cross-sectional view of the heating plate of FIG. 57. FIG. 59 is a view showing conditions of respective member constituting the heating plate of FIG. 58 before the respective members are laminated. The heating plate in this embodiment is sometimes referred to as "laminated glass".

FIG. 57 shows a heating plate 310 when viewed in a normal direction of a plate plane thereof. FIG. 58 is a cross-sectional view corresponding to a LVIII-LVIII line of the heating plate 310 of FIG. 57. The heating plate 310 includes a pair of curved glass plates 311, 312, a conductive pattern sheet (pattern sheet) 320 disposed between the pair of curved glass plates 311, 312, a joint layer 313 that joins the glass plate 311 and the conductive pattern sheet 320, and a joint layer 314 that joins the glass plate 312 and the conductive pattern sheet 320.

The conductive pattern sheet 320 includes a substrate 330, a conductive pattern (conductive pattern member) 340 formed on the substrate 330, a wiring part 15 for powering the conductive pattern 340, and a connection part 16 connecting the conductive pattern 340 and the wiring part 15.

In the example shown in FIGS. 57 and 58, the conductive pattern 340 is powered by a power source 7, such as a battery, through the wiring part 15 and the connection part 16, so that the conductive pattern 340 generates heat by means of resistance heat. The heat generated by the conductive pattern 340 is transmitted to the glass plates 311, 312 through the joint layers 313, 314, so that the glass plates 311, 312 are warmed up. Thus, due drops on the glass plates 311, 312 can be removed so that the glass plates 311, 312 can be defogged. When there is snow or ice on the glass plates 311, 312, the snow or ice can be unfrozen. Thus, an excellent field of view of a passenger can be ensured.

In order to manufacture the heating plate 310, as shown in FIG. 59, the curved glass plate 311, the joint layer 313, the conductive pattern sheet 320, the joint layer 314 and the curved glass plate 312 are superposed in this order, and heated/pressurized, so that the curved glass plate 311, the conductive pattern sheet 320 and the curved glass plates 312 are joined through the joint layers 313, 314.

Particularly when used as a front window, the glass plate 311, 312 preferably has a high visible light transmittance in order not to hinder a field of view of a passenger. A material of such a glass plate 311, 312 may be soda lime glass, blue plate glass and so on, for example. The glass plate 311, 312 preferably has a transmittance of 90% or more in a visible light area. The visible light transmittance of the glass plate 311, 312 is specified as follows. Transmittance of light with measurement wavelength range of from 380 nm to 780 nm is measured by using a spectrophotometer (manufactured by Shimadzu Corporation, "UV-3100PC", compliant with JIS K 0115). The visible light transmittance is an average value of the transmittances at the respective wavelengths. The visible light transmittance may be lowered by partially or totally coloring the glass plate 311, 312, for example. In this case, direct sunlight can be shielded and an inside of the automobile is less visible from outside.

In addition, the glass plate 311, 312 preferably has a thickness of not less than 1 mm and not more than 5 mm. With such a thickness, the glass plate 311, 312 excellent in strength and optical properties can be obtained.

The glass plates 311, 312 and the conductive pattern sheet 320 are joined to each other through the joint layers 313, 314, respectively. As such a joint layer 313, 314, a layer made of a material having various adhesion properties or glueing (pressure sensitive adhesive) properties. In addition, the joint layer 313, 314 preferably has a high visible light transmittance. A typical joint layer may be a layer made of polyvinyl butyral (PVB), for example. The joint layer 313, 314 preferably has a thickness of not less than 0.15 mm and not more than 0.7 mm.

Not limited to the illustrated example, the heating plate 310 may be provided with another function layer for exerting a specific function. In addition, one function layer may exert two or more functions. Alternatively, for example, a function may be given to at least one of the glass plate 311, 312 of the heating plate 310, the joint layer 313, 314 thereof, and the substrate 330 of the conductive pattern sheet 320 thereof, which is described later. The function that can be given to heating plate 310 may be an antireflection (AR) function, a hard coat (HC) function having an abrasion resistance, an infrared ray shield (reflection) function, an ultraviolet ray shield (reflection) function, a polarizing function, an antifouling function and so on, for example.

Next, the conductive pattern sheet 320 is described. The conductive pattern sheet 320 includes the substrate 330, the conductive pattern 340 disposed on the substrate 330, the wiring part 15 for powering the conductive pattern 240, and the connection part 16 connecting the conductive pattern 340 and the wiring part 15. The conductive pattern sheet 320 may have a planar dimension substantially the same as that of the glass plate 311, 312 so as to be placed all over the heating plate 310. Alternatively, the conductive pattern sheet 320 may be placed over only a part of the heating plate 310, such as a part in front of a driver's seat.

The substrate 330 functions as a substrate that supports the conductive pattern 340. The substrate 330 is an electrically insulating substrate that transmits light of a wavelength (380 nm to 780 nm) of a visible light wavelength band, which is generally recognized as transparent. The substrate 330 contains a thermoplastic resin.

A thermoplastic resin contained as a main component in the substrate 330 may be any thermoplastic resin as long as it transmits visible light. The thermoplastic resin may be an acryl resin made of, e.g., polymethyl methacrylate, a polyolefin resin made of e.g., polypropylene, a polyester resin made of, e.g., polyethylene terephthalate or polyethylene naphthalate, a cellulose-based resin made of, e.g., triacetyl cellulose (cellulose triacetate), polyvinyl chloride, polystyrene, a polycarbonate resin, an AS resin and so on, for example. In particular, an acryl resin and polyethylene terephthalate are preferred because of their excellent optical properties and moldability.

In addition, in consideration of support property during manufacture and light transmission of the conductive pattern 340, the substrate 330 preferably has a thickness of not less than 0.02 mm and not more than 0.20 mm.

Figure 60:
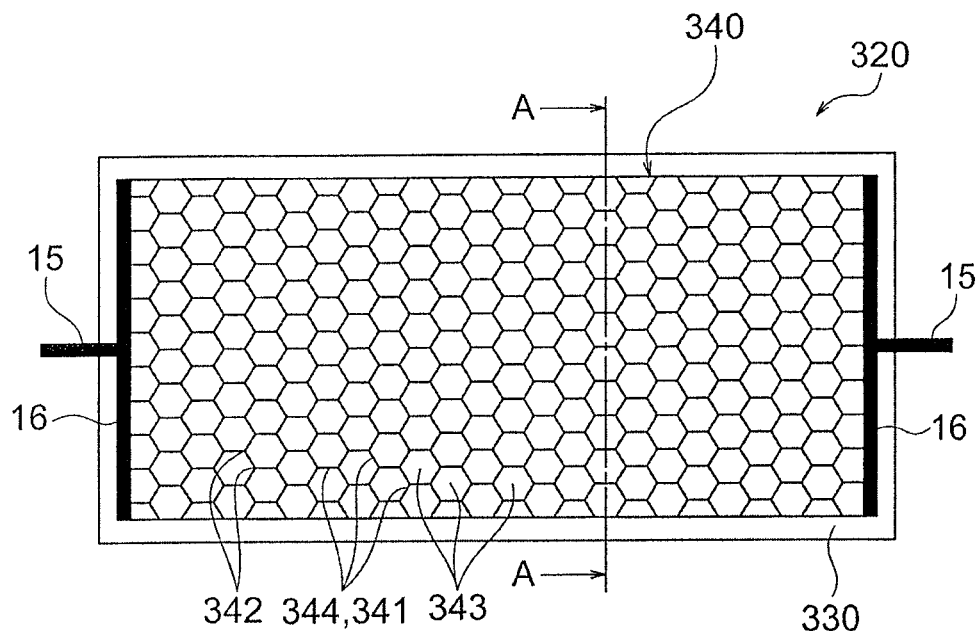
FIG. 60 is a plan view showing an example of the conductive pattern.

The conductive pattern 340 is described with reference to FIGS. 60 to 62. FIG. 60 is a plan view of the conductive pattern sheet 320 when viewed in a normal direction of a sheet plane thereof, showing an example of an arrangement pattern of the conductive pattern 340.

The conductive pattern 340 is powered by the power source 7, such as a battery, through the wiring part 15 and the connection part 16, so as to generate heat by means of resistance heat. The heat is transmitted to the glass plate 311, 312 through the joint layers 313, 314, so that the glass plates 311, 312 are warmed up.

The conductive pattern 340 shown in FIG. 60 is a member including thin conductive wires 341 that are arranged in a mesh pattern defining a number of openings 343. The conductive pattern 340 is a member that is also referred to as conductive mesh. The conductive pattern 340 includes a plurality of connection elements 344 that extend between two branch points 342 to define the openings 343. Namely, the thin conductive wires 341 are an aggregation of a number of the connection elements 344 each forming the branch points 342 at both ends thereof. Particularly in the illustrated example, the three connection elements 344 are connected at equal angles at each branch point 342, so that there are defined a number of the openings 343 of the same honeycomb shape (hexagonal shape) each of which is surrounded by the six connection elements 344.

In the illustrated example, the conductive pattern 340 includes the thin conductive wires 341 that are arranged in a mesh pattern in which the openings 343 of the same honeycomb shape are regularly defined. However, not limited to the mesh pattern, the conductive pattern 340 may have the thin conductive wires 341 that are arranged in various mesh patterns such as in a mesh pattern (grid pattern) in which the openings 343 of the same shape such as a triangular shape or a rectangular shape are regularly defined, a mesh pattern in which the openings 343 of different shapes are regularly defined, a mesh pattern in which the openings 343 of different shapes are irregularly defined, such as a Voronoi mesh pattern, and so on. In the case of a honeycomb pattern, current can be smoothly branched at the branch point 342 into two directions to change traveling directions. Thus, since current easily flows throughout the conductive pattern 340, uniform heat generation occurs in the conductive pattern 340 as a whole, to thereby improve a see-through property.

In this embodiment, a copper film is used as a material for constituting such a conductive pattern 240. A copper film means an electrolytic copper foil, a rolled copper foil, a copper film formed (deposited) by a spattering method, a vacuum deposition method and so on. Although the details are described later, the conductive pattern 340 is formed by patterning a copper film by an etching process.

Figure 61:
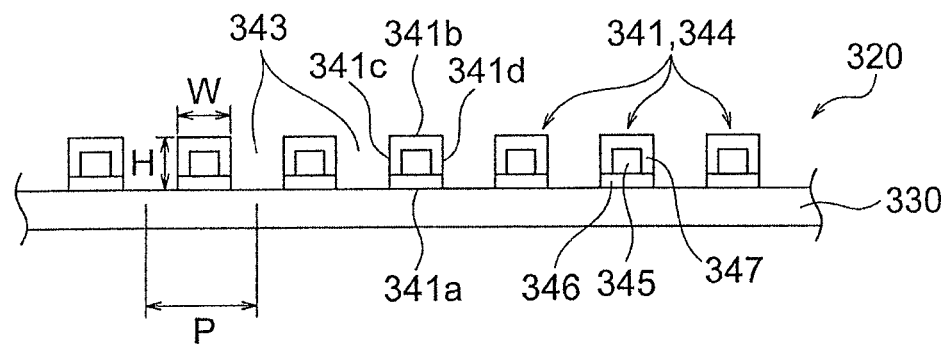
FIG. 61 is a sectional view corresponding to an A-A line of FIG. 60, showing an example of a sectional shape of the thin conductive wire.

FIG. 61 is a sectional view corresponding to an A-A line of FIG. 60, showing an example of a sectional shape of the thin conductive wire. The thin conductive wires 341 (connection elements 344) constituting the conductive pattern 340 are formed on the substrate 330. In the illustrated example, the thin conductive wire 341 has a surface 341a on the side of the substrate 330, a surface 341b on the side opposed to the substrate 330, and side surfaces 341c, 341d. The thin conductive wire 341 has substantially a rectangular section in general. In this embodiment, a line width W (herebelow simply as "width") of the thin conductive wire 341, i.e., the width W along the sheet plane of the substrate 330 is not less than 1 µm and not more than 20 µm, preferably not less than 2 µm and not more than 15 µm. Thus, the conductive pattern 340 is seen transparent in general, and has an excellent see-through property. In addition, a height (thickness) H of the thin conductive wire 341, i.e., the height (thickness) H along the normal direction to the sheet plane of the substrate 330 is preferably not less than 1 µm and not more than 20 µm, and more preferably not less than 1 µm and not more than 10 µm. Since the thin conductive wire 341 having such a height dimension, in addition to the line width W, is sufficiently thin, the conductive pattern 340 can be effectively made invisible.

In FIG. 61, the symbol P represents a pitch between the adjacent openings 343 (distance between centers of the adjacent openings 343) in the honeycomb pattern of the conductive pattern 340 when it has a honeycomb pattern. The pitch P is preferably not less than 0.3 mm and not more than 7.0 mm, and more preferably not less than 0.3 mm and not more than 2 mm. When the conductive pattern 340 has a grid pattern, a pitch between adjacent rectangular openings in the grid pattern is preferably not less than 0.3 mm and not more than 7.0 mm, and more preferably not less than 0.3 mm and not more than 2 mm.

In addition, the thin conductive wire 341 includes a first dark color layer 346 disposed on the substrate 330, a conductive metal layer 345 disposed on the first dark color layer 346, and a second dark color layer 347 disposed on the conductive metal layer 345. In other words, the surface of the conductive metal layer 345 on the side of the substrate 330 is covered with the first dark color layer 346, and the surface of the conductive metal layer 345 on the side opposed to the substrate 330 and both side surfaces thereof are covered with the second dark color layer 347.

The conductive metal layer 345 made of a metal material has relatively a high reflectance. When light is reflected on the conductive metal layer 345 forming the thin conductive wires 341 of the conductive pattern 340, the reflected light may be visible, which hinders a field of view of a passenger. In addition, when the conductive metal layer 345 is visible from outside, design is sometimes impaired. Thus, the dark color layers 346, 347 are disposed at least a part of the surface of the conductive metal layer 345. The dark color layers 346, 347 are layer having a visible light reflectance that is lower than that of the conductive metal layer 345, and are black-colored dark color layers, for example. Due to the dark color layers 346, 347, the conductive metal layer 345 becomes less visible, whereby an excellent field of view of a passenger can be ensured. In addition, impairment of design when seen from outside can be prevented. However, such dark color layers 346, 347 may be omitted. In this case, the width W of the thin conductive wire 341 is a width of the single conductive metal layer 345.

Figure 62:
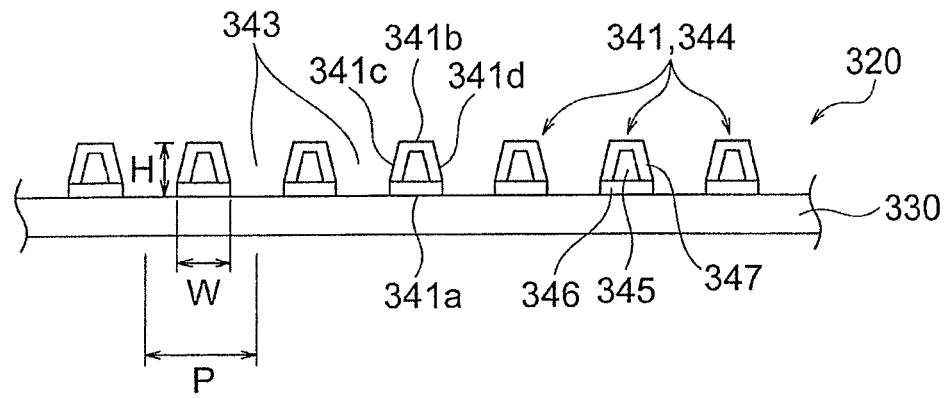
FIG. 62 is a sectional view corresponding to the A-A line of FIG. 60, showing another example of a sectional shape of the thin conductive wire.

FIG. 62 is a sectional view corresponding to the A-A line of FIG. 60, showing another sectional shape of the thin conductive wire. In the illustrated example, the thin conductive wire 341 (connection element 344) includes a surface 341a on the side of the substrate 330, a surface 341b on the side opposed to the substrate 330, and side surfaces 341c, 341d. The surface 341a on the side of the substrate 330 and the surface 341b on the side opposed to the substrate 330 are in parallel. The side surface 341c forms a tapered surface that is tapered to come close to the side surface 341d as a certain point in the side surface 341c moves away from the substrate 330 along the normal direction of the sheet plane of the conductive pattern sheet 320. The side surface 341d also forms a tapered surface that is tapered to come close to the side surface 341c as a certain point in the side surface 341d moves away from the substrate 330 along the normal direction of the sheet plane of the conductive pattern sheet 320. The thin conductive wire 341 has substantially a trapezoidal section in general. Namely, the width of the thin conductive wire 341 changes to narrow as a certain point in the thin conductive wire 341 moves away from the substrate 330 along the normal direction of the conductive pattern sheet 320. In addition, similarly to the example shown in FIG. 61, the surface of the conductive metal layer 345 on the side of the substrate 330 is covered with the first dark color layer 346, and the surface of the conductive metal layer 345 on the side opposed to the substrate 330 and both side surfaces thereof are covered with the second dark color layer 347.

FIG. 62 shows that the thin conductive wire 341 has substantially a trapezoidal section in general, and that the width of the thin conductive wire 341 changes to narrow as a certain point in the thin conductive wire 341 moves away from the substrate 330 along the normal direction of the conductive pattern sheet 320. However, not limited thereto, the side surfaces 341c, 341d may be formed of curved lines, or may be formed in a tier-like shape. In addition, the width of the thin conductive wire 341 may be partially wider as a certain point in the thin conductive wire 341 moves away from the substrate 330 along the normal direction of the conductive pattern sheet 320. Namely, when the section of the thin conductive wire 341 is seen generally and comprehensively, it is sufficient that the width of the conductive wire 341 changes to narrow as a certain point in the thin conductive wire 341 moves away from the substrate 330 along the normal direction of the conductive pattern sheet 320.

In the example shown in FIG. 62, since the width of the thin conductive wire 341 changes to narrow as a certain point in the thin conductive wire 341 moves away from the substrate 330 along the normal direction of the conductive pattern sheet 320, when the glass plates 311, 312, the joint layers 313, 314 and the conductive pattern sheet 320 are laminated, the conductive pattern 340 can be reliably embedded in the joint layer 313, and bubbles in an interface between the conductive pattern 340 and the joint layer 313 can be restrained from remaining therein.

Next, an example of a manufacturing method of the heating plate 310 is described with reference to FIGS. 63 to 70. FIGS. 63 to 70 are sectional views showing the example of the manufacturing method of the heating plate 310 in sequence, particularly views for explaining manufacture of the conductive pattern sheet 320 in detail. After the conductive pattern sheet 320 is manufactured, the conductive pattern sheet 320 is sandwiched between the glass plates 311, 312 so that the heating plate 310 is manufactured.

Figure 63:
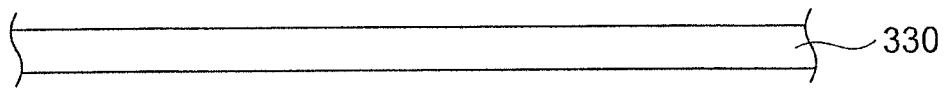
FIG. 63 is a view for explaining an example of a manufacturing method of the heating plate.

In order to manufacture the conductive pattern sheet 320, as shown in FIG. 63, the substrate 330 is firstly prepared. The substrate 330 is an electrically insulating substrate that transmits light of a wavelength (380 nm to 780 nm) of a visible light wavelength band, which is generally recognized as transparent. The substrate 330 contains a thermoplastic resin.

Figure 64:
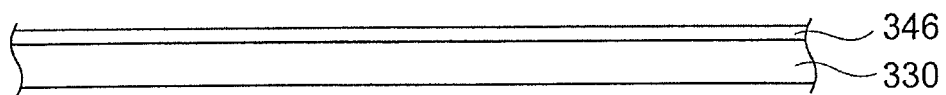
FIG. 64 is a view for explaining the example of the manufacturing method of the heating plate.

Then, as shown in FIG. 64, the first dark color 346 is disposed on the substrate 330. For example, the first dark color layer 363 can be disposed on the substrate 330 by a plating method including electrolytic plating and electroless plating, a spattering method, a vacuum deposition method, an ion plating method, a PVD method and a CVD method other than these methods, or a combination method of the two or more methods. Various known materials may be used as material of the first dark color layer 346. For example, the material may be copper nitride, copper oxide, nickel nitride and so on.

Figure 65:
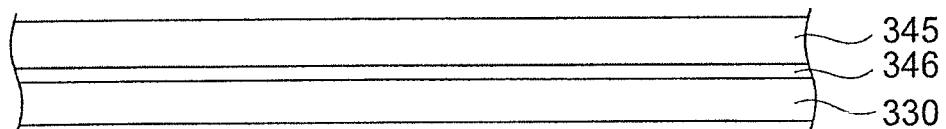
FIG. 65 is a view for explaining the example of the manufacturing method of the heating plate.

Then, as shown in FIG. 65, the conductive metal layer 345 is disposed on the first dark color layer 346. The conductive metal layer 345 is a layer formed of a copper film. When an electrolytic copper foil or a rolled copper foil is used to form the conductive metal layer 345, the conductive metal layer 345 is disposed on the first dark color layer 346 through a two-pack mixture type urethane ester-based adhesive (illustration omitted), for example. When an electrolytic copper foil is used, an electrolytic copper foil of not more than 7 μm is preferably used in order to make thin the thin conductive wire 341 as much as possible. When a copper film formed by a spattering method or a vacuum vapor deposition method is used for forming the conductive metal layer 345, the conductive metal layer 345 is disposed by depositing a film on the first dark color layer 346 through an adhesive primer (illustration omitted). When a copper film formed by a spattering method or a vacuum vapor deposition method is used as the conductive metal layer 345, an electrolytic plated layer may be deposited on the copper film, so as to form the conductive metal layer 345 including the copper film formed by a spattering method or a vacuum vapor deposition method, and the electrolytic plated layer. As a film deposition method for a copper film, a spattering method, a vacuum vapor deposition method, an ion plating method, a PVD method other than these methods or a combination method thereof may be employed. In addition, as described above, a copper film may be formed by an electrolytic plating method. Moreover, it is possible to employ a method in which an electrolytic plating method is combined to the above described spattering method, the vacuum vapor deposition method, the ion plating method and so on.

Figure 66:
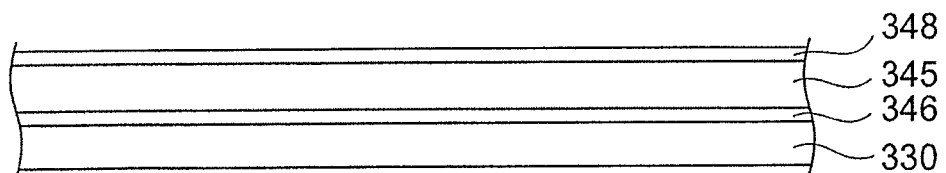
FIG. 66 is a view for explaining the example of the manufacturing method of the heating plate.

Then, as shown in FIG. 66, the resist layer 348 is disposed on the conductive metal layer 345. The resist layer 348 is a resin layer having a photosensitivity to light of a predetermined wavelength range, such as ultraviolet light. The resin layer may be formed by adhering a resin film, or may be formed by applying a flowable resin. A concrete photosensitive property of the resist layer 348 is not specifically limited. For example, a photo-curing type photosensitive material or a photo-dissolving photosensitive material may be used as the resist layer 348.

Figure 67:
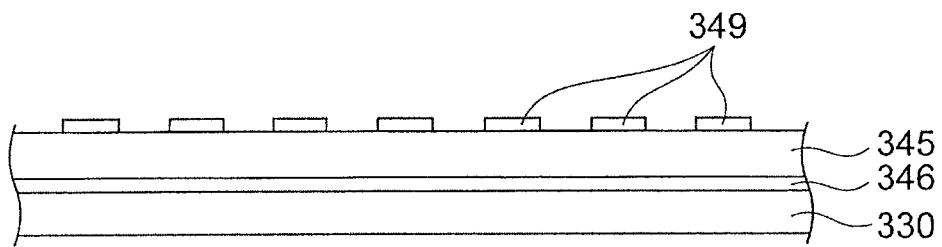
FIG. 67 is a view for explaining the example of the manufacturing method of the heating plate.

Thereafter, as shown in FIG. 67, the resist layer 348 is patterned to form the resist pattern 349. Various known methods may be used as the method of patterning the resist pattern 349. In this example, a resin layer having a photosensitivity to light of a predetermined wavelength range, such as ultraviolet light, is used as the resist layer 348, and a known photolithographic technique is used for patterning the resist layer 348. Firstly, a mask which opens a part to be patterned or a mask which shields a part to be patterned is placed on the resist layer 348, and the resist layer 348 is irradiated with ultraviolet light through the mask. Thereafter, the part shielded by the mask from the ultraviolet light or the part irradiated with the ultraviolet light is removed by means of developing or the like. Thus, the patterned resist pattern 349 can be formed. A laser patterning method without mask can be used.

Figure 68:
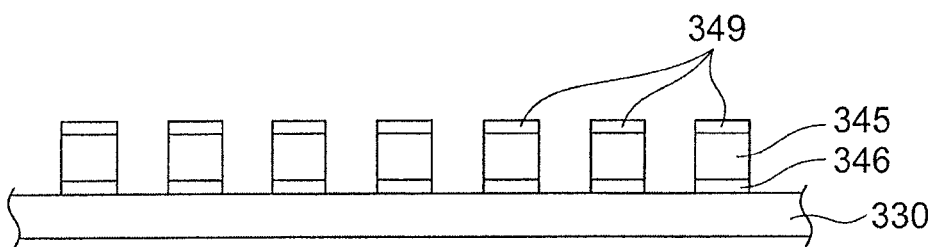
FIG. 68 is a view for explaining the example of the manufacturing method of the heating plate.
Figure 69:
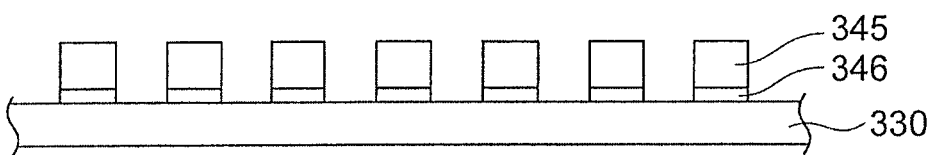
FIG. 69 is a view for explaining the example of the manufacturing method of the heating plate.
Figure 70:
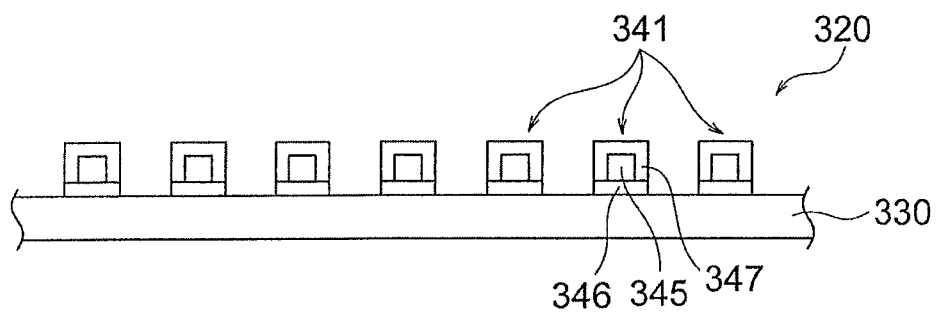
FIG. 70 is a view for explaining the example of the manufacturing method of the heating plate.

Then, as shown in FIG. 68, the conductive metal layer 345 and the first dark color layer 346 are etched with the resist pattern 349 serving as a mask. Due to this etching process, the conductive metal layer 345 and the first dark color layer 346 are patterned substantially similar to the resist pattern 349. The etching method is not particularly limited, and a known method may be employed. The known method may be a wet etching method using etchant, a plasma etching method and so on. Thereafter, as shown in FIG. 69, the resist pattern 349 is removed.

Finally, the second dark color layer 347 is formed on the surface 341$b$ of the conductive metal layer 345 on the side opposed to the substrate 330 and the side surfaces 341$c$, 341$d$. The second dark color layer 347 is formed by, e.g., subjecting a part of a material constituting the conductive metal layer 345 to a darkening treatment (blackening treatment). Namely, in this case, the second dark color layer 347 made of metallic oxide or metallic sulfide can be formed from the part constituting the conductive metal layer 345. Alternatively, the second dark color layer 347 as a coating film made of a dark color material or a plated layer made of nickel or chrome may be disposed on the surface of the conductive metal layer 345. In addition, the surface of the conductive metal layer 345 may be roughened, and the second dark color layer 347 may be disposed thereon.

In this example, the second dark color layer 347 is formed on the surface 341$b$ of the conductive metal layer 345 on the side opposed to the substrate 330 and the side surfaces 341$c$, 341$d$. However, not limited thereto, the second dark color layer 347 may be formed only on the surface 341$b$ of the conductive metal layer 345 on the side opposed to the substrate 330, or only on the side surfaces 341$c$, 341$d$ of the conductive metal layer 345.

When the second dark color layer 347 is formed only on the surface 341$b$ of the conductive metal layer 345 on the side opposed to the substrate 330, after the step shown in FIG. 65, for example, the second dark color layer 347 and the resist layer 348 are disposed in this order on the conductive metal layer 345, and the resist pattern 349 is formed by patterning the resist layer 348. Thereafter, the second dark color layer 347, the conductive metal layer 345 and the first dark color layer 346 are etched with the resist pattern 349 serving as a mask.

Alternatively, when the second dark color layer 347 is formed only on the side surfaces 341$c$, 341$d$ of the conductive metal layer 345, after the step shown in FIG. 68, for example, the second dark color layer 347 is formed without removing the resist pattern 349. After that, the resist pattern 349 is removed.

When the first dark color layer 346 is not necessary, the step of disposing the first dark color layer 346 on the substrate 330, which is shown in FIG. 64, is omitted.

Then, after the above conductive pattern sheet 320 is manufactured, the curved glass plate 311, the joint layer 313, the conductive pattern sheet 320, the joint layer 314 and the curved glass plate 312 are superposed in this order and heated/pressurized, so that the heating plate 310 is manufactured. The heating plate 310 includes the pair of curved glass plates 311, 312, the conductive pattern sheet 320 disposed between the pair of curved glass plates 311, 312, the joint layer 313 disposed between the glass plate 311 and the conductive pattern sheet 320 to join the glass plate 311 and the conductive pattern sheet 320, and the joint layer 314 disposed between the glass plate 312 and the conductive pattern sheet 320 to join the glass plate 312 and the conductive pattern sheet 320. The conductive pattern sheet 320 includes the substrate 330 and the conductive pattern 340 formed on the substrate 330. A desired pattern is easily given precisely to the conductive pattern 340 by the aforementioned patterning method. Thus, it is possible to manufacture the heating plate 310 having an excellent optical property.

According to the heating plate 310 in the fourth embodiment, the conductive pattern 340 includes the thin conductive wires 341 formed of a patterned copper film and arranged in a mesh pattern. The line width of the thin conductive wire 341 is formed to be not less than 1 µm and not more than 20 µm. Thus, since the thin conductive wire 341 is sufficiently thin, an excellent see-through property can be obtained. In addition, a volume resistivity of the thin conductive wire 341 made of copper is low. Thus, although the line width is thin, suitable heat generation can be obtained when the thin conductive wire 341 is powered.

The aforementioned fourth embodiment may be variously modified.

For example, the conductive pattern 340 of the conductive pattern sheet 320 may be provided, not on the surface of the substrate 330 on the side of the glass plate 311, but on the surface on the side of the glass plate 312. Alternatively, the conductive pattern 340 may be provided both on the surfaces of the substrate 330 on the side of the glass plate 311 and on the side of the glass plate 312.

The heating plate 310 may be used in a rear window, a side window and a sun roof of the automobile 1. In addition, the heating plate 310 may be used in a window of a vehicle other than an automobile, such as a railway, an aircraft, a vessel, a space vessel and so on.

Further, in addition to a vehicle, the heating plate 310 may be used in a part by which an inside and an outside is partitioned, such as a window of a building, a store and a house.

Although some modification examples of the above fourth embodiment are described, the modification examples can be naturally combined with one another for application.

Examples Related to Fourth Embodiment

Although the fourth embodiment is described in more detail herebelow by using examples, the fourth embodiment is not limited to these examples.

Example 1

The heating plate 310 in Example 1 was manufactured as follows. As the substrate 330, there was firstly prepared a PET (polyethylene terephthalate) film (manufactured by TOYOBO Co., Ltd A4300) having a thickness of 100 µm, a width of 98 cm and a length of 100 m. A two-pack mixture type urethane ester-based adhesive was applied to the substrate 330 by a gravure coater, such that a thickness of the cured adhesive became 7 µm. Then, an electrolytic copper foil having a thickness of 10 µm, a width of 97 cm and a length of 80 m was laminated as the conductive metal layer 345 on the substrate 330 through an adhesive. The electrolytic copper foil and the substrate 330 were maintained for 4 days in an environment of 50° C., so that the electrolytic copper foil was secured on the substrate 330.

Thereafter, the resist layer 348 was laminated on the electrolytic copper foil (conductive metal layer 345), and was exposed in a grid pattern of 1.5 mm in pitch and 4 µm in line width. Then, an unnecessary resist was cleaned (removed) to form the resist pattern 349. The electrolytic copper foil was etched with the resist pattern 349 serving as a mask. Then, after cleaning, there was obtained the conductive pattern sheet 320 with the conductive pattern 340 including the thin conductive wires 341 that were arranged in the grid pattern. In the conductive pattern sheet 320, a pitch of openings in the grid pattern was 1.5 mm, and a line width of the thin conductive wire 341 was 4 µm.

Then, the thus obtained conductive pattern sheet 320 was cut to have an upper base of 125 cm, a lower base of 155 cm and a height of 96 cm. Then, the conductive pattern sheet 320 was disposed between the glass plates 311, 312 having a shape, when viewed in a normal direction, which has an upper base of 120 cm, a lower base of 150 cm and height of 95 cm, through the joint layers 313, 314 formed of PBV adhesive sheets having the same size as that of the glass plates 311, 312. Then, the laminate of these members was heated/pressurized (vacuum laminated). Then, the joint layer and the conductive pattern sheet 320 projecting from between the glass plates 311, 312 were trimmed so as to obtain the heating plate 310 according to Example 1.

Upon inspection of the heating plate 310 according to Example 1 with eyes, the heating plate 310 was found to have an excellent see-through property. In addition, light beam stripes were not conspicuous. Light beam stripes are visible stripes of light. When a heating wire (thin conductive wire) in a defroster apparatus is thick, light beam strips tend to be large and thus can be conspicuous. Since a resistance between the wiring parts 15 was 0.7Ω, it was confirmed that suitable heat generation could be obtained when the heating plate 310 was powered. The above resistance between the wiring parts 15 was a resistance in a case where a current of 12V was applied.

Example 2

The heating plate 310 in Example 2 was manufactured as follows. As the substrate 330, there was firstly prepared a PET (polyethylene terephthalate) film (manufactured by TOYOBO Co., Ltd A4300) having a thickness of 100 µm, a width of 98 cm and a length of 100 m. Copper was spattered to the substrate 330 though an adhesive primer such that the copper had a thickness of 500 nm. Further, copper was laminated by plating on the spattered copper, so as to obtain a conductive metal layer (copper film) 345 formed of the spattered copper film and the plated copper, with a total thickness of 2 µm.

Thereafter, the resist layer 348 was laminated on the conductive metal layer 345, and was exposed in a grid pattern of 0.3 mm in pitch and 3 µm in line width. Then, an unnecessary resist was cleaned (removed) to form the resist pattern 349. The copper film was etched with the resist pattern 349 serving as a mask. Then, after cleaning, there was obtained the conductive pattern sheet 320 with the conductive pattern 340 including the thin conductive wires 341 that were arranged in the grid pattern. In the conductive pattern sheet 320, a pitch of openings in the grid pattern was 0.3 mm, and a line width of the thin conductive wire 341 was 3 µm.

Then, the thus obtained conductive pattern sheet 320 was cut to have an upper base of 125 cm, a lower base of 155 cm and a height of 96 cm. Then, the conductive pattern sheet 320 was disposed between the glass plates 311, 312 having a shape, when viewed in a normal direction, which has an upper base of 120 cm, a lower base of 150 cm and height of 95 cm, through the joint layers 313, 314 formed of PBV adhesive sheets having the same size as that of the glass plates 311, 312. Then, the laminate of these members was heated/pressurized (vacuum laminated). Then, the joint layer and the conductive pattern sheet 320 projecting from between the glass plates 311, 312 were trimmed so as to obtain the heating plate 310 according to Example 2.

Upon inspection of the heating plate 310 according to Example 2 with eyes, the heating plate 310 was found to have an excellent see-through property. In addition, light beam stripes were not conspicuous. Since a resistance between the wiring parts 15 was 0.9Ω, it was confirmed that suitable heat generation could be obtained when the heating plate 310 was powered. The above resistance between the wiring parts 15 was a resistance in a case where a current of 12V was applied.

Example 3

In the manufacture of the heating plate 310 in Example 3, when the conductive pattern sheet 320 was manufactured, a copper foil having a thickness of 6 μm was used. The resist layer 348 on the copper foil (conductive metal layer 345) was exposed in a grid pattern of 1 mm in pitch and 6 μm in line width. Other than that, by using the same materials and the same steps as those of Example 1, the heating plate 310 was obtained. In the conductive pattern sheet 320 of the heating plate 310, a pitch of openings in the grid pattern was 1 mm, and a line width of the thin conductive wire 341 was 6 μm. In the heating plate 310 in Example 3, since a resistance between the wiring parts 15 was 0.5Ω, it was confirmed that suitable heat generation could be obtained when the heating plate 310 was powered. The above resistance between the wiring parts 15 was a resistance in a case where a current of 12V was applied.

Example 4

In the manufacture of the heating plate 310 in Example 4, when the conductive pattern sheet 320 was manufactured, a copper foil having a thickness of 10 μm was used. The resist layer 348 on the copper foil (conductive metal layer 345) was exposed in a grid pattern of 1.7 mm in pitch and 8 μm in line width. Other than that, by using the same materials and the same steps as those of Example 1, the heating plate 310 was obtained. In the conductive pattern sheet 320 of the heating plate 310, a pitch of openings in the grid pattern was 1.7 mm, and a line width of the thin conductive wire 341 was 8 μm. In the heating plate 310 in Example 4, since a resistance between the wiring parts 15 was 0.4Ω, it was confirmed that suitable heat generation could be obtained when the heating plate 310 was powered. The above resistance between the wiring parts 15 was a resistance in a case where a current of 12V was applied.

Example 5

In the manufacture of the heating plate 310 in Example 5, when the conductive pattern sheet 320 was manufactured, copper was spattered to have a thickness of 1000 nm, and the conductive metal layer 345 (copper film) was laminated on the substrate 330 without plating copper. The conductive metal layer 345 was exposed in a grid pattern of 0.3 mm in pitch and 9 μm in line width. Other than that, by using the same materials and the same steps as those of Example 2, the heating plate 310 was obtained. In the conductive pattern sheet 320 of the heating plate 310, a pitch of openings in the grid pattern was 0.3 mm, and a line width of the thin conductive wire 341 was 9 μm. In the heating plate 310 in Example 5, since a resistance between the wiring parts 15 was 0.6Ω, it was confirmed that suitable heat generation could be obtained when the heating plate 310 was powered. The above resistance between the wiring parts 15 was a resistance in a case where a current of 12V was applied.

The below Table 1 shows a line width of the thin conductive wire 341, a thickness of a copper film forming the thin conductive wire 341, a pitch of openings in the grid pattern, a measured resistance, a voltage applied upon measurement and a heating value upon application of the voltage, of the respective Examples 1 to 5. In Examples 1 to 5, a suitable heat value of from 150 to 310W could be obtained.

TABLE 1

| | Line Width [μm] | Thickness [μm] | Pitch [mm] | Resistance [Ω] | Applied Voltage [V] | Heating Value [W] |
|---|---|---|---|---|---|---|
| Ex. 1 | 4 | 10 | 1.5 | 0.7 | 12 | 170 |
| Ex. 2 | 3 | 2 | 0.3 | 0.9 | 12 | 150 |
| Ex. 3 | 6 | 6 | 1 | 0.5 | 12 | 240 |
| Ex. 4 | 8 | 10 | 1.7 | 0.4 | 12 | 310 |
| Ex. 5 | 9 | 1 | 0.3 | 0.6 | 12 | 190 |

Fifth Embodiment

FIG. 1 and FIGS. 71 to 86 are views for explaining a fifth embodiment according to the present invention. In the fifth embodiment described below, a component corresponding to that of the first to fourth embodiments is shown by a symbol in 400s with the same last two digits, and overlapped description is omitted.

Figure 71:
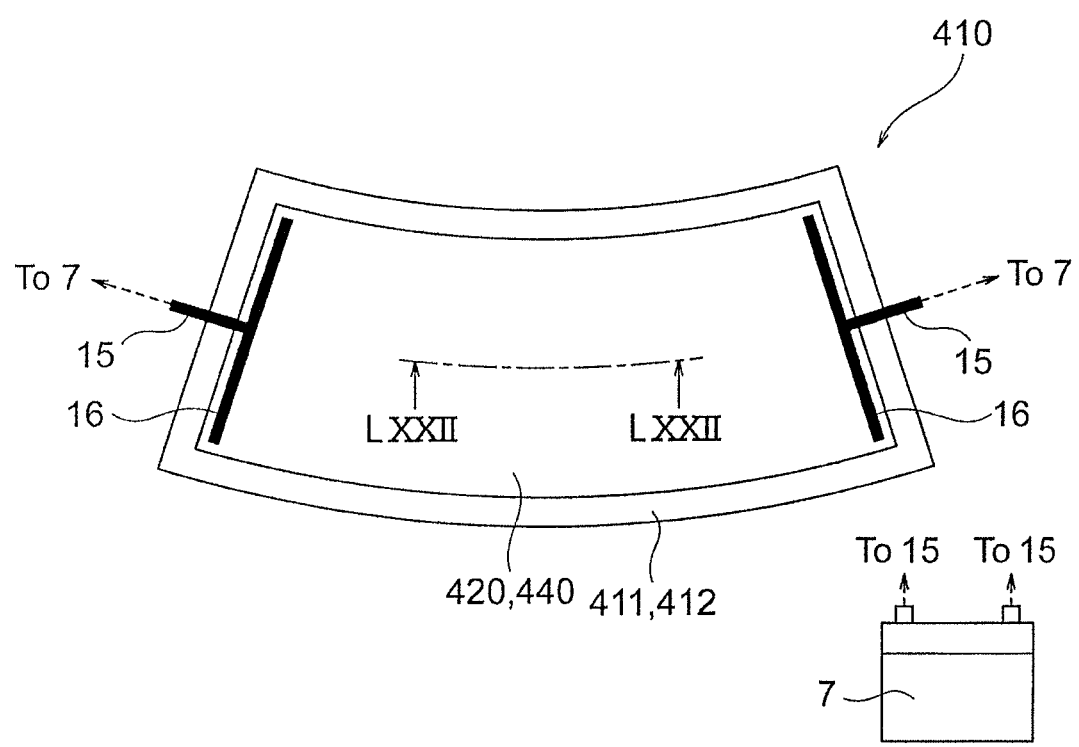
FIG. 71 is a view for explaining a fifth embodiment according to the present invention, showing the heating plate when viewed in a normal direction of a plate plane thereof.
Figure 72:
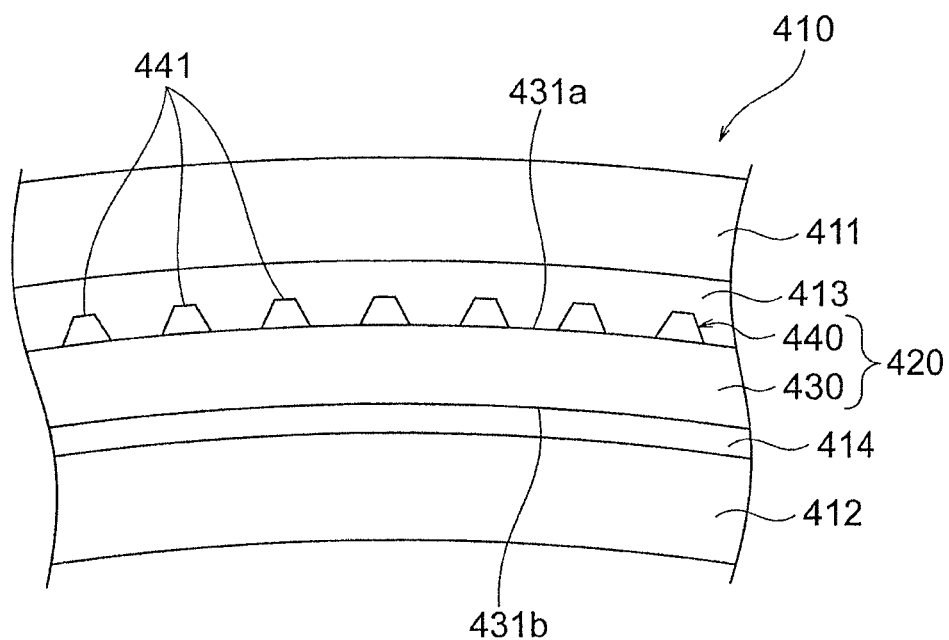
FIG. 72 is a cross-sectional view of the heating plate of FIG. 71.
Figure 73:
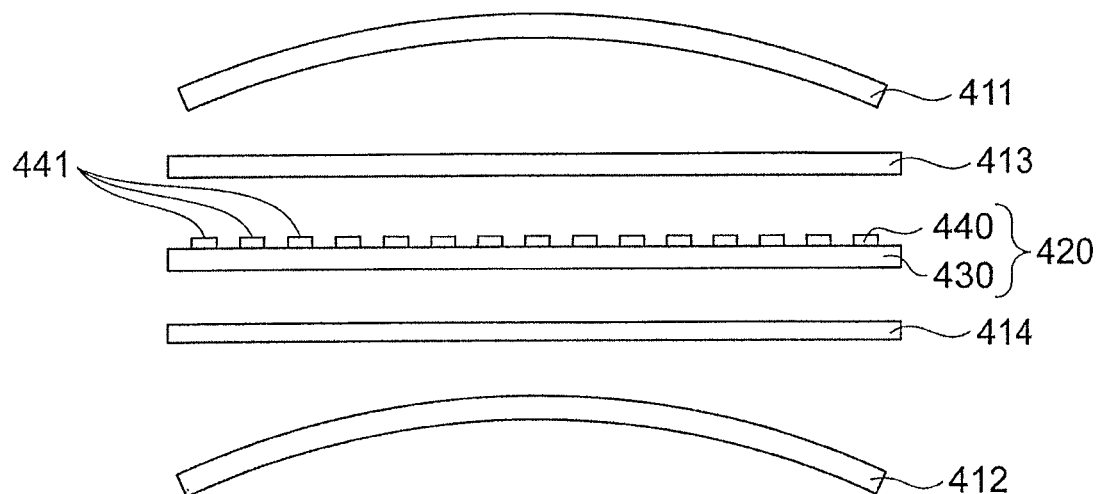
FIG. 73 is a view showing conditions of respective members constituting the heating plate of FIG. 72 before the respective members are laminated.

FIG. 71 is a view of a heating plate when viewed in a normal direction of a plate plane thereof. FIG. 72 is a cross-sectional view of the heating plate of FIG. 71. FIG. 73 is a view showing conditions of respective member constituting the heating plate of FIG. 72 before the respective members are laminated. The heating plate in this embodiment is sometimes referred to as "laminated glass".

Figure 74:
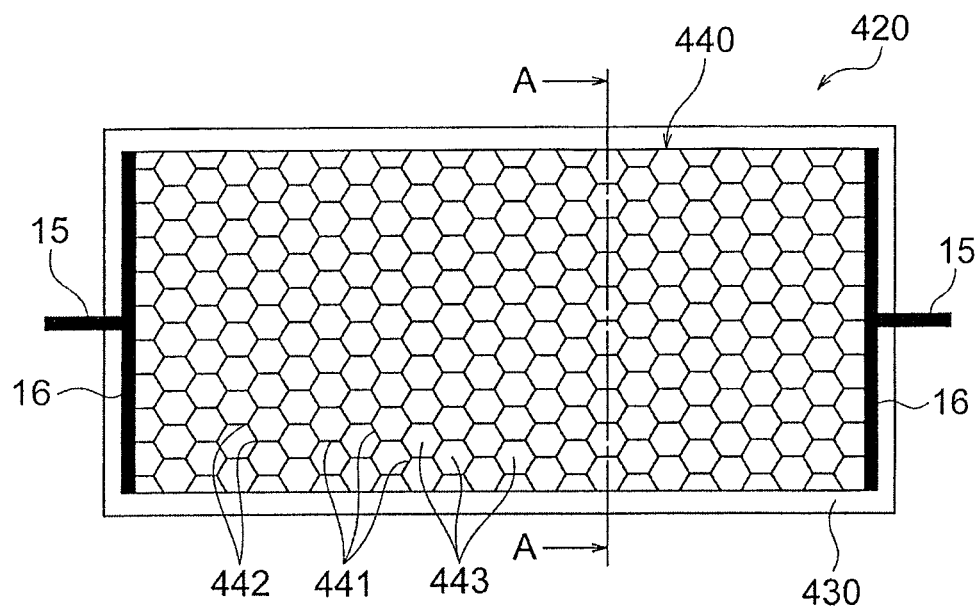
FIG. 74 is a plan view showing an example of the conductive pattern.

FIG. 71 shows a heating plate 410 when viewed in a normal direction of a plate plane thereof. FIG. 72 is a cross-sectional view corresponding to a LXXII-LXXII line of the heating plate 410 of FIG. 71. In the example shown in FIG. 72, a first glass plate 411, a first joint layer 413, a conductive pattern sheet (pattern sheet) 420, a second joint layer 414 and the second glass plate 412 are laminated in this order to form the heating plate 410. The conductive pattern sheet 420 includes a substrate 430, and a conductive pattern (conductive pattern member) 440 disposed on the substrate 430. The conductive pattern 440 includes thin conductive wires 441 that are arranged in a pattern. As shown in FIG. 74, in this embodiment, the thin conductive wires 441 are arranged in a mesh pattern, which is described in more detail below.

In addition, as described in FIG. 71, the heating plate 410 includes a wiring part 15 for powering the conductive pattern 440, and a connection part 16 connecting the conductive pattern 440 and the wiring part 15. In the illustrated example, the conductive pattern 440 is powered by a power source 7, such as a battery, through the wiring part 15 and the connection part 16, so that the conductive pattern 440 generates heat by means of resistance heat. The heat generated by the conductive pattern 440 is transmitted to the glass plates 411, 412 through the joint layers 413, 414, so that the glass plates 411, 412 are warmed up. Thus, due drops on the glass plates 411, 412 can be removed so that the glass plates 411, 412 can be defogged. When there is snow or ice on the glass plates 411, 412, the snow or ice can be unfrozen. Thus, an excellent field of view of a passenger can be ensured.

In order to manufacture the heating plate 410, as shown in FIG. 73, the curved glass plate 411, the first joint layer 413, the conductive pattern sheet 420, the second joint layer 414 and the curved glass plate 412 are superposed in this order, and heated/pressurized, so that the curved glass plate 411, the conductive pattern sheet 420 and the curved glass plates 412 are joined by the joint layers 413, 414.

The respective layers of the heating plate 410 are described below.

The glass plate 411, 412 is firstly described. Particularly when used as a front window, the glass plate 411, 412 preferably has a high visible light transmittance in order not to hinder a field of view of a passenger. A material of such a glass plate 411, 412 may be soda lime glass, blue plate glass and so on, for example. The glass plate 411, 412 preferably has a transmittance of 90% or more in a visible light area. The visible light transmittance of the glass plate 411, 412 is specified as follows. Transmittance of light with measurement wavelength range of from 380 nm to 780 nm is measured by using a spectrophotometer (manufactured by Shimadzu Corporation, "UV-3100PC", compliant with) JIS K 0115). The visible light transmittance is an average value of the transmittances at the respective wavelengths. The visible light transmittance may be lowered by partially or totally coloring the glass plate 411, 412, for example. In this case, direct sunlight can be shielded and an inside of the automobile is less visible from outside.

In addition, the glass plate 411, 412 preferably has a thickness of not less than 1 mm and not more than 5 mm. With such a thickness, the glass plate 411, 412 excellent in strength and optical properties can be obtained.

Next, the joint layers 413, 414 are described. The first joint layer 413 is disposed between the first glass plate 411 and the conductive pattern sheet 420 to join the first glass plate 411 and the conductive pattern sheet 420 to each other. In more detail, in this example, as shown in FIGS. 72 and 73, the first joint layer 413 is disposed between the first glass plate 411 and the conductive pattern 440 of the conductive pattern sheet 420 to be directly in contact with the first glass plate 411 and the thin conductive wires 441, so as to join the conductive pattern 440 to the first glass plate 411 through the thin conductive wires 441 with which the first joint layer 413 is in contact. Strictly speaking, the first joint layer 413 is directly in contact with the first glass plate 411, the thin conductive wires 441 and a surface 431a of the substrate 430, so as to join the conductive pattern 440 to the first glass plate 411 through the thin conductive wires 441 and the surface 431a with which the first joint layer 413 is in contact.

In addition, the second joint layer 414 is disposed between the second glass plate 412 and the conductive pattern sheet 420 to join the second glass plate 412 and the conductive sheet 420 to each other. In more detail, in this example, the second joint layer 414 is disposed between the second glass plate 412 and the substrate 430 of the conductive pattern sheet 420 to be directly in contact with the second glass plate 412 and the substrate 430, so as to join the substrate 430 and the second glass plate 412.

As such a joint layer 413, 414, a layer made of a material having various adhesion properties or glueing (pressure sensitive adhesive) properties can be employed. In addition, the joint layer 413, 414 preferably has a high visible light transmittance. A typical joint layer may be a layer made of polyvinyl butyral (PVB), for example. The joint layer 413, 414 preferably has a thickness of not less than 0.15 mm and not more than 1 mm.

Not limited to the illustrated example, the heating plate 410 may be provided with another function layer for exerting a specific function. In addition, one function layer may exert two or more functions. Alternatively, for example, a function may be given to at least one of the glass plate 411, 412 of the heating plate 410, the joint layer 413, 414 thereof, and the substrate 430 of the conductive pattern sheet 420 thereof, which is described later. The function that can be given to heating plate 410 may be an antireflection (AR) function, a hard coat (HC) function having an abrasion resistance, an infrared ray shield (reflection) function, an ultraviolet ray shield (reflection) function, a polarizing function, an antifouling function and so on, for example.

Next, the conductive pattern sheet 420 is described. As shown in FIGS. 71 and 72, the conductive pattern sheet 420 in this embodiment includes a sheet-like substrate 430 having a pair of opposed surfaces 431a, 431b, the conductive pattern 440 disposed on the surface 431a of the pair of opposed surfaces 431a, 431b of the substrate 430, the wiring part 15 for powering the conductive pattern 440, and the connection part 16 connecting the conductive pattern 440 and the wiring part 15. The conductive pattern sheet 420 may have a planar dimension substantially the same as that of the glass plate 411, 412 so as to be placed all over the heating plate 410. Alternatively, the conductive pattern sheet 420 may be placed over only a part of the heating plate 410, such as a part in front of a driver's seat.

The substrate 430 functions as a substrate that supports the conductive pattern 440. The substrate 430 is an electrically insulating substrate that transmits light of a wavelength (380 nm to 780 nm) of a visible light wavelength band, which is generally recognized as transparent. The substrate 430 contains a thermoplastic resin.

A thermoplastic resin contained as a main component in the substrate 430 may be any thermoplastic resin as long as it transmits visible light. The thermoplastic resin may be an acryl resin made of, e.g., polymethyl methacrylate, a polyolefin resin made of e.g., polypropylene, a polyester resin made of, e.g., polyethylene terephthalate or polyethylene naphthalate, a cellulose-based resin made of, e.g., triacetyl cellulose (cellulose triacetate), polyvinyl chloride, polystyrene, a polycarbonate resin, an AS resin and so on, for example. In particular, an acryl resin and polyethylene terephthalate are preferred because of their excellent optical properties and moldability.

In addition, in consideration of light transmittance, suitable support property of the conductive pattern 440, the substrate 430 preferably has a thickness of not less than 0.02 mm and not more than 0.20 mm.

FIG. 74 is a plan view showing an example of an arrangement pattern of the conductive pattern 440. The conductive pattern 440 is powered by the power source 7, such as a battery, through the wiring part 15 and the connection part 16, so as to generate heat by means of resistance heat. The heat is transmitted to the glass plates 411, 412 through the joint layers 413, 414, so that the glass plates 411, 412 are warmed up.

The conductive pattern 440 shown in FIG. 74 is a member including the thin conductive wires 441 that are arranged in a mesh pattern defining a number of openings 443. The conductive pattern 440 is a member that is also referred to as conductive mesh. The conductive pattern 440 includes the plurality of connection conductive wires 441 that extend between two branch points 442 to define the openings 443.

Namely, the conductive pattern 440 is an aggregation of a number of the thin conductive wires 441 each forming the branch points 442 at both ends thereof. Particularly in the illustrated example, the three thin conductive wires 441 are connected at equal angles at each branch point 442, so that there are defined a number of the openings 443 of the same honeycomb shape (hexagonal shape) each of which is surrounded by the six connection elements 441.

In the illustrated example, the conductive pattern 440 includes the thin conductive wires 441 that are arranged in a mesh pattern in which the openings 443 of the same honeycomb shape are regularly defined. However, not limited to the mesh pattern, the conductive pattern 440 may have the thin conductive wires 441 that are arranged in various mesh patterns such as in a mesh pattern (grid pattern) in which the openings 443 of the same shape such as a triangular shape or a rectangular shape are regularly defined, a mesh pattern in which the openings 443 of different shapes are regularly defined, a mesh pattern in which the openings 443 of different shapes are irregularly defined, such as a Voronoi mesh pattern, and so on. In addition, the conductive pattern 440 may have a line and space pattern formed by a plurality of the thin conductive wires 441 that are arranged in one direction.

The conductive pattern 440 may be made of one or more of gold, silver, copper, platinum, aluminum, chrome, molybdenum, nickel, titanium, palladium, indium, tungsten and an alloy thereof. The conductive pattern 440 is formed of a metal film in which the thin conductive wires 441 are patterned by etching. The conductive pattern 440 may include a thin wire, i.e., a connection wire connecting the adjacent thin conductive wires 441.

Figure 75:
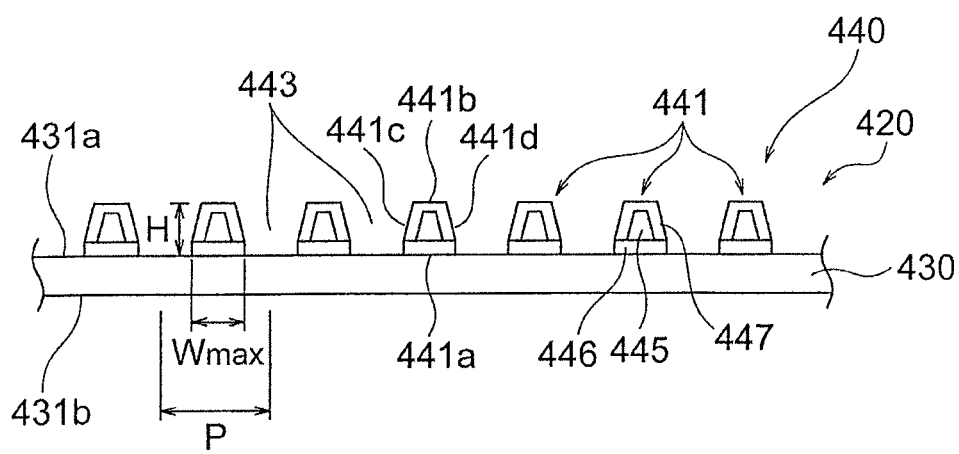
FIG. 75 is a sectional view corresponding to an A-A line of FIG. 74, showing a sectional shape of the thin conductive wire.

FIG. 75 is a sectional view showing the A-A line of FIG. 74, showing a sectional shape of the thin conductive wire 441. FIG. 75 shows the sectional shape of the thin conductive wire 441 in a direction perpendicular to an extension direction of the thin conductive wire 441 (referred to simply as "sectional shape" or "section" herebelow). The thin conductive wires 441 constituting the conductive pattern 440 are formed on the substrate 430 (surface 431a). In the illustrated example, the thin conductive wire 441 includes a surface 441a on the side of the substrate 430, a surface 441b on the side opposed to the substrate 430, and side surfaces 441c, 441d. In the illustrated example, the surface 441a on the side of the substrate 430 and the surface 441b on the side opposed to the substrate 430 are in parallel. The side surface 441c forms a tapered surface that is tapered to come close to the side surface 441d as a certain point in the side surface 441c moves away from the substrate 430 along a normal direction of the sheet plane of the conductive pattern sheet 420. The side surface 441d also forms a tapered surface that is tapered to come close to the side surface 441c as a certain point in the side surface 441d moves away from the substrate 430 along the normal direction of the sheet plane of the conductive pattern sheet 420. Namely, the thin conductive wire 441 has substantially a trapezoidal section in general, in the sectional view perpendicular to the extension direction thereof.

More specifically, the thin conductive wire 441 is formed such that a line width thereof narrows along the normal direction to the sheet plane of the substrate 430, i.e., the line width narrows as a certain point in the thin conductive wire 441 moves away outward from the surface 431a. In addition, as shown in FIG. 72, when the conductive pattern sheet 420 is incorporated in the heating plate 410, the thin conductive wire 441 is formed such that its line width narrows as a certain point in the thin conductive wire 441 comes close to the first glass plate 411 located on the side of the first joint layer 413 in contact with the thin conductive wire 441 (The thin conductive wire 441 is formed such that its line gradually becomes smaller towards the first glass plate 411 located on the side of the first joint layer 413 in contact with the thin conductive wire 441).

Figure 76A:
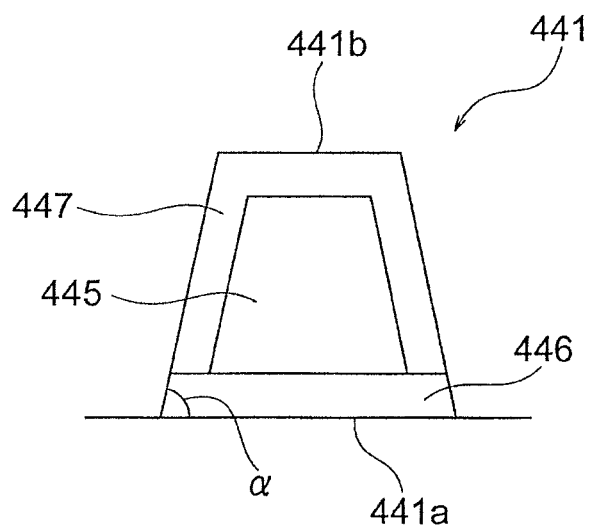
FIG. 76A is an enlarged view of the sectional shape of the thin conductive wire shown in FIG. 75.
Figure 76B:
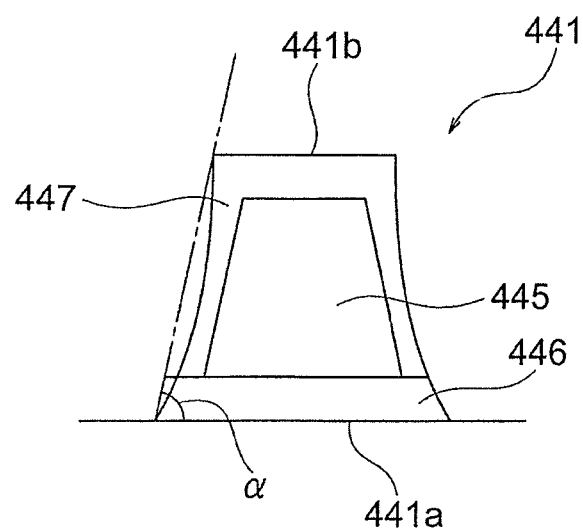
FIG. 76B is an enlarged view of the sectional shape of the thin conductive wire.

FIG. 76A and FIG. 76B are enlarged views of the sectional shape of the thin conductive wire 441 shown in FIG. 75. FIG. 76A shows, in the trapezoidal sectional shape of the thin conductive wire 441, an angle α which is defined by a line segment forming a sidewall of the thin conductive wire 441, which extends from an end of a lower base (surface 441a) to an end of an upper base (surface 441b), with respect to a direction extending along the lower base. The angle α is preferably an angle in a range between not less than 40 degrees and not more than 85 degrees. When the angle α is less than 40 degrees, suitable heat generation is difficult to be obtained unless a line width of the thin conductive wire 441 is increased. As a result, the thin conductive wire 441 having a larger width may deteriorate visibility of the heating plate 410. Thus, the angle α is preferably not less than 40 degrees.

FIG. 76A shows an example in which the sectional shape of the thin conductive wire 441 is a neat trapezoidal shape. However, as shown in FIG. 76B, there is a possibility that the side surfaces 441c, 441d are formed of curved lines because of manufacturing conditions and so on. In the present invention, such a shape is included in a concept of trapezoidal shape. Also in this case, as shown in FIG. 76B, the angle α is specified as an angle defined by the line segment which extends from the end of the lower base (surface 441a) to the end of the upper base (surface 441b), with respect to the direction extending along the lower base. This angle α is also preferably not less than 40 degrees and not more than 85 degrees. In this embodiment, the sectional shape of the thin conductive wire 441 is trapezoidal. However, as long as the thin conductive wire 441 is formed such that its line width narrows as a certain point in the thin conductive wire 441 comes close to the first glass plate 411, the thin conductive wire 441 may have a tier-like shape, for example.

In a case where the thin conductive wire 441 is formed such that its line width narrows as a certain point in the thin conductive wire 441 comes close to the first glass plate 411 located on the side of the first joint layer 413 in contact with the thin conductive wire 441, when the glass plates 411, 412, the joint layers 413, 414 and the conductive pattern sheet 420 are laminated, the joint layer 421 can easily get into a root side of the thin conductive wire 441. As a result it can be restrained that bubbles remain around the sidewalls (surfaces 441c, 442d) of the thin conductive wire 441.

In FIG. 75, $W_{max}$ represents a line width of the thin conductive wire 441 on the root along the sheet plane of the substrate 430, showing a line width of a part having a largest width of the thin conductive wire 441 (referred to as "maximum width" herebelow). In this embodiment, the maximum width $W_{max}$ of the thin conductive wire 441 is not less than 1 μm and not more than 20 μm. The maximum width $W_{max}$ is preferably not less than 2 μm and not more than 20 μm, and more preferably not less than 2 μm and not more than 15 μm. Thus, the conductive pattern 440 is seen transparent in general, and has an excellent see-through property. In addition, a height (thickness) H of the thin conductive wire 441, i.e., the height (thickness) H along the normal direction to the sheet plane of the substrate 430 is preferably not less than 1 μm and not more than 20 μm, and more preferably not less than 1 μm and not more than 12 μm.

Since the thin conductive wire 441 having such a height dimension, in addition to the line width W$_{max}$, is sufficiently thin, the conductive pattern 440 can be effectively made invisible.

In FIG. 75, the symbol P represents a pitch between the adjacent openings 443 (distance between centers of the adjacent openings 443) in the honeycomb pattern of the conductive pattern 440 when it has a honeycomb pattern. The pitch P is preferably not less than 0.3 mm and not more than 2 mm. The pitch P may be not less than 0.3 mm and not more than 7.0 mm. When the conductive pattern 440 has a grid pattern, a pitch between adjacent rectangular openings in the grid pattern is preferably not less than 0.3 mm and not more than 2 mm. Also in this case, the pitch may be not less than 0.3 mm and not more than 7.0 mm. In addition, when the conductive pattern 440 has a line and space pattern, a pitch, which is a distance between the adjacent thin conductive wires 441, is preferably not less than 0.3 mm and not more than 2 mm. Also in this case, the pitch P may be not less than 0.3 mm and not more than 7.0 mm.

In addition, in the illustrated example, the thin conductive wire 441 includes a first dark color layer 446 disposed on the substrate 430, a conductive metal layer 445 disposed on the first dark color layer 446, and a second dark color layer 447 disposed on the conductive metal layer 445. In other words, the surface of the conductive metal layer 445 on the side of the substrate 430 is covered with the first dark color layer 446, and the surface of the conductive metal layer 445 on the side opposed to the substrate 430 and both side surfaces thereof are covered with the second dark color layer 447.

The conductive metal layer 445 made of a metal material has relatively a high reflectance. When light is reflected on the conductive metal layer 445 forming the thin conductive wires 441 of the conductive pattern 440, the reflected light may be visible, which hinders a field of view of a passenger. In addition, when the conductive metal layer 445 is visible from outside, design is sometimes impaired. Thus, the dark color layers 446, 447 are disposed at least a part of the surface of the conductive metal layer 445. The dark color layers 446, 447 are layer having a visible light reflectance that is lower than that of the conductive metal layer 445, and are black-colored dark color layers, for example. Due to the dark color layers 446, 447, the conductive metal layer 445 becomes less visible, whereby an excellent field of view of a passenger can be ensured. In addition, impairment of design when seen from outside can be prevented. However, such dark color layers 446, 447 may be omitted.

Next, an example of a manufacturing method of the heating plate 410 is described with reference to FIGS. 77 to 86. FIGS. 77 to 86 are sectional views showing the example of the manufacturing method of the heating plate 410 in sequence. In particular, FIGS. 77 to 85 are views for explaining manufacture of the conductive pattern sheet 420 in detail. FIG. 86 shows that, after the conductive pattern sheet 420 is manufactured, the conductive pattern sheet 420 is sandwiched between the glass plates 411, 412 so that the heating plate 410 is manufactured.

Figure 77:
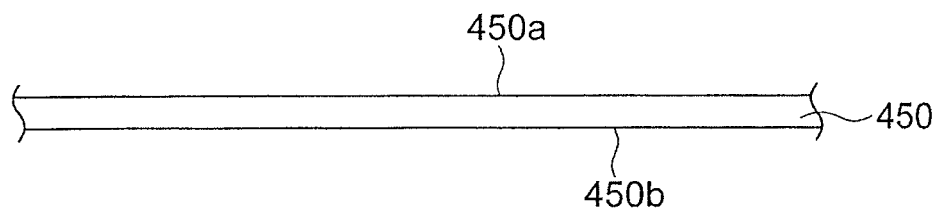
FIG. 77 is a view for explaining an example of a manufacturing method of the heating plate.

In order to manufacture the conductive pattern sheet 420, as shown in FIG. 77, there is firstly prepared a metal foil 450 having a pair of opposed surfaces 450a, 450b. The metal foil 450 will form the conductive metal layer 445 of the thin conductive wire 441. The metal foil 450 may be a foil made of gold, silver, copper, platinum, aluminum, chrome, molybdenum, nickel, titanium, palladium, indium, tungsten and an alloy thereof, for example. A thickness of the metal foil 450 may be not less than 1 μm and not more than 60 μm.

Figure 78:
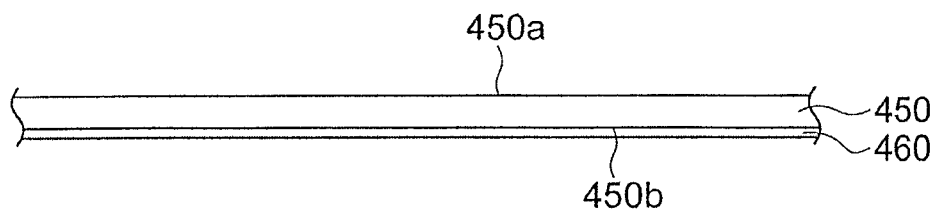
FIG. 78 is a view for explaining the example of the manufacturing method of the heating plate.

Then, as shown in FIG. 78, in the illustrated example, a dark color film 460, which will form the first dark color layer 446 of the thin conductive wire 441, is formed on the surface 450b of the metal foil 450. In this example, the dark color film 460 is made of chrome oxide. When the dark color film 460 to be formed on the metal foil 450 is made of chrome oxide, the dark color film 460 may be deposited by a spattering method or a vacuum vapor deposition method, for example, or may be formed by a treatment with a solution of sodium chlorite, sodium hydroxide and trisodium phosphate. In addition, for example, the dark color film 460 may be formed by subjecting a part of a material constituting the metal foil 450 to a darkening treatment (blackening treatment), and the first dark color film 460 made of metallic oxide or metallic sulfide can be formed from the part constituting the metal foil 450. In addition, the dark color film 460 may be made of copper nitride, copper oxide, nickel nitride and so on.

Figure 79:
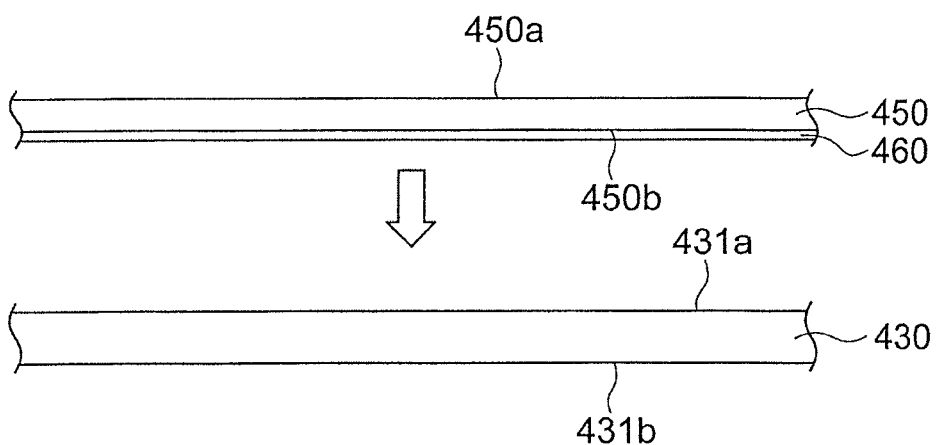
FIG. 79 is a view for explaining the example of the manufacturing method of the heating plate.
Figure 80:
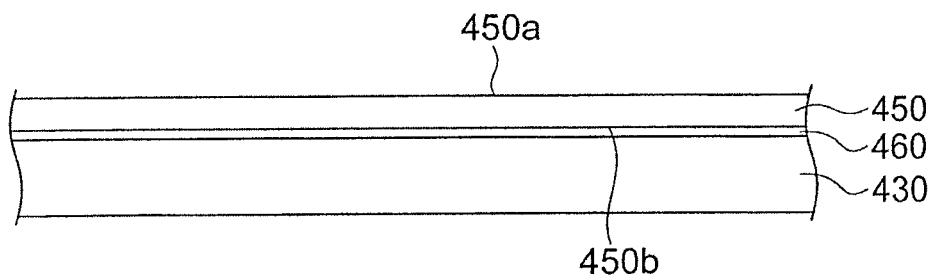
FIG. 80 is a view for explaining the example of the manufacturing method of the heating plate.

Then, as shown in FIG. 79, the substrate 430 is prepared. The substrate 430 and the metal foil 450 are located such that the surface 431a of the substrate 430 and the surface 450b of the metal foil 450 on which the dark color film 460 was formed face each other. Thereafter, as shown in FIG. 80, the metal foil 450 is laminated on the surface 431a of the substrate 430 through an adhesive layer. The substrate 430 may have a thickness of not less than 0.02 mm and not more than 0.20 mm, and may be made of polyethylene terephthalate, polyethylene naphthalate, polycarbonate, polystylene, cyclic polyolefin and so on.

Figure 81:
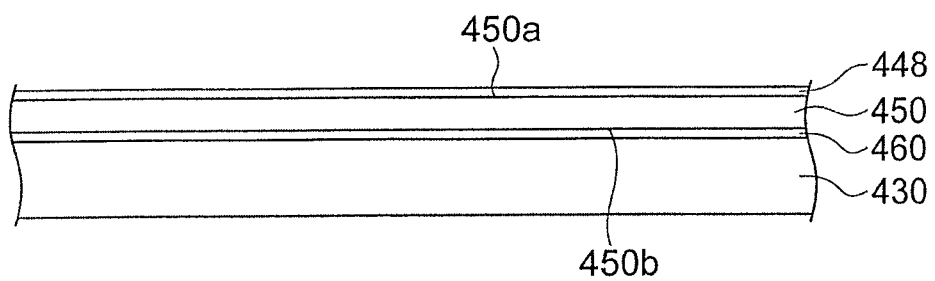
FIG. 81 is a view for explaining the example of the manufacturing method of the heating plate.

Then, as shown in FIG. 81, the resist layer 448 is disposed on the metal foil 450. The resist layer 448 is a resin layer having a photosensitivity to light of a predetermined wavelength range, such as ultraviolet light. The resin layer may be formed by adhering a resin film, or may be formed by applying a flowable resin. A concrete photosensitive property of the resist layer 448 is not specifically limited. For example, a photo-curing type photosensitive material or a photo-dissolving photosensitive material may be used as the resist layer 448.

Figure 82:
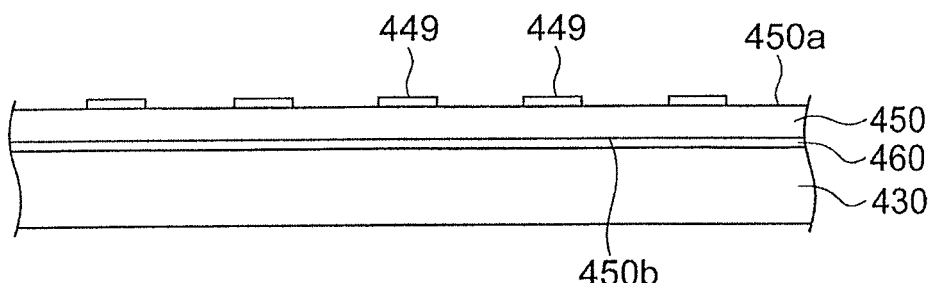
FIG. 82 is a view for explaining the example of the manufacturing method of the heating plate.

Thereafter, as shown in FIG. 82, the resist layer 448 is patterned to form (laminate) a resist pattern 449. Various known methods may be used as the method of patterning the resist pattern 449. In this example, a resin layer having a photosensitivity to light of a predetermined wavelength range, such as ultraviolet light, is used as the resist layer 448, and a known photolithographic technique is used for patterning the resist layer 448. Firstly, a mask which opens a part to be patterned or a mask which shields a part to be patterned is placed on the resist layer 448, and the resist layer 448 is irradiated with ultraviolet light through the mask. Thereafter, the part shielded by the mask from the ultraviolet light or the part irradiated with the ultraviolet light is developed and removed by means of solution such as a water. Thereafter, the remaining resist layer 448 is subjected to a curing process such as a heating process or a chrome film curing process and so on, and is then baked at a predetermined temperature. Thus, the patterned resist pattern 449 can be formed.

Figure 83:
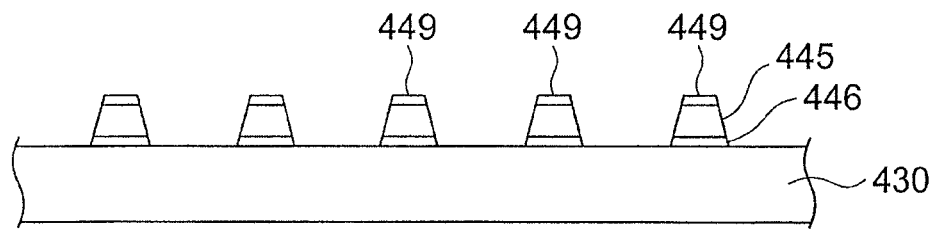
FIG. 83 is a view for explaining the example of the manufacturing method of the heating plate.

Then, as shown in FIG. 83, the metal foil 450 including the dark color film 460 is etched with the resist pattern 449 serving as a mask. Due to this etching process, the metal foil 450 including the dark color film 460 is patterned substantially similar to the resist pattern 449. As a result, the conductive metal layer 445, which will form a part of the thin conductive wire 441, is formed from the patterned metal foil 450. In addition, the first dark color layer 446, which will form a part of the thin conductive wire 441, is formed from the patterned dark color film 460. The conductive metal layer 445 is formed such that its line width narrows along the normal direction to the sheet plane of the substrate 430, i.e., the line width narrows as a certain point in the thin conductive wire 441 moves away outward from the surface 431*a*. The etching method is not particularly limited, and a known method may be employed. The known method may be a wet etching method using etchant, a plasma etching method and so on.

In this embodiment, in order that the line width of the conductive metal layer 445 has a desired shape, i.e., the line width narrows as a certain point in the thin conductive wire 445 moves away from the surface 431*a*, a predetermined operation is carried out. One example of the predetermined operation for forming the desired shape is an operation that lowers a contact between the resist pattern 449 and the metal foil 450. A concrete method of lowering the contact is as follows. In the baking step at a predetermined temperature which is performed after the process for curing the remaining resist layer 448 after being developed in the step of forming the resist pattern 449, the baking is performed at a temperature less than 100 degrees, e.g., not less than 80 degrees and not more than 95 degrees, in order that the resist pattern 449 is completely dried. In addition, another example of the predetermined operation for forming the desired shape is as follows. When the metal foil 450 including the dark color film 460 is etched with the resist pattern 449 serving as a mask, wet etching is employed. In this case, a concentration of an etchant used in the wet etching is made to be greater than a predetermined concentration, or a temperature of the etchant is made to be higher than a predetermined temperature, or an etching period by the etchant is made shorter than a predetermined period. A yet another example of the predetermined operation for forming the desired shape is as follows. When an ultraviolet curing type resin is used in the resist layer 448, a UV intensity of the resin is lowered.

Figure 84:
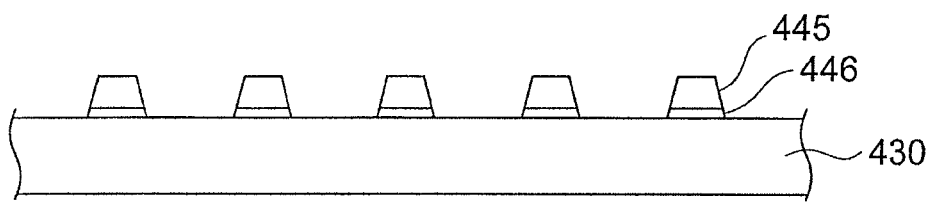
FIG. 84 is a view for explaining the example of the manufacturing method of the heating plate.

After the metal foil 450 including the dark color film 460 is etched as described above, the resist pattern 449 is removed as shown in FIG. 84.

Figure 85:
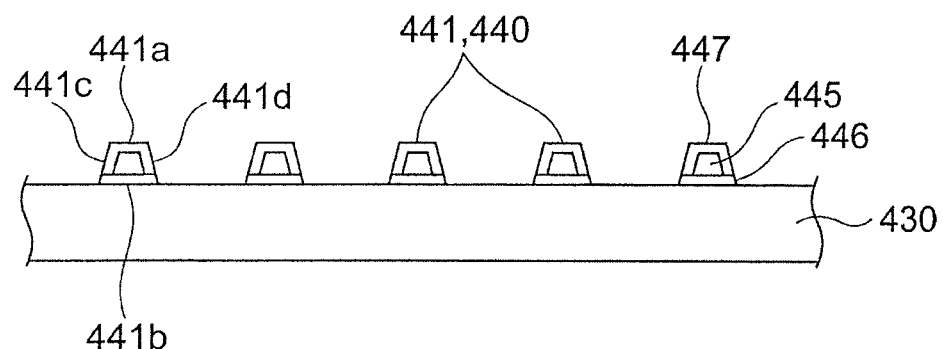
FIG. 85 is a view for explaining the example of the manufacturing method of the heating plate.
Figure 86:
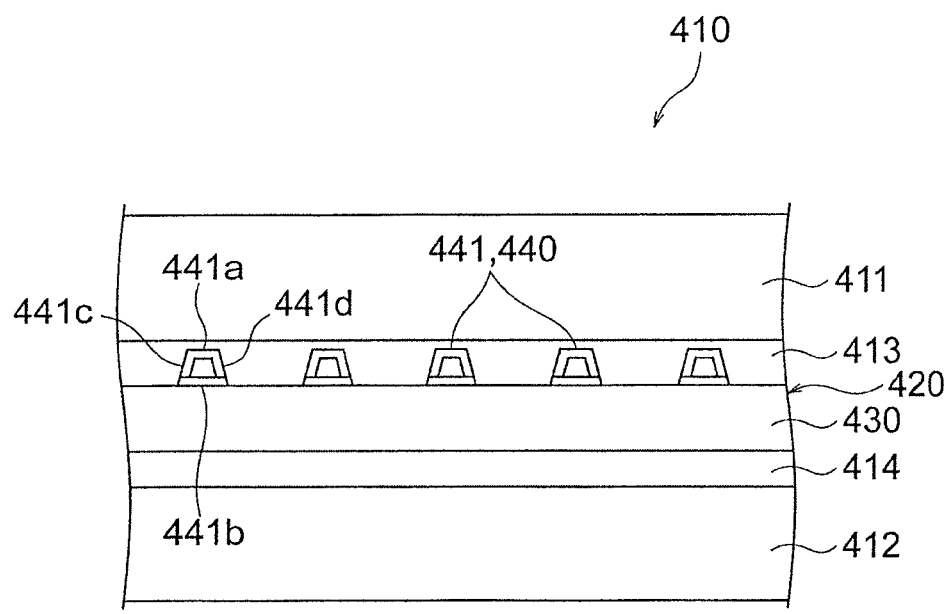
FIG. 86 is a view for explaining the example of the manufacturing method of the heating plate.

Then, as shown in FIG. 85, the second dark color layer 447 is formed on the surface 441*a* of the conductive metal layer 445 on the side opposed to the first dark color layer 446 and the side surfaces 441*c*, 441*d*. The second dark color layer 447 is formed by, e.g., subjecting a part of a material constituting the conductive metal layer 445 to a darkening treatment (blackening treatment). Namely, in this case, the second dark color layer 447 made of metallic oxide or metallic sulfide can be formed from the part constituting the conductive metal layer 445. Alternatively, the second dark color layer 447 as a coating film made of a dark color material or a plated layer made of nickel or chrome may be disposed on the surface of the conductive metal layer 445. In addition, the surface of the conductive metal layer 445 may be roughened, and the second dark color layer 447 may be disposed thereon.

In this manner, the conductive pattern sheet 420 is manufactured. Thereafter, as shown in FIG. 86, the curved first glass plate 411, the first joint layer 413, the conductive pattern sheet 420, the second joint layer 414 and the curved second glass plate 412 are superposed in this order, and heated and pressurized, so that the curved first glass plate 411, the conductive pattern sheet 420 and the curved second glass plate 412 are joined by the joint layers 413, 414. Therefore, the heating plate 420 is manufactured.

The aforementioned heating plate 410 in this embodiment includes the pair of glass plates 411, 412, and the conductive pattern 440 disposed between the pair of glass plates 411, 412. The conductive pattern 440 has the thin conductive wires 441 that are arranged in a pattern. In addition, the heating plate 410 includes the first joint layer 413 disposed between the first glass plate 411 of the pair of glass plates and the conductive pattern 440 to be directly in contact with the first glass plate 411 and the thin conductive wires 441, so as to join the conductive pattern 440 to the first glass plate 411. The thin conductive wire 441 is formed such that its line width narrows as a certain point in the thin conductive wire 441 comes close to the first glass plate 411 located on the side of the first joint layer 413 with which the thin conductive wire 441 is in contact.

According to such a heating plate 410, when the glass plates 411, 412, the joint layers 413, 414 and the conductive pattern sheet 420 are laminated during the manufacturing process, the joint layer 413 can easily get into the root side of the thin conductive wire 441, particularly upon heating. As a result it can be restrained that bubbles remain around the sidewalls (surfaces 441*c*, 442*d*) of the thin conductive wire 441. Thus, according to this embodiment, an appearance quality of the heating plate 410 can be improved, and glaring is restrained from occurring in the heating plate 410.

The aforementioned embodiment can be variously modified. Modification examples are described with reference suitably to the drawings. In the below description and the drawings for the description, a component that can be similarly made as that of the above embodiment is shown by the same symbol as a component corresponding to the above embodiment, and overlapped description is omitted.

Figure 87:
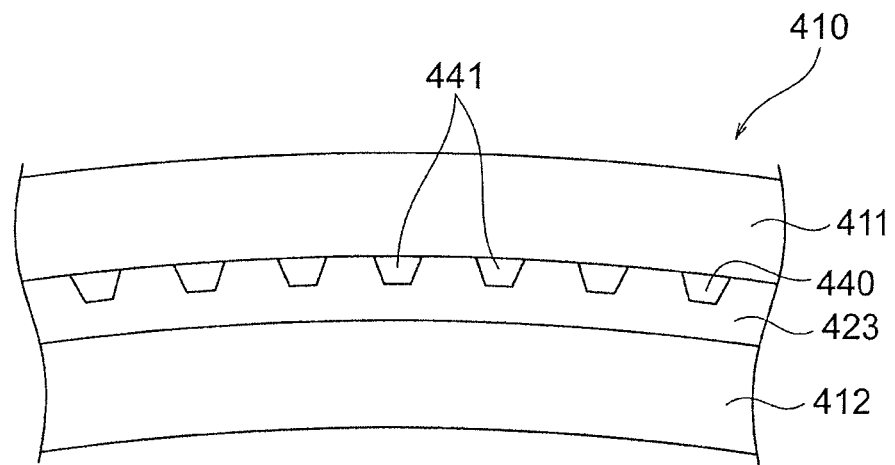
FIG. 87 is a view for explaining a modification example of the heating plate in the fifth embodiment according to the present invention.

In a modification example shown in FIG. 87, the conductive pattern 440 is disposed on a surface of the first glass plate 411 facing the second glass plate 412, through a holding layer not shown. The substrate 430 as described in the above embodiment is not provided. The holding layer has a thickness of about 1 μm to 100 μm. The holding layer joins the conductive pattern 440 to the first glass plate 411, by a peeling layer (illustration omitted) formed on a surface facing the glass plate 411. On the other hand, a third joint layer 423 is disposed between the conductive pattern 440 and the second glass plate 412. The third joint layer 423 is directly in contact with the second glass plate 412 and the thin conductive wires 441, so as to join the conductive pattern 440 to the second glass plate 412 through the thin conductive wires 441 with which the third joint layer 423 is in contact. The thin conductive wire 441 is formed such that a line width thereof narrows as a certain point in the thin conductive wire 441 comes close to the second glass plate 412 located on the side of the third joint layer 423. Also in this modification example, the same effect as that of the above embodiment can be obtained. In this example, when the conductive pattern 440 is formed by patterning, there exists a substrate that supports the conductive pattern 440. However, this substrate is peeled when the conductive pattern 440 is joined to the first glass plate 411. Thus, the above-described holding layer is exposed. The peeling layer formed on the holding layer may be, for example, a peeling layer of an interface peeling type, a peeling layer of an interlayer peeling type, a peeling layer of a cohesion peeling type and so on.

Figure 88:
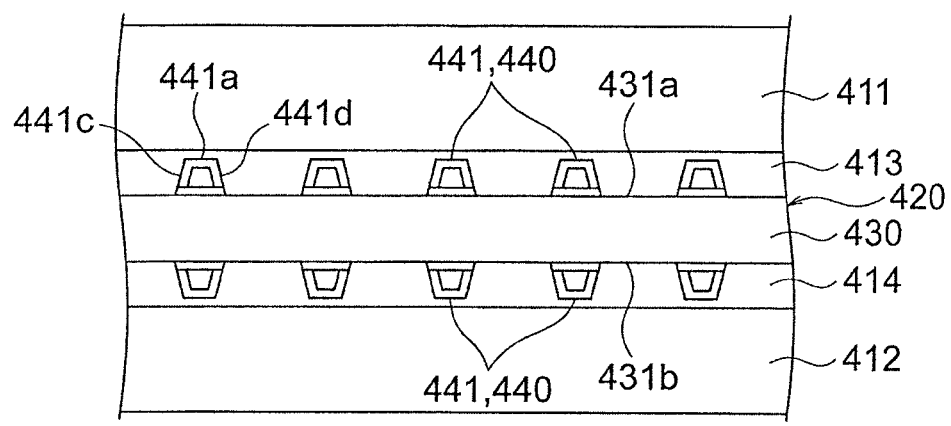
FIG. 88 is a view for explaining another modification example of the heating plate in the fifth embodiment according to the present invention.

Next, in a modification example shown in FIG. 88, the conductive pattern 440 is disposed on the respective surfaces 431*a*, 431*b* of the substrate 430 in the conductive pattern sheet 420. The first joint layer 413 is disposed between the first glass 411 and the conductive pattern 440 provided on the surface 431*a*. The first joint layer 413 is directly in contact with the first glass plate 411 and the thin conductive wires 441 of the conductive pattern 440 provided on the surface 431a, so as to join the conductive pattern 440 to the first glass plate 411 through the thin conductive wire 441 with which the first joint layer 413 is in contact. The thin conductive wire 441 is formed such that a line width thereof narrows as a certain point in the thin conductive wire 441 comes close to the first glass plate 411 located on the side of the first joint layer 413 in contact with the thin conductive wire 441.

On the other hand, the second joint layer 414 is disposed between the second glass plate 412 and the conductive pattern 440 provided on the surface 431b. The second joint layer 414 is directly in contact with the second glass plate 412 and the thin conductive wire 441 of the conductive pattern 440 provided on the surface 431b, so as to join the conductive pattern 440 to the second glass plate 412 through the thin conductive wire 441 with which the second joint layer 412 is in contact. The thin conductive wire 441 is formed such that a line width thereof narrows as a certain point in the thin conductive wire 441 comes close to the second glass plate 412 located on the side of the second joint layer 414 in contact with the thin conductive wire 441. Also in this modification example, the same effect as that of the above embodiment can be obtained.

The aforementioned embodiment and the modification examples can be more variously modified.

For example, in the example shown in FIG. 75, the second dark color layer 447 is formed on the surface 441a of the conductive metal layer 445 on the side opposed to the first dark color layer 446 and the side surfaces 241c, 241d. However, not limited thereto, the second dark color layer 247 may be formed only on the surface 441a of the conductive metal layer 445 on the side opposed to the first dark color layer 446, or only on the side surfaces 441c, 441d of the conductive metal layer 445.

When the second dark color layer 447 is formed only on the surface 441a of the conductive metal layer 245 on the side opposed to the first dark color layer 446, after the step shown in FIG. 80, for example, the second dark color layer 447 and the resist pattern 449 are disposed in this order on the metal foil 450. Thereafter, the second dark color layer 447, the conductive metal layer 445 and the first dark color layer 446 are etched with the resist pattern 449 serving as a mask.

Alternatively, when the second dark color layer 447 is formed only on the side surfaces 441c, 441d of the conductive metal layer 445, after the step shown in FIG. 83, for example, the second dark color layer 447 is formed without removing the resist pattern 449. After that, the resist pattern 449 is removed.

The heating plate 410 may be used in a rear window, a side window and a sun roof of the automobile 1. In addition, the heating plate 410 may be used in a window of a vehicle other than an automobile, such as a railway, an aircraft, a vessel, a space vessel and so on.

Further, in addition to a vehicle, the heating plate 410 may be used in a part by which an inside and an outside is partitioned, such as a window of a building, a store and a house.

Although some modification examples of the above third embodiment are described, the modification examples can be naturally combined with one another for application.

The present invention is described in more detail herebelow by using an example. However, the present invention is not limited to the example.

Example

The heating plate 410 in Example was manufactured as follows. As the substrate 430, there was firstly prepared a PET (polyethylene terephthalate) film (manufactured by TOYOBO Co., Ltd A4300) having a thickness of 100 μm, a width of 82 cm and a length of 100 m. A two-pack mixture type urethane ester-based adhesive was applied to the substrate 430 by a gravure coater, such that a thickness of the cured adhesive became 7 μm. Then, an electrolytic copper foil having a thickness of 10 μm, a width of 81 cm and a length of 80 m was laminated as the metal foil 450 on the substrate 430 through an adhesive. The electrolytic copper foil and the substrate 430 were maintained for 4 days in an environment of 50° C., so that the electrolytic copper foil was secured on the substrate 430.

Thereafter, casein was applied to the electrolytic copper foil (metal foil 450) and dried so as to laminate the resist layer 48 as a photosensitive resin layer. Then, in a plurality of ranges specified by 100 cm×80 cm in the resist layer 48, a mesh-like pattern of 3.0 mm in pitch and 7 μm in line width was exposed with a photomask having a pattern formed thereon. In this exposure process, ultraviolet contact exposure was intermittently carried out. After the exposure process, a part where the resist pattern 449 was not formed was developed by water and removed. The remaining resist layer 48 was heated at 80° C. for 2 minutes and was baked at a temperature of 85 degrees. Thus, the resist pattern 449 was formed. The resist pattern 449 was formed in a mesh-like pattern of 3.0 mm in pitch and 7 μm in line width.

Then, a ferric chloride solution (Baume degree of 42, temperature of 30 degrees) was sprayed to the metal foil 450 from the resist pattern 449, with the resist pattern 449 serving as a mask, so as to etch the metal foil 450. After cleaning with water, the resist is peeled by using an alkali solution. After the resist was peeled, cleaning and drying were carried out. Then, there was obtained a laminate including a plurality of the conductive pattern sheets 420 including the substrate 430 made of PET/the adhesive layer/the conductive pattern 440 made of copper (conductive mesh). The conductive pattern 440 in the conductive pattern sheet 420 was made as a range of 100 cm×80 cm wherein the thin conductive wires 441 were arranged in a mesh-like pattern of 3.0 mm in pitch and 7 μm in line width. The thin conductive wire 441 was formed into a trapezoidal shape in a section in a direction perpendicular to the extension direction of the thin conductive wire. In the trapezoidal section of the thin conductive wire 441, an angle α that was defined by a line segment which extends from an end of a lower base (surface 441a) to an end of an upper base (surface 441b), with respect to a direction extending along the lower base, i.e., a basic angle was 75 degrees.

Then, the conductive pattern sheet 420 of 100 cm×80 cm was cut from the thus obtained laminate. The conductive pattern sheet 420 was sandwiched between the joint layers 413, 414 formed of PVB adhesive sheets having the same size as that of the conductive pattern sheet 420. Then, they are further sandwiched between the glass plates 411, 412 of 100 cm×80 cm, and were heated/pressurized (vacuum laminated). Then, the heating plate 410 according to Example was obtained.

Upon inspection of the heating plate 410 according to Example with eyes, no bubble was found. In addition, when a point light source distant from 3 m was observed via the heating plate 410, there was no fine glaring caused by bubbles.

Comparative Example

A heating plate in Comparative Example was manufactured by using the same materials and the same steps as those of Example, excluding that a baking temperature for forming the resist pattern was 100 degrees. In the heating plate in Comparative Example, the thin conductive wire had a rectangular sectional shape in a direction perpendicular to the extension direction of the thin conductive wire. The basic angle was about 90 degrees. Upon inspection of the heating plate in Comparative Example with eyes, some bubbles were found. In addition, when a point light source distant from 3 m was observed via the heating plate, there was fine glaring caused by bubbles.

Sixth Embodiment

FIG. 1 and FIGS. 90 to 98 are views for explaining a sixth embodiment according to the present invention. In the sixth embodiment described below, a component corresponding to that of the first to fifth embodiments is shown by a symbol in 500s with the same last two digits, and overlapped description is omitted.

Figure 90:
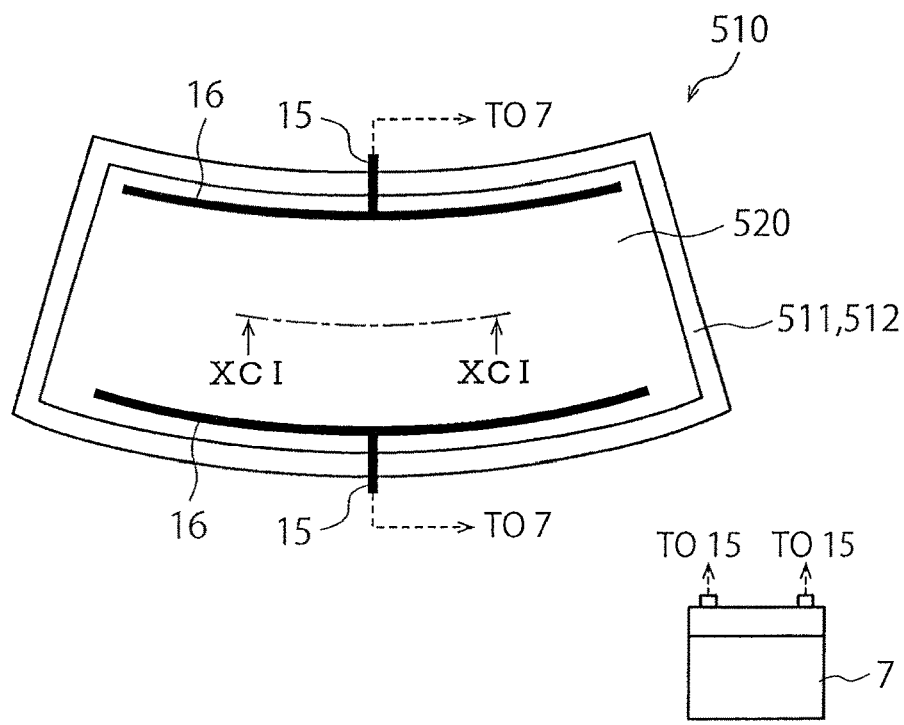
FIG. 90 is a view for explaining a sixth embodiment of the present invention, showing a heating plate when viewed in a normal direction of a plate plane thereof.
Figure 91:
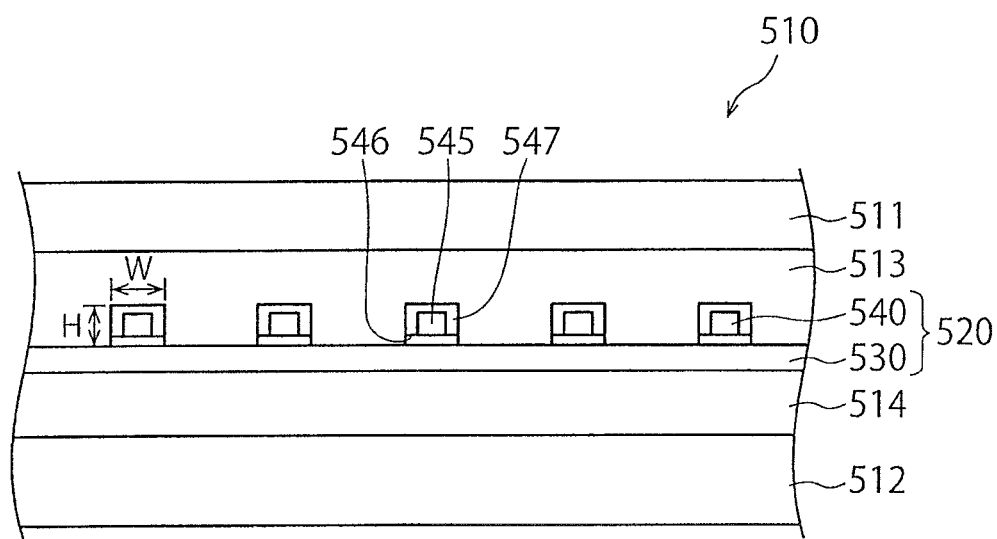
FIG. 91 is a cross-sectional view of the heating plate of FIG. 90.
Figure 92:
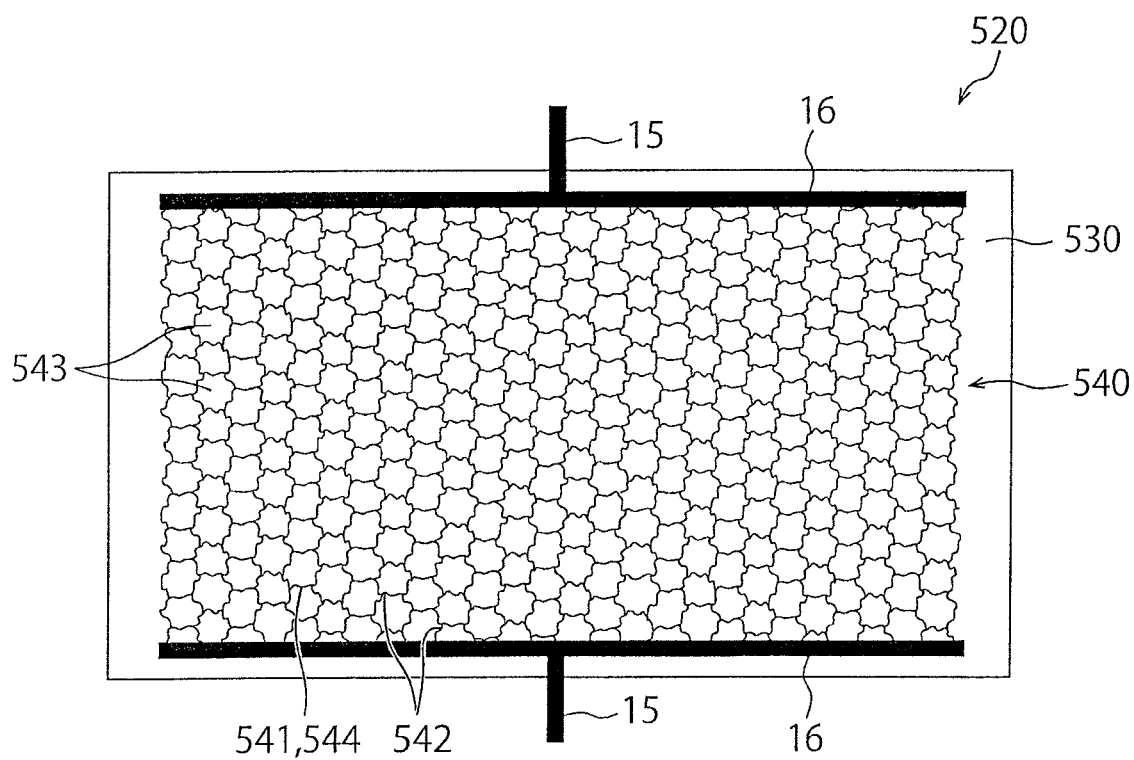
FIG. 92 is a top view of an example of a conductive pattern when viewed in a normal direction of a sheet plane thereof.

FIG. 90 is a view of a heating plate when viewed in a normal direction of a plate plane thereof. FIG. 91 is a cross-sectional view of the heating plate 510 of FIG. 90. FIG. 92 is a top view of an example of a conductive pattern 540 constituting the heating plate 510 of FIG. 90 when viewed in a normal direction of a sheet plane thereof. The heating plate 510 in this embodiment is sometimes referred to as "laminated glass".

FIG. 90 shows the heating plate 510 when viewed in the normal direction of the plate plane thereof. FIG. 91 is shows a cross-sectional view corresponding to a XCI-XCI line of the heating plate 510 of FIG. 90. In the example shown in FIG. 91, the heating plate 510 includes a pair of glass plates 511, 512, a conductive pattern sheet 520 disposed between the pair of glass plates 511, 512, and joint layers 513, 514 joining the glass plates 511, 512 and the conductive pattern sheet 520. In the example shown in FIG. 90, the heating plate 510 is curved. However, the other drawings planarly show the heating plate 510 and the glass plates 511, 512, for simplifying the illustration and facilitating the understanding.

The conductive pattern sheet 520 includes a substrate 530, a pair of connection parts 16, and a conductive pattern 540 disposed on a surface of the substrate 530, the surface facing the one glass plate 511.

As well shown in FIG. 90, the heating plate 510 includes a wiring part 15 for powering the conductive pattern 540. In the illustrated example, the conductive pattern 540 of the conductive pattern sheet 520 is powered by a power source 7, such as a battery, through the wiring part 15 and the connection parts 16, so that the conductive pattern 540 generates heat by means of resistance heat. The heat generated by the conductive pattern 540 is transmitted to the glass plates 511, 512, so that the glass plates 511, 512 are warmed up. Thus, due drops on the glass plates 511, 512 can be removed so that the glass plates 511, 512 can be defogged. When there is snow or ice on the glass plates 511, 512, the snow or ice can be unfrozen. Thus, an excellent field of view of a passenger can be ensured. Although not shown, in the wiring part 15, a switch is generally inserted between (connected in series with) the power source 7 and the connection parts 16 connected to the conductive pattern 540. Only when the heating plate 510 needs to be heated, the switch is closed so as to power the conductive pattern 540.

The respective constituent elements of the heating plate 510 are described below.

The glass plates 511, 512 are described. Particularly when used as a front window of an automobile, the glass plate 511, 512 preferably has a high visible light transmittance, in order not to hinder a field of view of a passenger. A material of such a glass plate 511, 512 may be soda lime glass, blue plate glass (float glass) and so on, for example. The glass plate 511, 512 preferably has a transmittance of 90% or more in a visible light area. The visible light transmittance of the glass plate 511, 512 is specified as follows. Transmittance of light with measurement wavelength range of from 380 nm to 780 nm is measured by using a spectrophotometer (manufactured by Shimadzu Corporation, "UV-3100PC", compliant with JIS K 0115). The visible light transmittance is an average value of the transmittances at the respective wavelengths. The visible light transmittance may be lowered by partially or totally coloring the glass plate 511, 512, for example. In this case, direct sunlight can be shielded and an inside of the automobile is less visible from outside.[0379-8] In addition, the glass plate 511, 512 preferably has a thickness of not less than 1 mm and not more than 5 mm. With such a thickness, the glass plate 511, 512 excellent in strength and optical properties can be obtained. The pair of glass plates 511, 512 may be made of the same material and have the same structure, or may differ from each other in at least one of the material and the structure.

Next, the joint layers 513, 514 are described. One joint layer 513 is disposed between the one glass plate 511 and the conductive pattern sheet 520 to join the one glass plate 511 and the conductive pattern sheet 520 to each other. The other joint layer 514 is disposed between the other glass plate 512 and the conductive pattern sheet 520 to join the other glass plate 512 and the conductive pattern sheet 520 to each other.

As such a joint layer 513, 514, a layer made of a material having various adhesion properties or glueing properties can be employed. In addition, the joint layer 513, 514 preferably has a high visible light transmittance. A typical joint layer may be a layer made of polyvinyl butyral (PVB), for example. The joint layer 513, 514 preferably has a thickness of not less than 0.15 mm and not more than 1 mm. The pair of joint layers 513, 514 may be made of the same material and have the same structure, or may differ from each other in at least one of the material and the structure.

Not limited to the illustrated example, the heating plate 510 may be provided with another function layer for exerting a specific function. In addition, one function layer may exert two or more functions. Alternatively, for example, a function may be given to at least one of the glass plate 511, 512 of the heating plate 510, the joint layer 513, 514 thereof, and the substrate 530 of the conductive pattern sheet 520, which is described later. The function that can be given to the heating plate 510 may be an antireflection (ARE) function, a hard coat (HC) function having an abrasion resistance, an infrared ray shield (reflection) function, an ultraviolet ray shield (reflection) function, a polarizing function, an antifouling function and so on, for example.

Next, the conductive pattern sheet 520 is described. The conductive pattern sheet 520 includes the substrate 530, the pair of connection parts 16, and the conductive pattern 540 disposed on the surface of the substrate 530, the surface facing the one glass plate 511. In this embodiment, The conductive pattern sheet 520 has a planar dimension substantially the same as that of the glass plate 511, 512 so as to be placed all over the heating plate 10. However, the conductive pattern sheet 520 may be placed over only a part of the heating plate 510, such as a part in front of a driver's seat. The respective constituent elements of the conductive pattern sheet 520 are described below.

The substrate 530 functions as a substrate that supports the conductive pattern 540. The substrate 530 is an electrically insulating film that transmits light of a wavelength (380 nm to 780 nm) of a visible light wavelength band, which is generally recognized as transparent. Any resin can be used as the substrate 530 as long as it transmits visible light and can suitably support the conductive pattern 540. For example, polyethylene terephthalate, polyethylene naphthalate, polycarbonate, polystyrene, polystylene, cyclic polyolefin and so on may be used. In consideration of the light transmittance and the suitable support capability of the conductive pattern 540, the substrate 530 preferably has a thickness of not less than 0.03 mm and not more than 0.20 mm.

The condition being "transparent" means that the substrate film has a transparency that enables to see from one side of the substrate film through the other side thereof via the substrate film, and means that the substrate film has a visible light transmittance of 30% or more, preferably 70% or more. The visible light transmittance is specified as follows. Transmittance of light with measurement wavelength range of from 380 nm to 780 nm is measured by using a spectrophotometer (manufactured by Shimadzu Corporation, "UV-3100PC", compliant with JIS K 0115). The visible light transmittance is an average value of the transmittances at the respective wavelengths.

The connection part 16 is electrically connected to the corresponding wiring part 15. A voltage of the power source 7 connected to the wiring part 15 is applied to the pair of connection parts 16.

Next, the conductive pattern 540 is described with reference to FIG. 92. FIG. 92 is a top view of the conductive pattern sheet 520 when viewed in the normal direction of the sheet plane thereof.

The conductive pattern 540 is disposed between the pair of connection parts 16 to be electrically connected respectively to connect the pair of connection parts 16. The conductive pattern 540 is formed of thin conductive wires 541 arranged in a predetermined pattern. Upon application of voltage to the conductive pattern 540 through the wiring part 15 and the connection part 16, the conductive pattern 540 generates heat by means of resistance heat. The heat is transmitted to the glass plates 511, 512 through the joint layers 513, 514, so that the glass plates 511, 512 are warmed up.

The conductive pattern 540 may be arranged in various patterns. For example, in the example shown in FIG. 92, the conductive pattern 540 is formed by the thin conductive wires 541 arranged in a mesh-like pattern defining a number of openings 543. The conductive pattern 540 includes a plurality of connection elements 544 that extend between two branch points 542 to define the openings 543. Namely, the thin conductive wires 541 of the conductive pattern 540 are an aggregation of a plurality of the connection elements 544 each forming the branch points 542 at both ends thereof.

The material for constituting such a conductive pattern 540 and the connection part 16 may be one or more of metal such as gold, silver, copper, platinum, aluminum, chrome, molybdenum, nickel, titanium, palladium, indium, tungsten, and an alloy of metals selected from two or more kinds of these metals, for example. The conductive pattern 540 and the connection part 16 may be made of the same material, or may be made of different materials.

As described above, the conductive pattern 540 may be formed of an opaque metal material. On the other hand, a rate of an area of the substrate 530, which is not covered with the conductive pattern 540, i.e., an open area ratio is as high as not less than 70% and not more than 99%. In addition, the line width of the thin conductive wire 541 is not less than 2 µm and not more than 20 µm. Thus, the area over which the conductive pattern 540 is disposed is generally recognized as transparent, whereby the existence of the conductive pattern 540 does not impair the see-through property of the heating plate 510.

In the example shown in FIG. 91, the thin conductive wire 541 has substantially a rectangular section in general. A width W of the thin conductive wire 541, i.e., the width W along the plate plane of the heating plate 510 is preferably not less than 2 µm and not more than 20 µm, and a height (thickness) H, i.e., the height (thickness) H along the normal direction of the plate plane of the heating plate 510 is preferably not less than 1 µm and not more than 60 µm. Since the thin conductive wire 541 having such a size is sufficiently thin, the conductive pattern 540 can be effectively made invisible.

In addition, as shown in FIG. 91, the thin conductive wire 541 may include a conductive metal layer 545, a first dark color layer 546 covering a surface of the conductive metal layer 545, which is opposed to the substrate 530, and a second dark color layer 547 covering a surface of the conductive metal layer 545, which is opposed to the glass plate 11, and both the side surfaces thereof. The conductive metal layer 545 made of a metal material having an excellent electric conductivity has relatively a high reflectance. When light is reflected on the conductive metal layer 545 forming the thin conductive wires 541 of the conductive pattern 540, the reflected light may be visible, which hinders a field of view of a passenger. In addition, when the conductive metal layer 545 is visible from outside, design is sometimes impaired. Thus, the dark color layers 546, 547 are disposed to cover at least a part of the surface of the conductive metal layer 545. The dark color layers 546, 547 may be layers having a visible light reflectance that is lower than that of the conductive metal layer 545, and are black-colored dark color layers, for example. Due to the dark color layers 546, 547, the conductive metal layer 545 becomes less visible, whereby an excellent field of view of a passenger can be ensured. In addition, impairment of design when seen from outside can be prevented.

As described above, in order to ensure the see-through property of the heating plate 510 and the visibility through the heating plate 510, the thin conductive wires 541 of the conductive pattern 540 are formed on the substrate 530 to have a high open area ratio. Thus, as shown in FIG. 91, the joint layer 513 and the substrate 530 of the conductive pattern sheet 520 are in contact with each other through the openings 543 of the thin conductive wires 541, i.e., areas between the adjacent thin conductive wires 541. Thus, the conductive pattern 540 is embedded in the joint layer 513.

Figure 98:
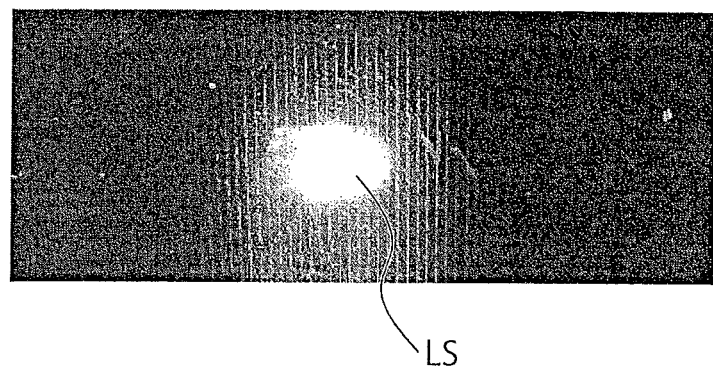
FIG. 98 is an image of a light source observed through a heating plate having a conventional conductive pattern.

As described above, in the field of view through the heating plate 510 having the conductive pattern 540, particularly when a light source such as a headlight of an oncoming automobile is seen, the flickering or glare phenomenon occurs by which a linear pattern is observed. FIG. 98 shows the flickering or glare phenomenon occurring in the field of view through a heating plate having a conventional conductive pattern. As shown in FIG. 98, the flickering or glare tends to be seen in an area above a light source LS and an area therebelow. The flickering or glare is seen as a pattern in which a lot of vertically extending emission lines are arranged transversely, in other words, a glittering stripe pattern. The flickering or glare impairs the visibility in the field of view through the heating plate 510.

The inventors of the present invention conducted extensive studies on the mechanism of occurrence of the flickering or glare, and estimated that the connection elements

544a of the thin conductive wires 541 forming the conductive pattern 540, which form longitudinal lines, had greater impact on the flickering or glare than the connection elements 544b which form transverse lines. The inventors found that the longitudinal lines were modified based on the estimation so as to make effectively invisible the flickering or glare. Although the reason estimated for causing the flickering or glare and the method for making invisible the flickering or glare are described below, the present invention is not limited to the below estimation.

Figure 93:
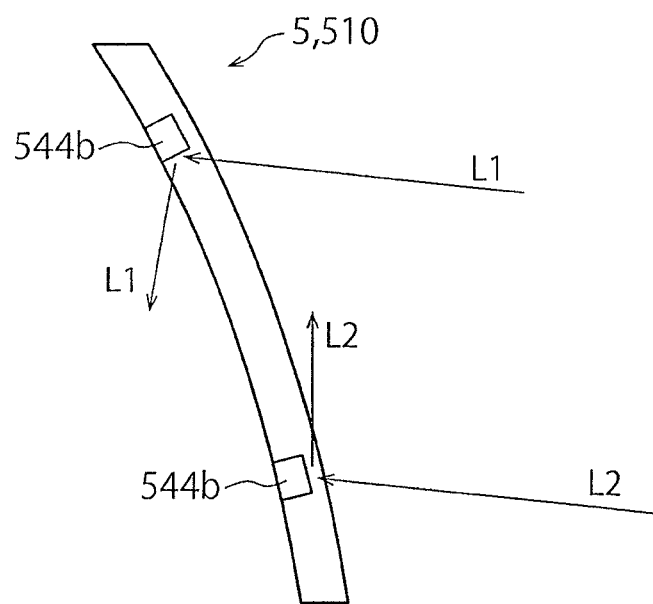
FIG. 93 is a view for explaining flickering or glare in the heating plate.
Figure 94:
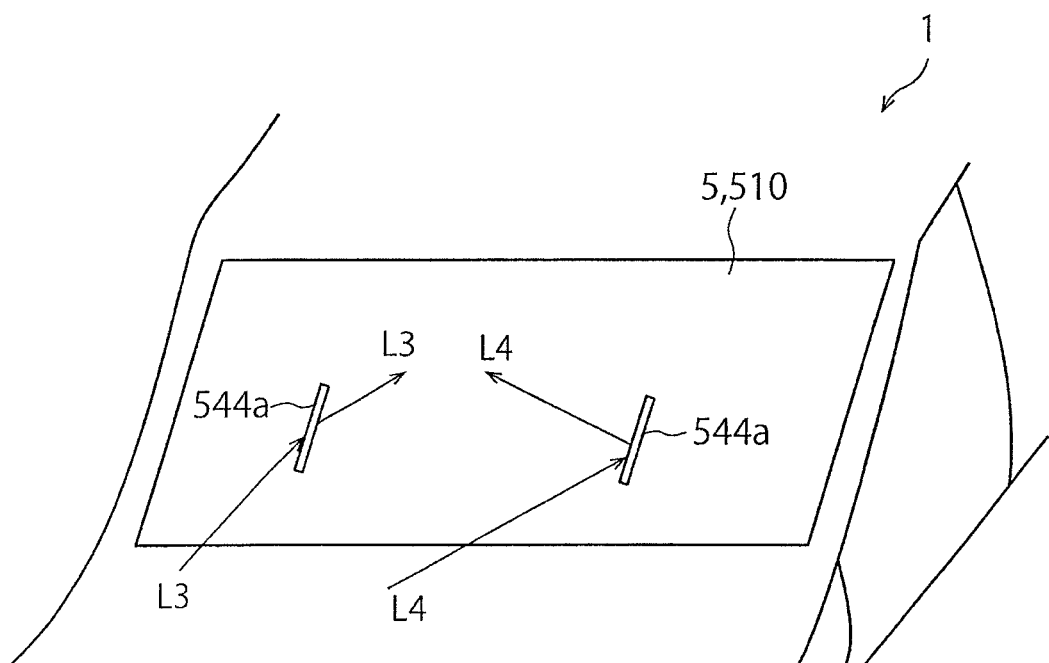
FIG. 94 is a view for explaining flickering or glare in the heating plate.

FIGS. 93 and 94 are views for explaining light reflection by the connection elements 544, when light rays L1, L2, L3, L4 are entered from an external light source onto the heating plate 510 applied to a front windshield 5 of an automobile 1. FIG. 93 is a sectional view of the heating plate 510 in parallel with the vertical direction including a normal direction to a plate plane thereof. FIG. 94 is a perspective view of the heating plate 510. These drawings show the heating plate 510, with its structure being partially omitted.

FIG. 93 shows the reflection of the light rays L1, L2 by the connection elements 544b of the connection elements 544, which form transverse lines. In the heating plate 510 applied to the front windshield 5 of the automobile 1, the light rays L1, L2 reflected by the transverse lines tend to travel upward or downward. Thus, it is expected that such light rays are difficult to be observed by an observer in the automobile (in FIG. 93, the observer is located on the left side of the heating plate 510, although not shown). From this point of view, it is estimated that the light rays reflected by the connection elements 544b of the connection elements 544, which form transverse lines, are not a major cause of the flickering or glare.

On the other hand, FIG. 94 shows the reflection of the light rays L3, L4 by the connection elements 544a of the connection elements 544, which form longitudinal lines. As can be understood from FIG. 94, since the light rays L3, L4 coming from outside are reflected by side portions of the connection element 544a forming a longitudinal line, the light rays L3, L4 slightly change their travel direction in the transverse direction, so as to travel into the automobile 1. These light rays can be seen by the observer in the automobile 1. Because of the thus observed reflected light rays, it is estimated that profiles of the connection elements 544a each forming a longitudinal line can be seen by the observer in the automobile 1.

The connection element 544a of the connection elements 544, which forms a longitudinal line, is a connection element 544 defined as below. Namely, in FIG. 95, the connection element 544a forming the longitudinal line is a line that, when the conductive pattern 540 is projected on a vertical plane P2 having a normal line nd2 that is located on the same vertical plane as a normal line nd1, which is one of normal lines to a contact plane P1 near the connection element 544 on a surface of the heating plate 510, at a contact point between the contact plane P1 and the surface of the heating plate 510, an angle formed by a line segment connecting both ends of the projection of the connection element on the vertical plane P2 with respect to a vertical direction on the vertical plane P2 (the up and down direction to a viewer in the sheet plane in FIG. 95) is smaller than an angle with respect to a horizontal direction on the vertical plane P2 (the direction perpendicular to the sheet plane of FIG. 95).

Figure 95:
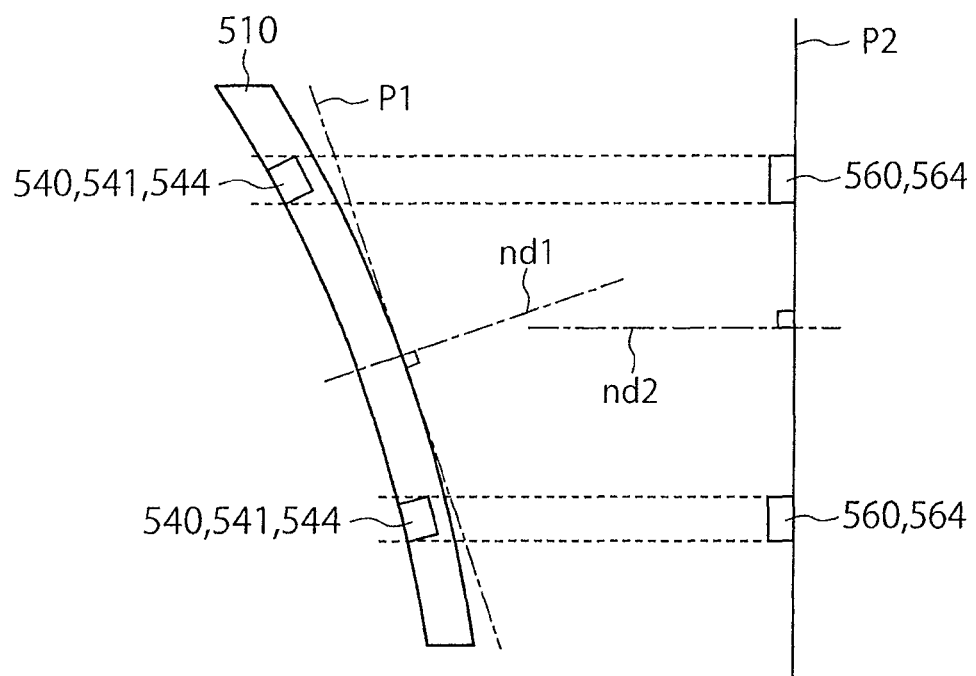
FIG. 95 is a view for explaining projection of a conductive pattern.
Figure 96:
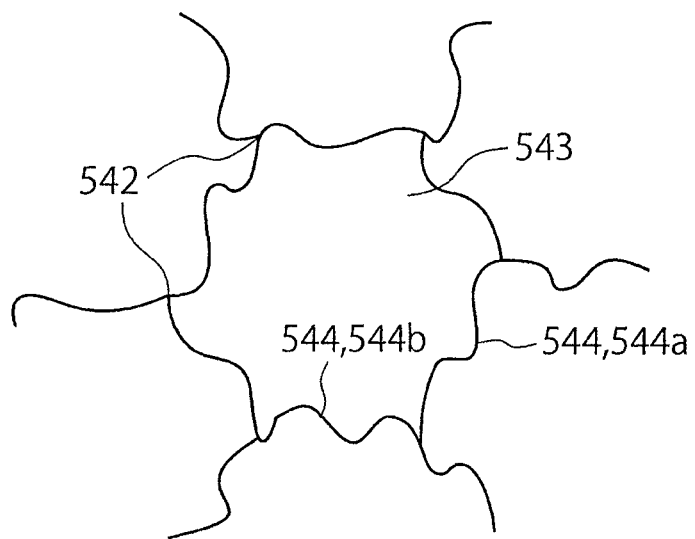
FIG. 96 is a view showing a part of the conductive pattern of FIG. 92 in enlargement.

Herein, the contact plane P1 of the heating plate 510 is a plane perpendicular to the normal line nd1 at a given point near the connection element 544 to be judged as a longitudinal line or a transverse line, and is a plane P1 in FIG. 95.

The vertical plane having the normal line nd2 located on the same vertical plane as the normal line nd1 to the plane P1 at the contact point is the plane P2 in FIG. 95. When the conductive pattern 540 is projected on the vertical plane P2, a projection 560 of the conductive pattern in the vertical plane can be provided. Namely, the connection element 544 in the conductive pattern 540, which is a connection element 564 whose line segment connecting both ends of the connection element 564 of the projection 560 of the conductive pattern in the vertical plane P2 is inclined at an angle smaller than 45 degrees relative to the vertical direction, is referred to as the connection element 544a forming a longitudinal line. Similarly, the connection element 544 in the conductive pattern 540, which is a connection element 564 whose line segment connecting both ends of the connection element 564 of the projection 560 of the conductive pattern in the vertical plane is inclined at an angle not less than 45 degrees relative to the vertical direction, is referred to as the connection element 544b forming a transverse line. Namely, the connection element 544b forming a transverse line is a connection element 544 other than the connection element 544a forming a longitudinal line.

In order to make the flickering or glare less visible, it is important that a direction of a light ray from an external light source, which is reflected by the connection element 544a forming a longitudinal line, differs from a direction where an observer is present. However, since the thin conductive wires 541 are an aggregation of the connection elements 544 which defines a mesh-like pattern, it is impossible that the direction along which the light ray reflected by the connection elements 544 travels completely differs from the direction where an observer is present. Thus, the direction along which the light ray reflected by the connection elements 544 is dispersed, i.e., scattered.

Figure 97:
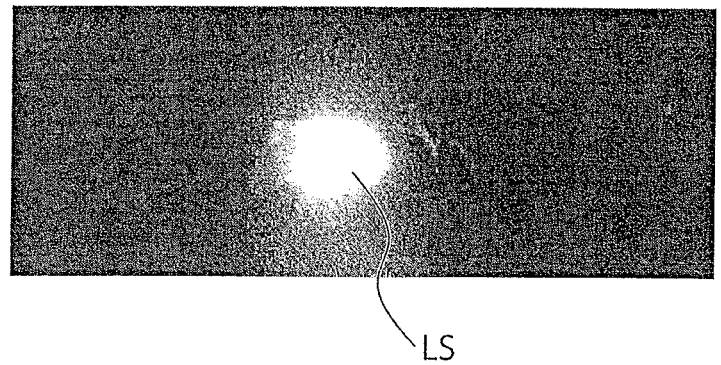
FIG. 97 is an image of a light source observed through the heating plate having the conductive pattern according to the sixth embodiment.

A curved connection element can be considered as such a connection element 544. However, the inventors of the present invention found that a connection element that is curved only in one direction, i.e., a connection element of a shape having only one convexity could not sufficiently scatter light from a light source. Thus, in the example shown in FIG. 96, the connection element 544 has a corrugated shape, i.e., a shape that alternately projects to one side and to the other side to form convexities in a direction intersecting with a direction connecting the branch points 542 at both ends thereof. In particular, when the connection element 544a forming a longitudinal line has such a shape, a direction along which reflected light travels can be dispersed so that the reflected light is difficult to be observed by an observer. Thus, in the field of view through a laminated glass plate, the flickering or glare can be reduced so as to ensure an excellent field of view. Further, not limited to the connection element 544a forming a longitudinal line, the connection element 544b forming a transverse line may also have a corrugated shape. FIG. 97 shows that the light source LS is observed through a laminated glass in which only the connection elements 544a forming a longitudinal line have a corrugated shape. In the observation shown in FIG. 97, a longitudinally extending linear pattern is not observed.

An observer is more sensitive to the diffusion in the connection element 544a forming a longitudinal line than the diffusion in the connection element 544b forming a transverse line. Thus, in the connection elements 544, a ratio of a length of the connection element 544a forming a longitudinal line with respect to a length of a line segment connecting the branch points 542 at both ends thereof is preferably greater than a ratio of a length of the connection element 544b forming a transverse line with respect to a length of a line segment connecting the branch points 542 at both ends thereof. In this case, light from an external light source can be diffused more easily in the connection element 544a forming a longitudinal line than in the connection element 544b forming a transverse line, without significantly lowering a transmittance of the conductive pattern 540.

Next, an example of a manufacturing method of the heating plate 510 is described.

A dark color film, which will form the first dark color layer 546, is provided on the substrate 530.

Then, a metal film, which will form the conductive metal layer 545, is provided on the dark color film. The metal film may be formed by a known method. For example, the metal film may be formed by a method of adhering a metal foil such as a copper foil, a plating method including electrolytic plating and electroless plating, a spattering method, a CVD method, a PVD method, an ion plating method or a combination method of the two or more methods.

Thereafter, a resist pattern is provided on the metal film. The resist pattern has a shape corresponding to the conductive pattern 540 to be formed. The resist pattern may be formed by a patterning method using a known photolithographic technique.

Then, the metal film and the dark color film are etched with the resist pattern serving as a mask. Due to this etching process, the metal film and the dark color film are patterned into a pattern substantially the same as the resist pattern. As a result, the conductive metal layer 545, which will form a part of the thin conductive wires 541, is formed from the patterned metal film. In addition, the first dark color layer 546, which will form a part of the thin conductive wires 541, is formed from the patterned dark color film.

The etching method is not particularly limited, and a known method may be employed. The known method may be a wet etching method using etchant, a plasma etching method and so on. Thereafter, the resist pattern is removed.

Thereafter, the second dark color layer 547 is formed on a surface of the conductive metal layer 545 on the side opposed to the side on which the first dark color layer 546 is provided, and side surfaces. The second dark color layer 547 can be formed by, e.g., subjecting a part of a material constituting the conductive metal layer 545 to a darkening treatment (blackening treatment), so that the second dark color layer 547 made of metallic oxide or metallic sulfide is formed. Alternatively, the second dark color layer 547 may be provided on the surface of the conductive metal layer 545. In addition, the surface of the conductive metal layer 545 may be roughened, and the second dark color layer 547 may be disposed thereon.

The conductive pattern sheet 520 having the conductive pattern 540 can be produced by the above steps.

Finally, the joint layer 513 and the glass plate 511 are laminated from the side of the conductive pattern 540, and the conductive pattern sheet 520 and the glass plate 511 are joined. Similarly, the joint layer 514 and the glass plate 512 are laminated from the side of the substrate 530, and the conductive pattern sheet 520 and the glass plate 512 are joined. In this manner, the heating plate 510 shown in FIG. 91 can be produced.

As described above, the heating plate 510 according to this embodiment includes: the pair of glass plates 511, 512; and the conductive pattern 540 disposed between the pair of glass plates 511, 512 and including the thin conductive wires 541 arranged in a mesh-like pattern; wherein the thin conductive wires 541 of the conductive pattern 540 are an aggregation of a plurality of the connection elements 544 that extend between the two branch points 542 to define the openings 543; and each connection element 544a forming a longitudinal line has a shape that alternately projects to the one side and to the other side to form convexities in the direction intersecting with the direction connecting the branch points 542 at both ends thereof. According to such a heating plate 510, reflection light of a direction along which reflected light travels is dispersed in the connection elements 544a each forming a longitudinal line so that the reflected light is difficult to be observed by an observer. Thus, in the field of view through a laminated glass plate, the flickering or glare can be reduced so as to ensure an excellent field of view.

In addition, in the heating plate 510 in this embodiment, the connection element 544 other than the connection elements 544a each forming a longitudinal line has a shape that alternately projects to one side and to the other side to form convexities in the direction intersecting with the direction connecting the branch points 542 at both ends thereof. According to such a heating plate 510, reflection light of a direction along which reflected light travels is dispersed also in the connection elements 544b each forming a transverse line so that the reflected light is difficult to be observed by an observer. Thus, in the field of view through a laminated glass plate, the flickering or glare can be reduced so as to ensure an excellent field of view.

Further, in the heating plate 510 according to this embodiment, a ratio of a length of the connection element 544a forming a longitudinal line with respect to a length of a line segment connecting the branch points 542 at both ends thereof is greater than a ratio of a length of the connection element 544 other than the connection element 544a forming a longitudinal line with respect to a length of a line segment connecting the branch points 542 at both ends thereof. According to such a heating plate 510, light from an external light source can be reflected more easily in the connection element 544a forming a longitudinal line than in the connection element 544b forming a transverse line, without significantly lowering a transmittance of the conductive pattern 540. Since the connection element 5444a forming a longitudinal line is more effective in reducing the flickering or glare, the heating plate 510 as a whole can have an effect of reducing the flickering or glare.

The above-described embodiment can be variously modified.

In the above-described embodiment, the heating plate 510 includes the conductive pattern sheet 520 having the substrate 530. However, by peeling the substrate 530 in the manufacturing step, the heating plate 510 may not have the substrate 530. In this case, the heating plate 510 can be made thinner as a whole and can reduce its weight. Moreover, heat generated by the conductive pattern 540 can be more rapidly transmitted to the whole heating plate 510.

In the above-described embodiment, the heating plate 510 is formed to have a curve shape. However, not limited thereto, the heating plate 510 may be formed to have a planar shape.

The heating plate 510 may be used in a rear window, a side window and a sun roof of the automobile 1. In addition, the heating plate 510 may be used in a window or a transparent part of a door of a vehicle other than an automobile, such as a railway, an aircraft, a vessel, a space vessel and so on, or a window or a door of a building, and a window or a transparent part of a door of a refrigerator, an exhibition box and a storage or preservation installation such as a cabinet.

Further, in addition to a vehicle, the heating plate 510 may be used in a part by which an inside and an outside is partitioned, such as a window of a building, a store and a house.

Although some modification examples of the above second embodiment are described, the modification examples can be naturally combined with one another for application.

The invention claimed is:

1. A heating plate that generates heat upon application of voltage thereto, the heating plate comprising:
a pair of glass plates;
a conductive pattern disposed between the pair of glass plates and defining a plurality of opening areas; and
a joint layer disposed between the conductive pattern and at least one of the pair of glass plates;
wherein the conductive pattern includes a plurality of connection elements that extend between two branch points to define the opening areas,
wherein the plurality of connection elements include a plurality of connection elements having a straight line segment shape and at least one of (1) a plurality of connection elements having a non-straight line shape and (2) a plurality of connection elements having a combined straight line segment and non-straight line shape, and
wherein a total value of lengths of the straight line segments of the connection elements having the straight line segment shape and connecting the two branch points is less than 20% of a total value of lengths measured along each connection element of all of the plurality of connection elements.

2. The heating plate according to claim 1, wherein the conductive pattern has the opening areas that have random shapes and are arranged at random pitches.

3. The heating plate according to claim 1, wherein the conductive pattern is formed by patterning a conductive layer by etching.

4. The heating plate according to claim 1, wherein an average distance between centers of gravity of the two adjacent opening areas is not less than 70 μm.

5. The heating plate according to claim 1, wherein a thickness of the conductive pattern is not less than 2 μm.

6. The heating plate according to claim 1, wherein an average of ratio ($L_1/L_2$) of a length $L_1$ of each opening area along a first direction, relative to a length $L_2$ of the opening area along a second direction perpendicular to the first direction, is not less than 1.3 and not more than 1.8.

7. A conductive pattern sheet used in a heating plate that generates heat upon application of voltage thereto, the conductive pattern sheet comprising:
a substrate; and
a conductive pattern disposed on the substrate and defining a plurality of opening areas;
wherein the conductive pattern includes a plurality of connection elements that extend between two branch points to define the opening areas,
wherein the plurality of connection elements include a plurality of connection elements having a straight line segment shape and at least one of (1) a plurality of connection elements having a non-straight line shape and (2) a plurality of connection elements having a combined straight line segment and non-straight line shape, and
wherein total value of lengths of the straight line segments of the connection elements having the straight line segment shape and connecting the two branch points is less than 20% of a total value of lengths Measured along each connection element of all of the plurality of connection elements.

8. A vehicle comprising the heating plate according to claim 1.

* * * * *